(12) United States Patent
Arias

(10) Patent No.: US 7,434,861 B2
(45) Date of Patent: Oct. 14, 2008

(54) RECLINING SEATS FOR THE BED OF PICKUP TRUCKS

(76) Inventor: Antonio M. Arias, P.O. Box 0830-00519, Panama (PA)

( * ) Notice: Subject to any disclaimer, the term of this patent is extended or adjusted under 35 U.S.C. 154(b) by 35 days.

(21) Appl. No.: 11/483,336

(22) Filed: Jul. 7, 2006

(65) Prior Publication Data

US 2008/0007082 A1    Jan. 10, 2008

(51) Int. Cl.
 *B60N 2/005* (2006.01)
(52) U.S. Cl. ......................................................... 296/63
(58) Field of Classification Search .................. 296/63, 296/64, 65.01, 66, 65.03, 65.13; 297/217.7, 297/232, 248
See application file for complete search history.

(56) References Cited

U.S. PATENT DOCUMENTS

| | | | | |
|---|---|---|---|---|
| 3,829,151 A | * | 8/1974 | Fellenstein | 296/64 |
| 3,840,263 A | * | 10/1974 | Bowden | 296/10 |
| 4,911,493 A | * | 3/1990 | Muirhead | 296/39.2 |
| 5,029,928 A | * | 7/1991 | Huber | 296/63 |
| 5,139,301 A | * | 8/1992 | Lewis | 296/63 |
| 5,368,354 A | * | 11/1994 | Martin | 296/64 |
| 5,398,985 A | * | 3/1995 | Robinson | 296/10 |
| 5,501,501 A | * | 3/1996 | White et al. | 296/64 |
| 5,516,179 A | * | 5/1996 | Tidwell | 296/63 |
| 6,237,981 B1 | * | 5/2001 | Selleck | 296/66 |
| 6,651,469 B2 | * | 11/2003 | Arias | 70/261 |
| 6,932,408 B1 | * | 8/2005 | Lyod et al. | 296/63 |
| 7,159,939 B2 | * | 1/2007 | Brown et al. | 297/217.7 |

* cited by examiner

*Primary Examiner*—H Gutman
(74) *Attorney, Agent, or Firm*—Oltman, Flynn & Kubler

(57) ABSTRACT

An apparatus comprising guide rails and rolling brackets mounted on opposite side panels extending up from the bed of a truck, and longitudinally extensible and retractable arm members for engagement removably to respective joints on said rolling brackets, for rolling a trunk and a pair of reclinable seats until retained in place either in the middle of the truck bed or on the end of said bed next to the cab of the truck is disclosed. The joints, which receive the arm members with which the trunk and the seats are secured to the side panels, can be set at different distances from the top of said side panels.

7 Claims, 71 Drawing Sheets

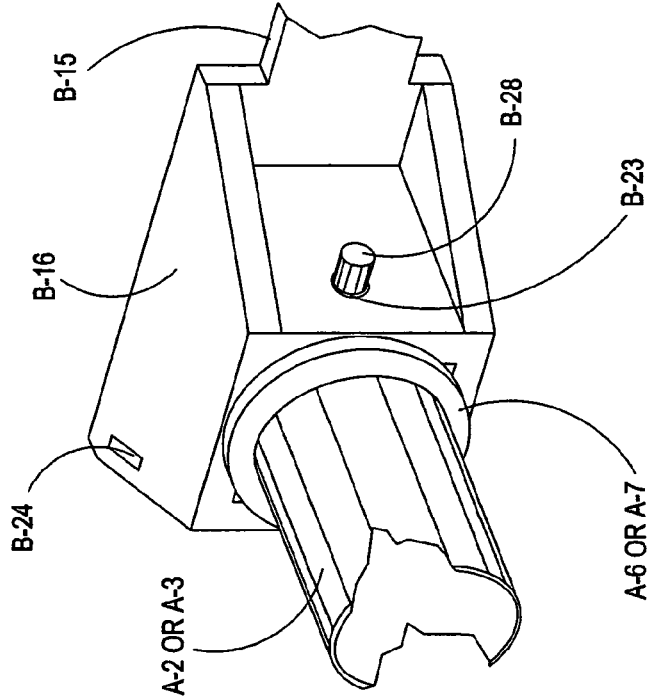
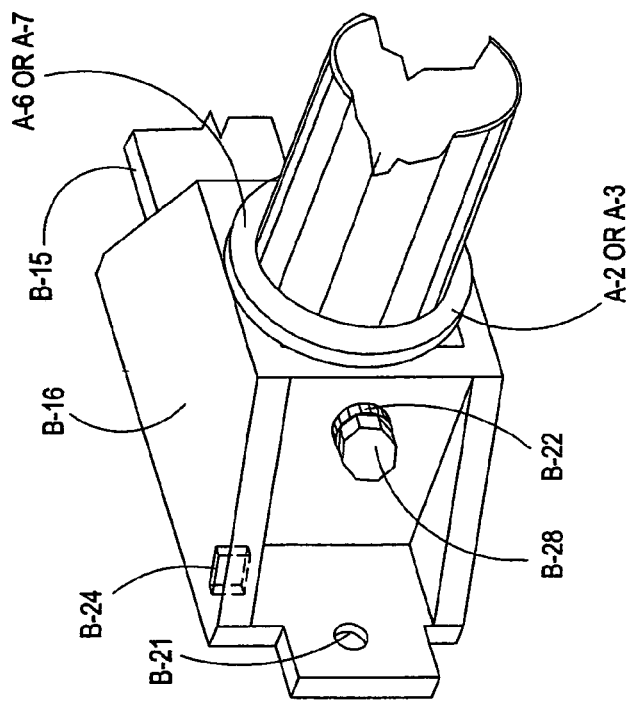
FIGURE 56

RECLINING SEATS FOR THE BED OF PICKUP TRUCKS

BACKGROUND OF THE INVENTION

1. Field of the Invention

This invention relates to a novel arrangement for retaining in place reclining seats in the bed of pickup trucks. (See FIG. 1). These especially comfortable fully-reclinable seats are for people to rest or sleep and enjoy the outdoors from the open-topped back of their pickups. The recliners can be enjoyed on the road or off the road, where the pickup trucks can be parked at countless great outdoor locations.

Like the seats of pleasure boats, these pickup seats would be manufactured with all-weather resistant upholstery to withstand rain and sun. These waterproof seats (of neoprene fabric) can be easily washed and dried in place in the back of the pickup and are thus ideal for use by farm workers, repair crews, and youngsters participating in participating in sporting or outdoor activities whose clothing may deteriorate the fine interiors of the pickup cab. Imagine then a pair of recliners in the back of the pickup contaminated with mud, sand, sun screen, perspiration, etc., while the pickup cab is kept fresh and clean.

The apparatus additionally consists of a trunk underneath the pair of reclining seats. This trunk for the safekeeping of small valuables has insulated walls and drainage outlets in the bottom and can thus be alternatively used as a cooler for food and beverages. The apparatus also has convenient snack holders for both seat occupants. The snack holders can hold snacks, beverages and ashtrays for those who wish to eat or smoke outdoors and yet protect the cab interiors.

The apparatus rolls on guide rails mounted on the side panels on the back of the pickup. It can thus be rolled until retained in place either in the middle of the pickup bed or on the end of said bed right next to the cab. To use the seats for resting or sleeping comfortably, the apparatus should be held in the middle of the pickup bed, where there is room to recline the backrests completely. (See FIG. 2). However, when the back of the pickup is not needed for seating people but to carry lots of luggage or other possessions, it may be convenient to move the apparatus out of the way by rolling it as close as possible to the cab, with the seats upright. (See FIG. 3). If in this next-to-the-cab position the apparatus still interferes with cargo, it can then be rolled to the opposite direction, to be readily dismounted from the rear of the pickup for temporary storage at home or elsewhere. (See FIG. 4).

When not in use, the seats can be carried in their fully reclined position, so that they do not interfere with the rear view from the cab. (See FIG. 2). The apparatus is also equipped with various security locks to protect from theft not only the apparatus itself but also luggage and other possessions in the open-topped pickup. More precisely, pickup owners can recline the backrests and use a key to lock them in place to provide a safe temporary enclosure for possessions kept underneath said backrests. (See FIG. 5).

2. Description of the Prior Art

There have long been seats for the open-topped cargo compartments of pickup trucks. The present applicant has contributed to this art with the disclosure in the following patent:

Arias, U.S. Pat. No. 6,651,469 B2, issued on Nov. 25, 2003, teaches a seat with a backrest which can be reclined backward and down, relative to a bottom of the seat, when said seat is secured to opposite side walls of a truck's cargo compartment.

SUMMARY OF THE INVENTION

The principal object of the present invention is to provide an arrangement to conveniently roll reclining seats and a trunk from one position to another in the bed of pickup trucks, so that said seats and said trunk can be used either in the middle area of the bed, where there is room to recline the backrests completely, or, alternatively, next-to-the-cab, where the backrests are not reclined, leaving most of the bed available to transport cargo. Another possibility is to roll the apparatus to the opposite direction and dismount it from the rear of the pickup for temporary storage at home or elsewhere.

BRIEF DESCRIPTION OF THE DRAWINGS

FIG. 56 shows how horizontal security bolt B28 passes completely from one side to the other of end-joint B16. The bolt passes through factory-made guide holes B22 and B23 on the sidewalls of the end-joint, and a bored hole on the end-block within the end-joint.

DETAILED DESCRIPTION OF THE PREFERRED EMBODIMENTS

Before explaining the present invention in detail it is to be understood that the invention is not limited in its application to the particular arrangements shown and described herein since the invention is capable of other embodiments. Also, the terminology used herein is for the purpose of description and not of limitation.

Figure 1:
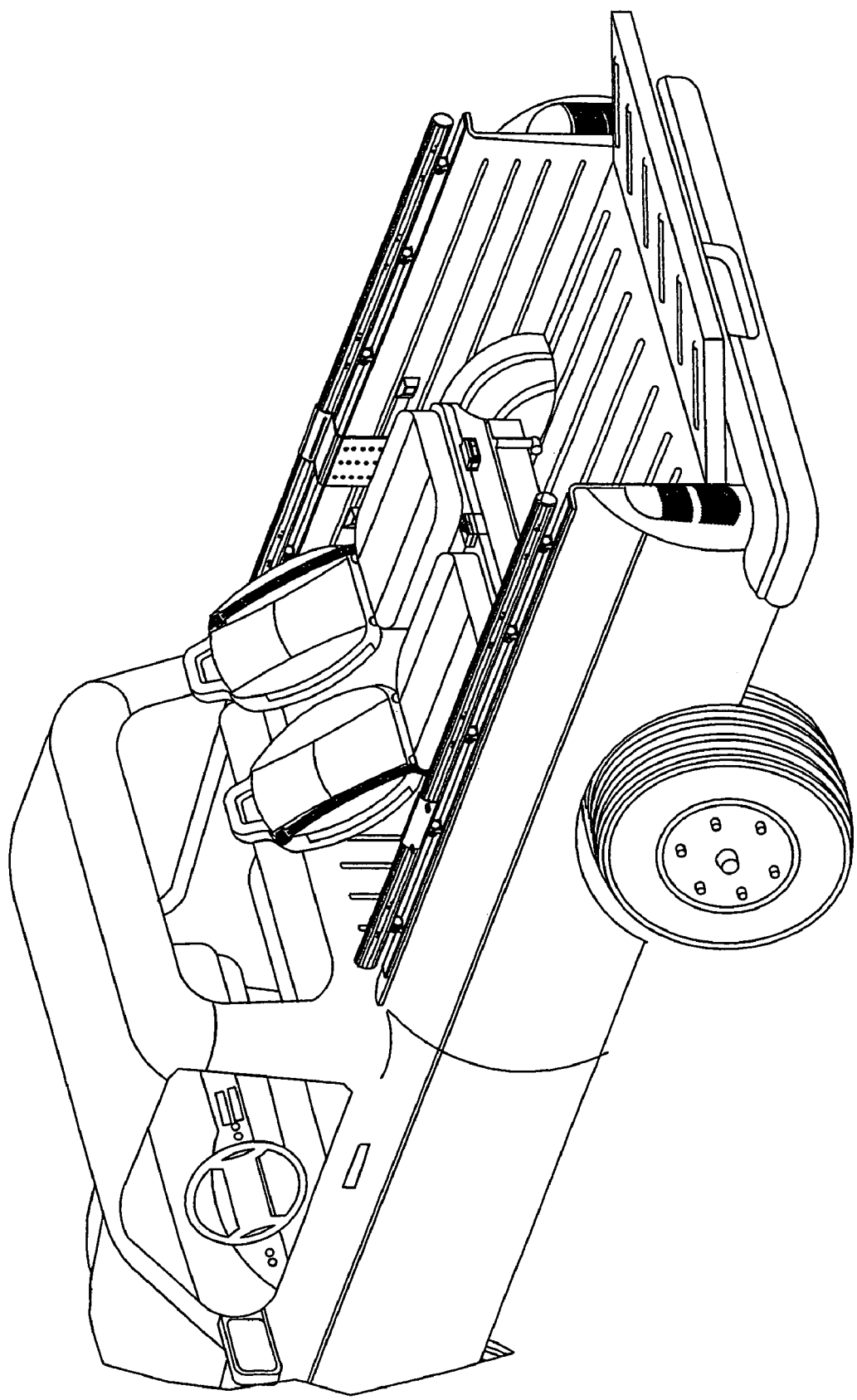
FIG. 1 is a top perspective view of the back of a pickup truck with an apparatus comprising of a pair of reclining seats and a trunk underneath. The side panels in the back of the pickup have guide rails on which rolling brackets are mounted to move the apparatus from one position to another.
Figure 2:
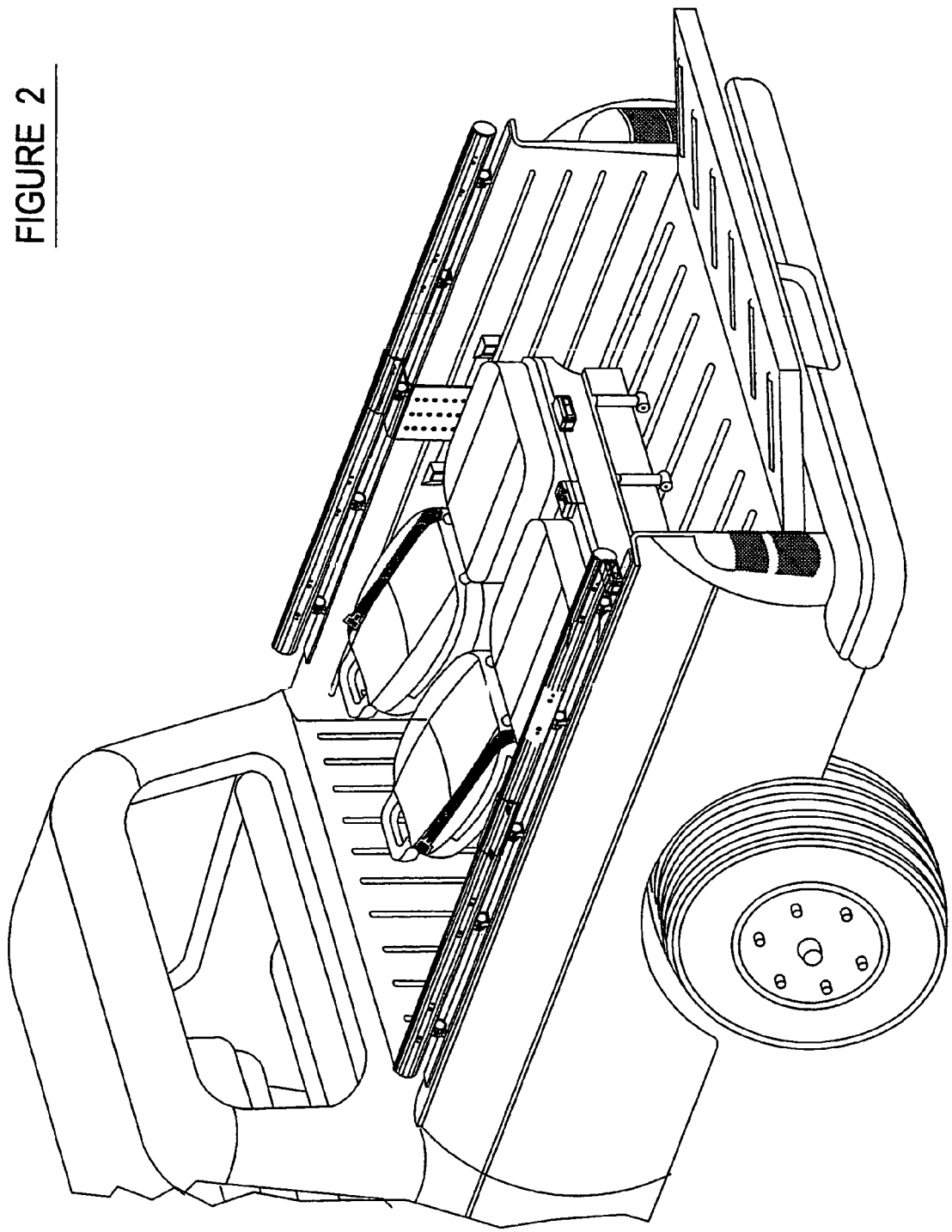
FIG. 2 shows the same apparatus illustrated in the previous FIGURE but with the seat backrests fully reclined. In this FIGURE the apparatus appears in the middle of the truck bed, where there is room to recline the backrests completely.
Figure 3:
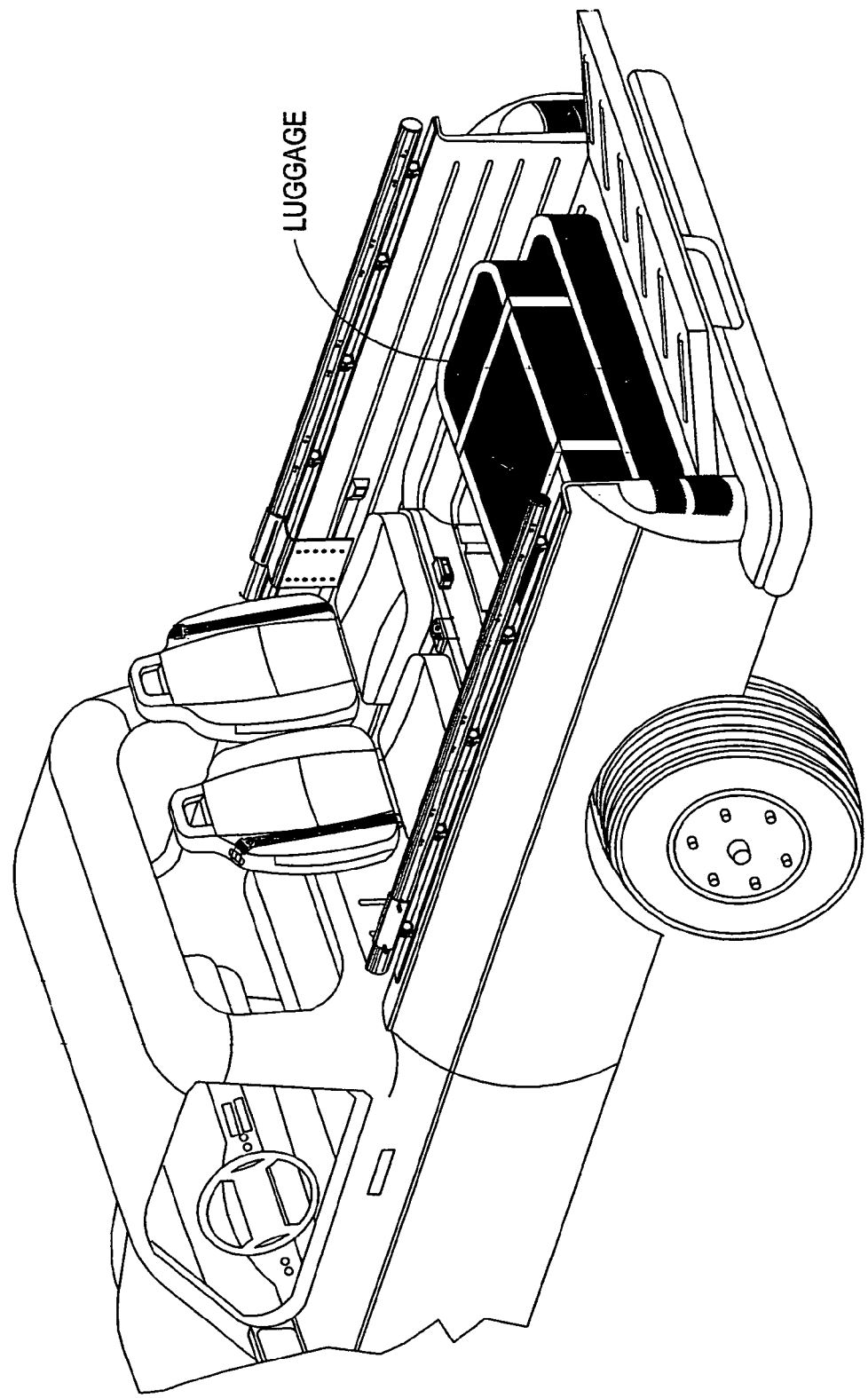
FIG. 3 shows the same apparatus illustrated in the previous FIGURES but in a next-to-the-cab position with the backrests upright, leaving most of the truck bed available to transport cargo.
Figure 4:
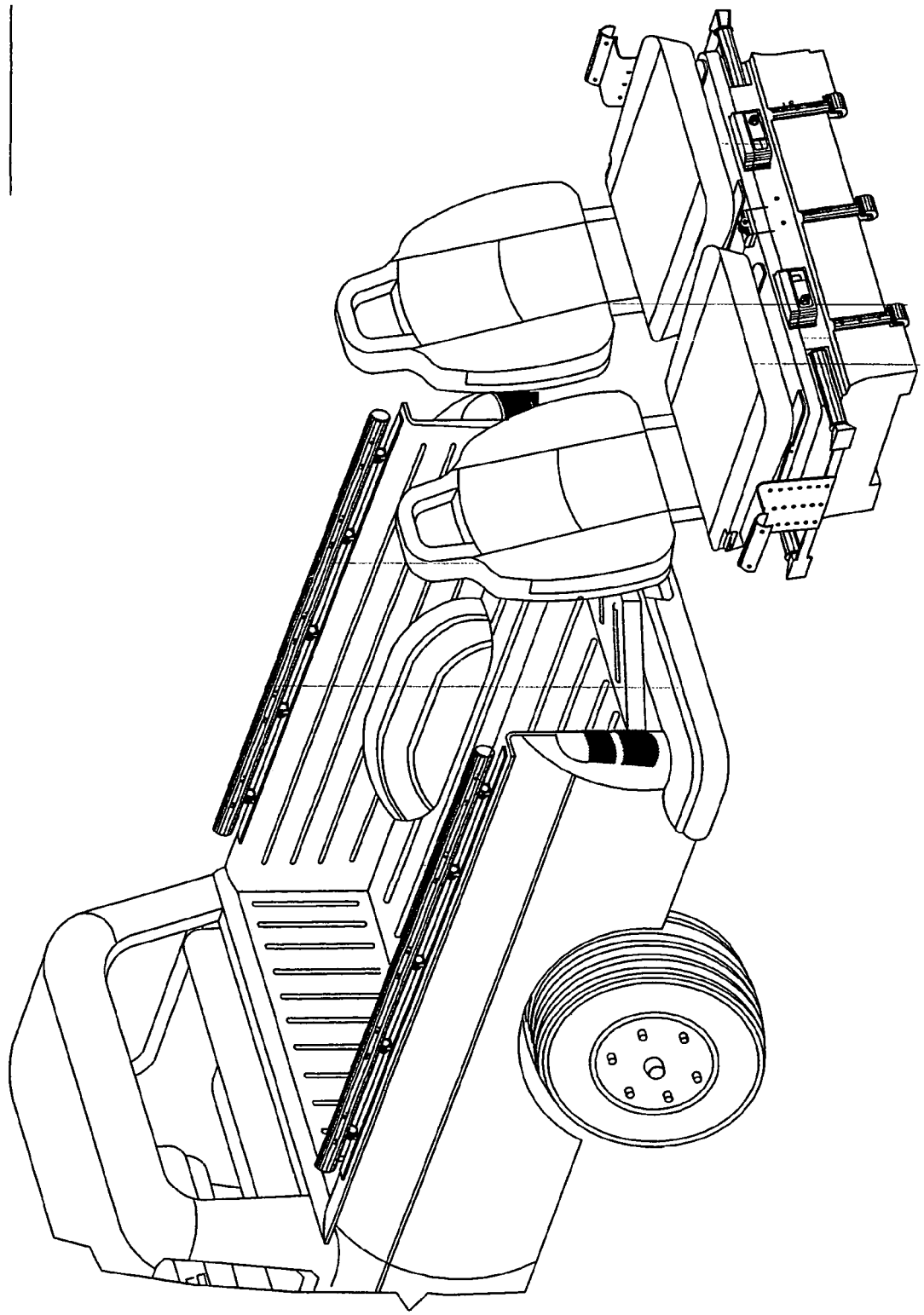
FIG. 4 shows the same apparatus illustrated in the previous FIGURES but off the truck bed. The apparatus can be rolled towards the rear of the truck to be removed from the truck bed for temporary storage at home or elsewhere.
Figure 5:
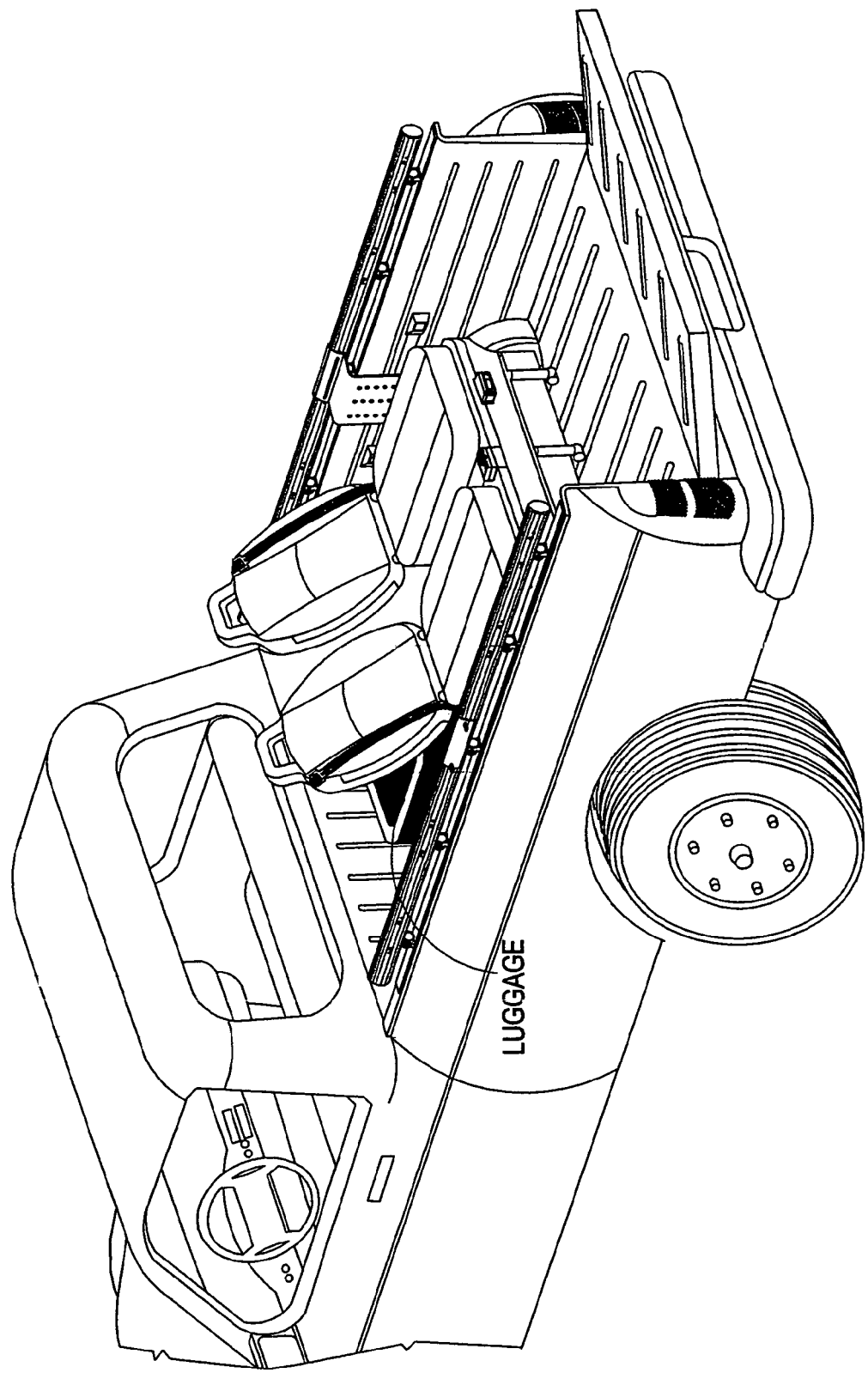
FIG. 5 shows a piece of luggage underneath the backrests. Pickup owners can recline the backrests and use a key to lock them in place to provide a safe temporary enclosure for possessions kept underneath the backrests.

FIG. 1 shows an apparatus on the bed of a pickup truck comprising of a pair of bucket seats with a trunk underneath. The trunk has two lids, each lid being also the base on which a seat is mounted. Therefore, when the trunk lids are opened, the cushioned seat bottoms on top are likewise pivoted backward and up. (See FIG. 6). And when the trunk lids are closed, said seat bottoms are likewise pivoted frontward and down, to rest in position for people to occupy the seats. (See FIG. 1). Each trunk lid has its own security lock which locks automatically when the trunk lid is closed. The seats have fully-reclinable backrests which also can be locked in place with a key on their reclining levers. (See FIG. 7). The backrests can be locked in place in any of several reclined positions to provide a safe temporary enclosure for possessions kept underneath said backrests in the open-topped pickup. (See FIG. 5).

Figure 8:
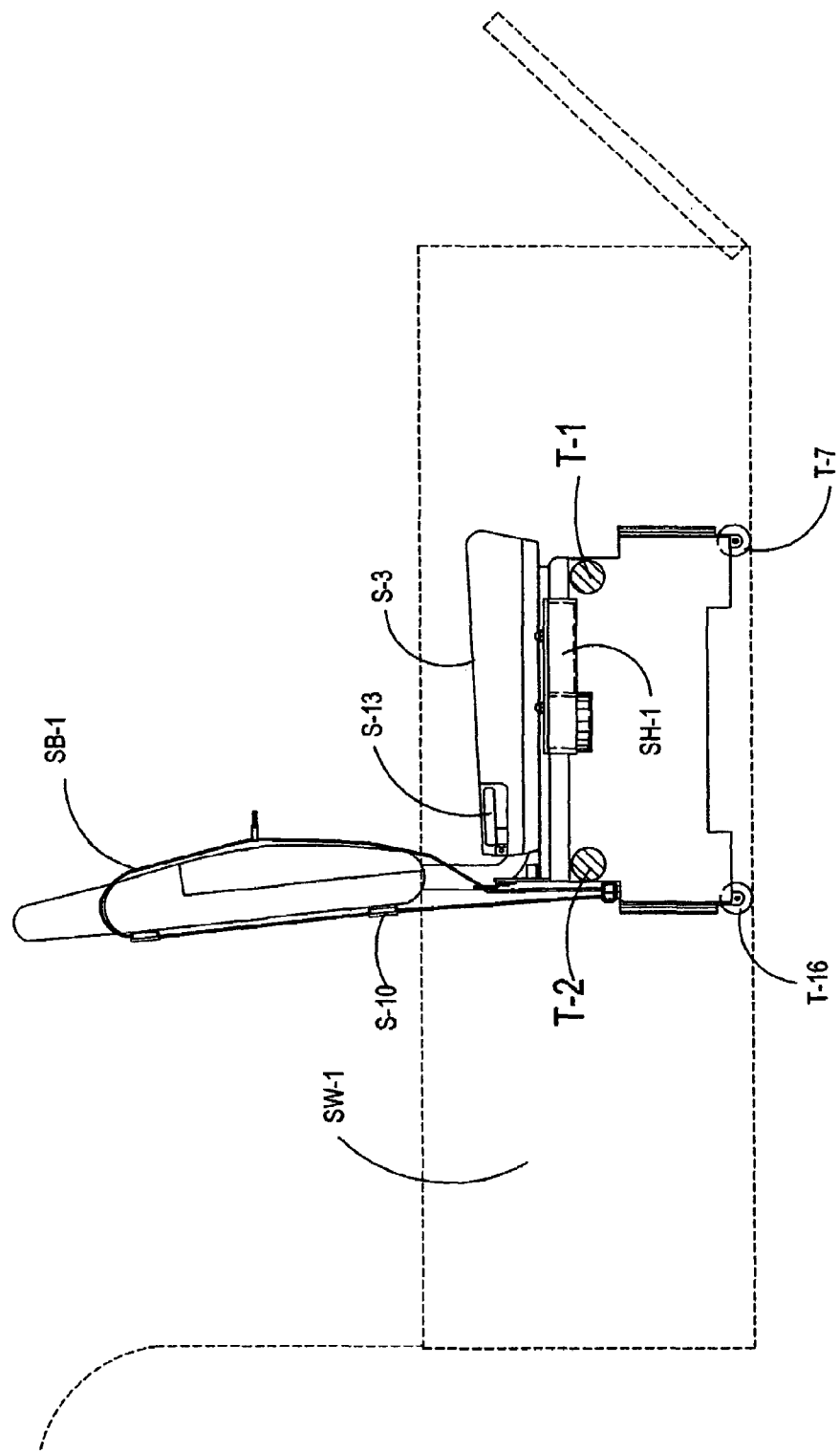
FIG. 8 shows front trunk tube T1 and rear trunk tube T2. These trunk tubes hold the double-ended telescopic arms shown in FIG. 9. The trunk tubes are located immediately under the trunk lids and extend from one side of the apparatus to another. This FIGURE additionally shows reclining lever S13 and seat bottom S3, trunk rollers T16 and T7, and fixed seat belt guides S9 and S10 in the rear part S7 of backrest S1. Head rest S5 and seat belt SB1 are also illustrated.

Also, the trunk has two hollow trunk tubes immediately under its two lids, one in the front and one in the rear, extending from one side of the trunk to the other. Front trunk tube T1 and rear trunk tube T2 are shown in FIG. 8.

Figure 9:
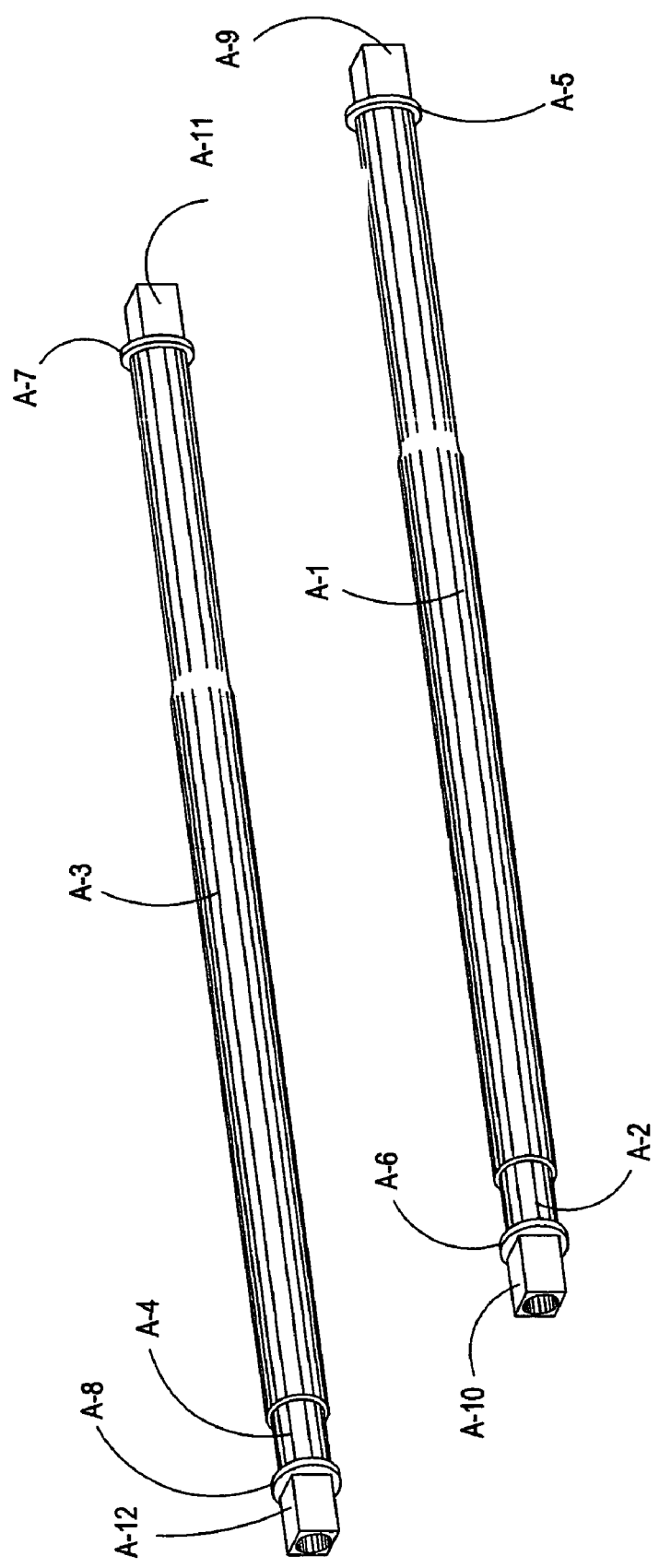
FIG. 9 shows both double-ended telescopic arms, comprising front main tube A1 partially enclosing front inner tube A2 and rear main tube A3 partially enclosing rear inner tube A4.
Figure 10:
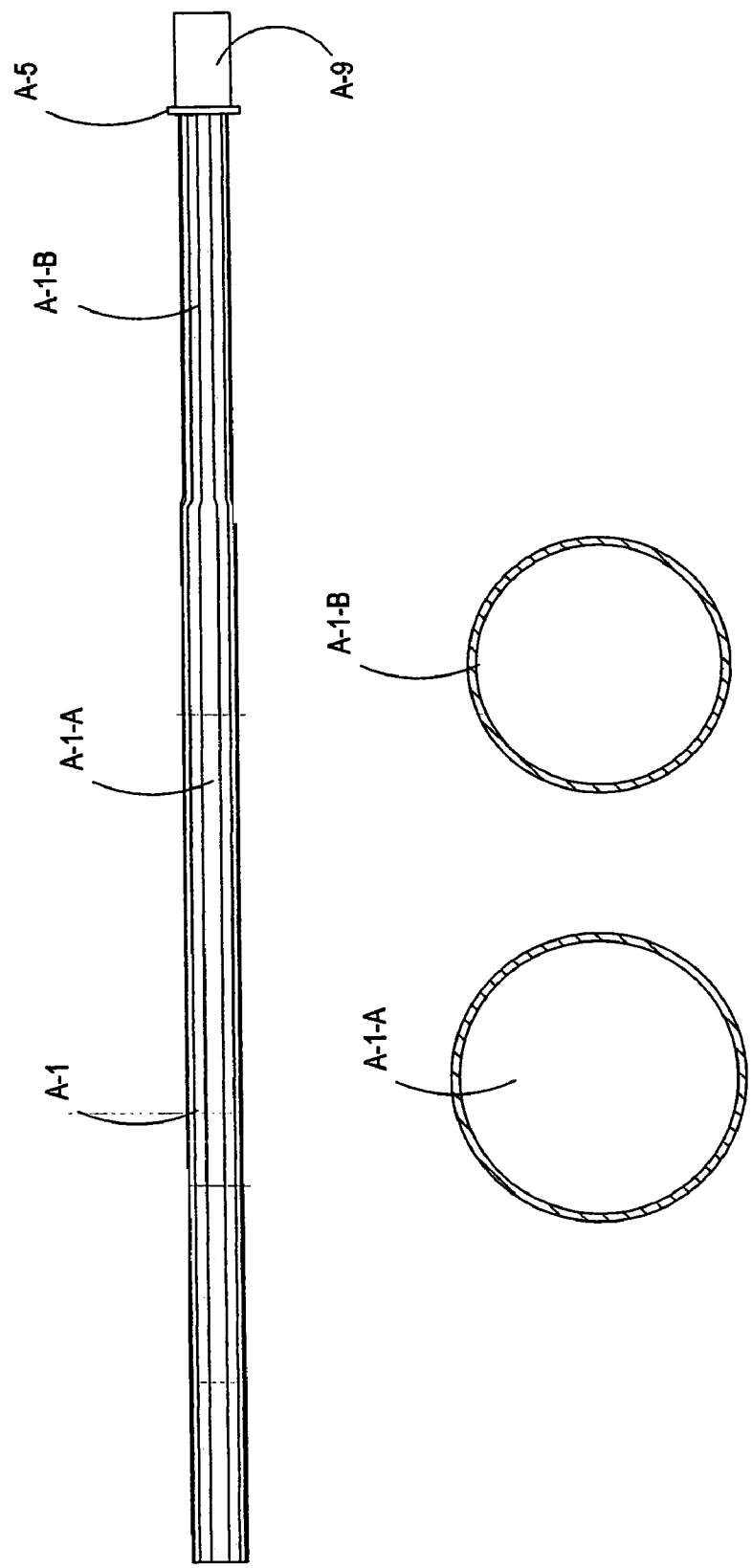
FIG. 10 shows front main tube A1 and its long wide segment A1-A and short thin segment A1-B, as well as end-disk A5 and end-block A9.
Figure 11:
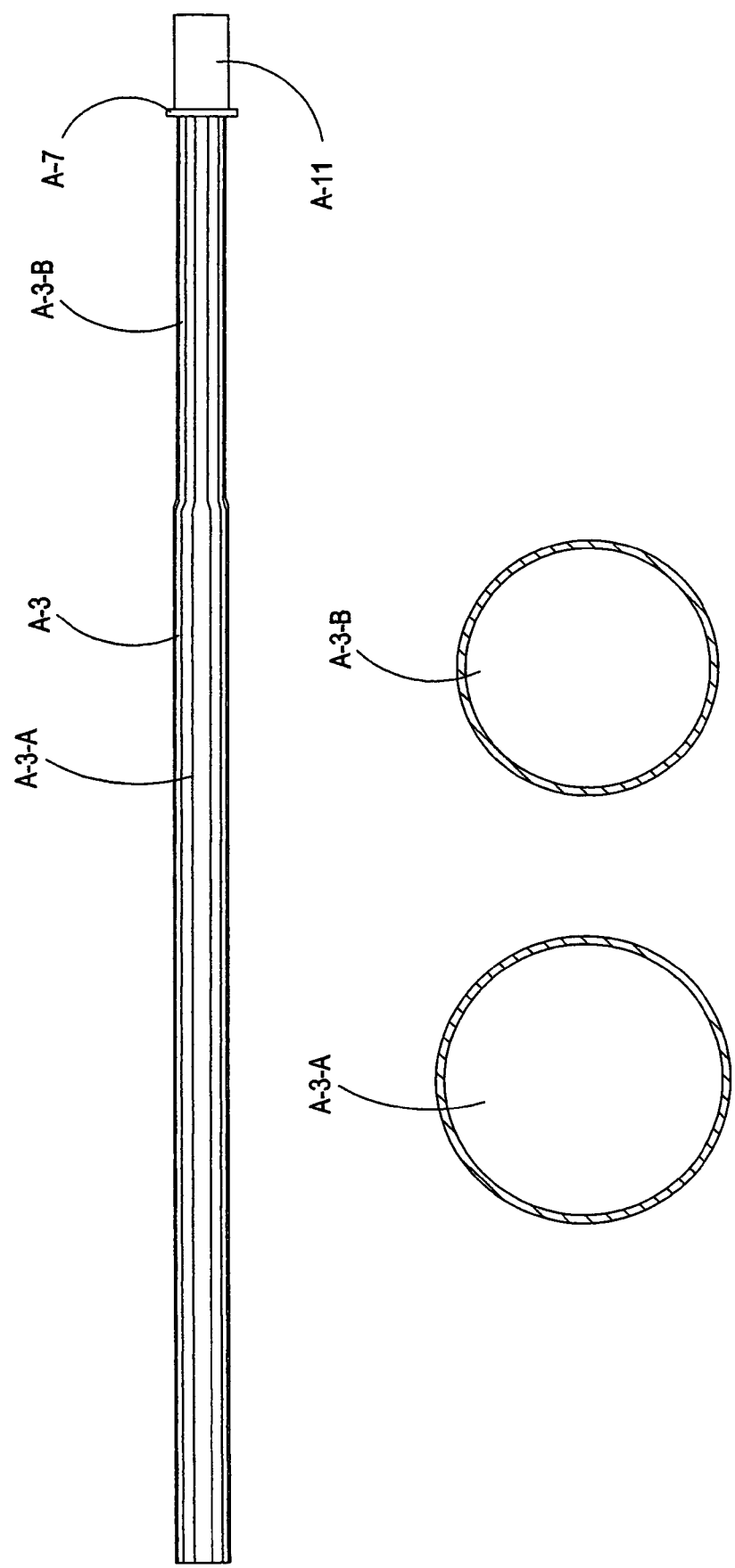
FIG. 11 shows rear main tube A3 and its long wide segment A3-A and short thin segment A3-B, as well as end disk A7 and end-block A11.
Figure 12:
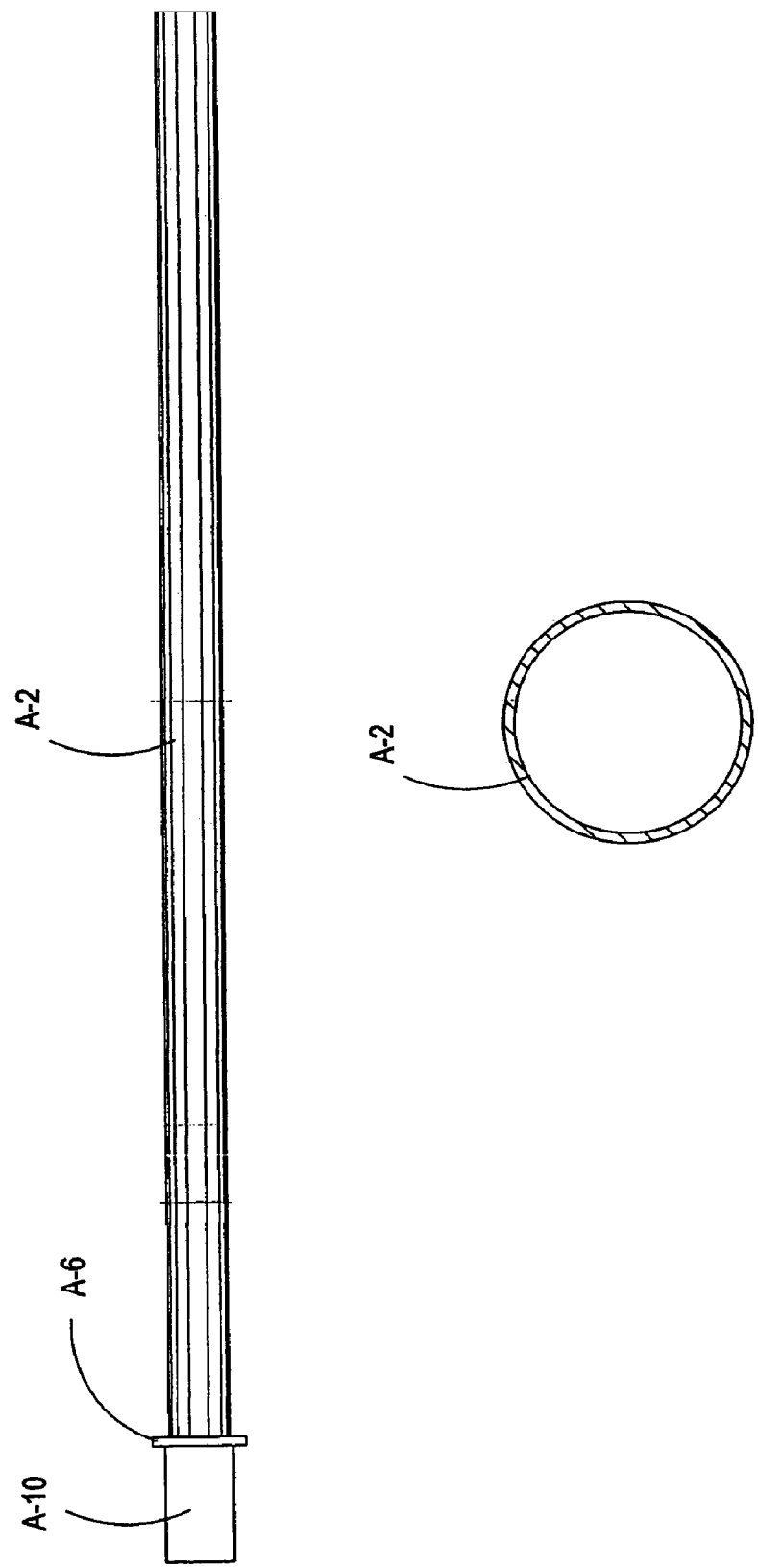
FIG. 12 shows front inner tube A2 and its end-disk A6 and end-block A10. This tube has the same diameter as the short thin segment of front main tube A1, and can thus be enclosed only by the long wide segment of said tube.
Figure 13:
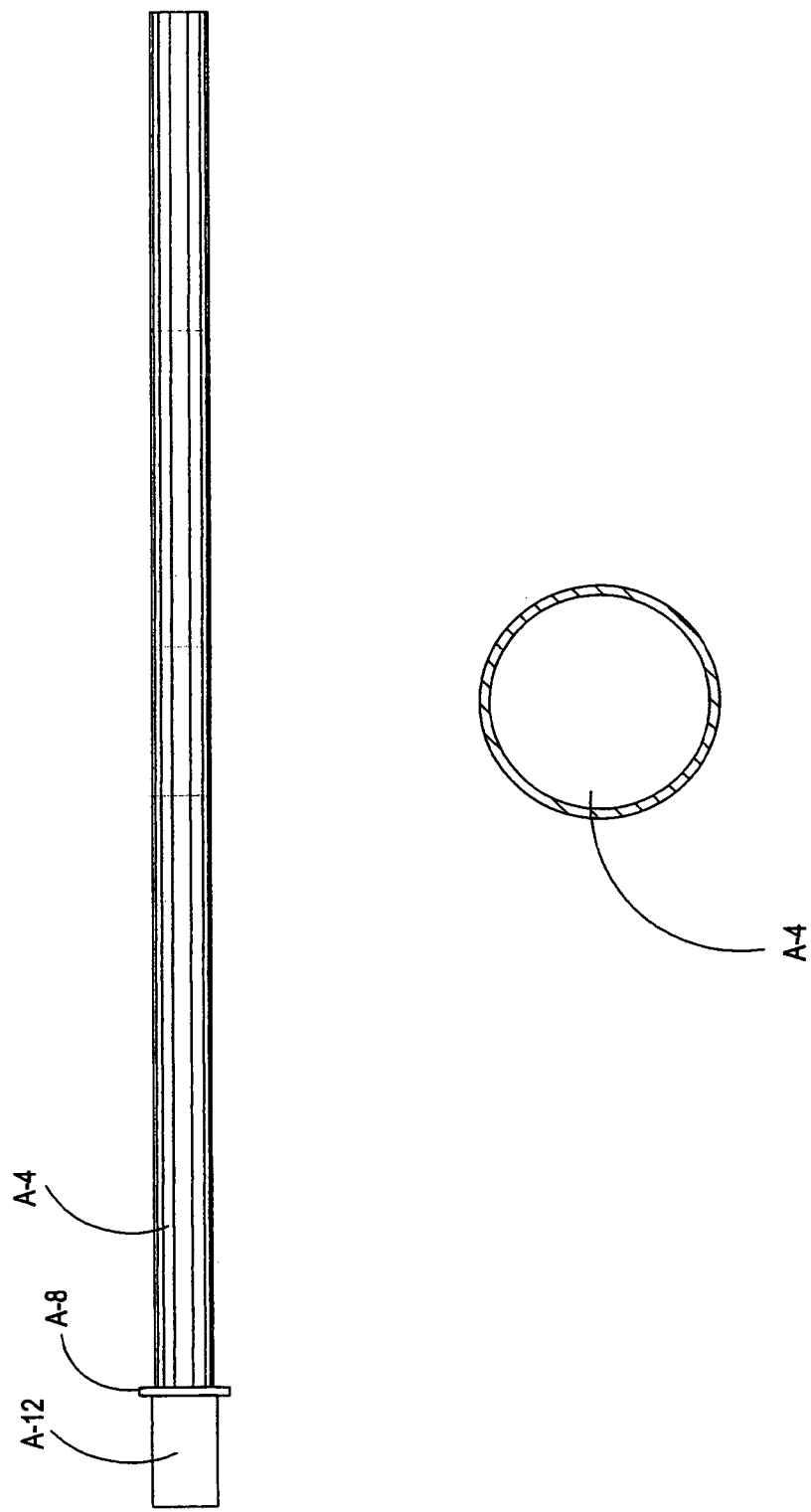
FIG. 13 shows the rear inner tube A4 and its end-disk A8 and end-block A12. This tube has the same diameter as the short thin segment of rear main tube A3, and can thus be enclosed only by the long wide segment of said tube.
Figure 14:
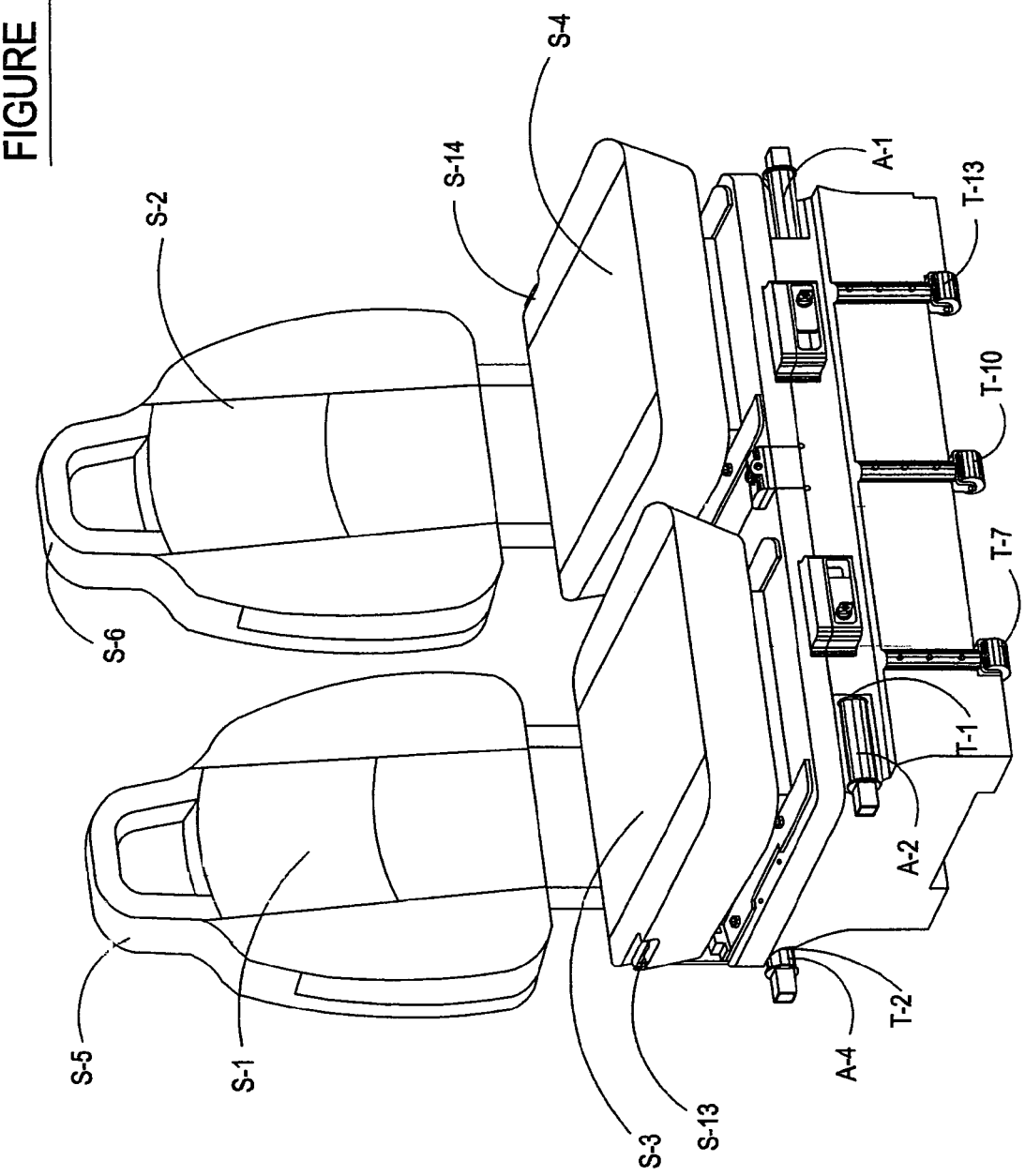
FIG. 14 shows the front side of the apparatus and three of its four end-disks and end-blocks extending outwardly from the trunk. Front inner tube A2 and rear inner tube A4 extend outwardly towards side panel SW1 (not shown). The FIGURE additionally shows front trunk rollers T7, T10, and T13, seat bottoms S3 and S4, backrests S1 and S2 and headrests S5 and S6.
Figure 15:
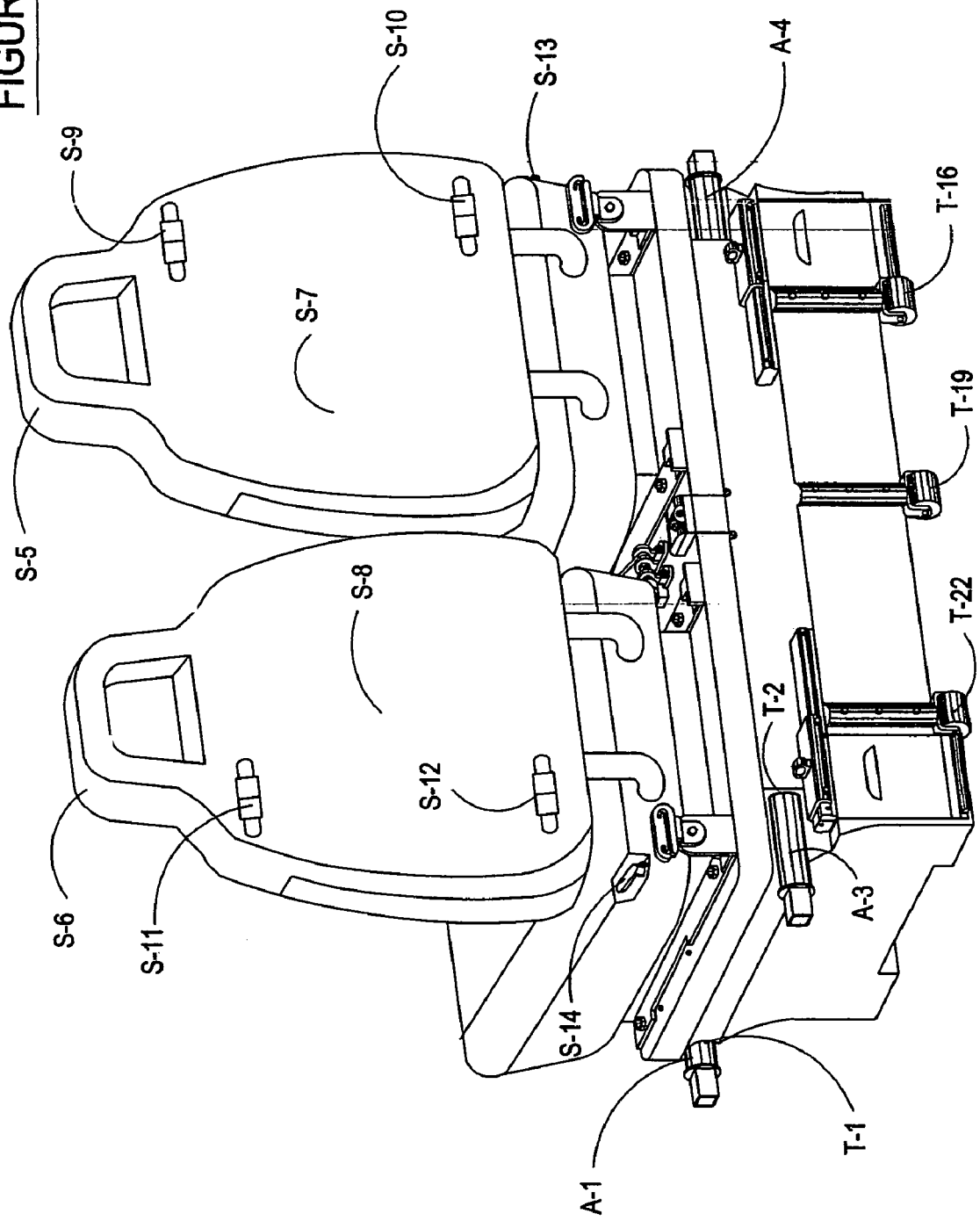
FIG. 15 shows the rear side of the apparatus and three of its four end-disks and end-blocks extending outwardly from the trunk. Front main tube A1 and rear main tube A3 extend outwardly towards side panel SW2 (not shown). The FIGURE additionally shows rear trunk rollers T16, T19, and T22, rear backrest parts S7 and S8, and their respective seat belt guides S9, S10, S11 and S12. Head rests S5 and S6 are also identified.
Figure 16:
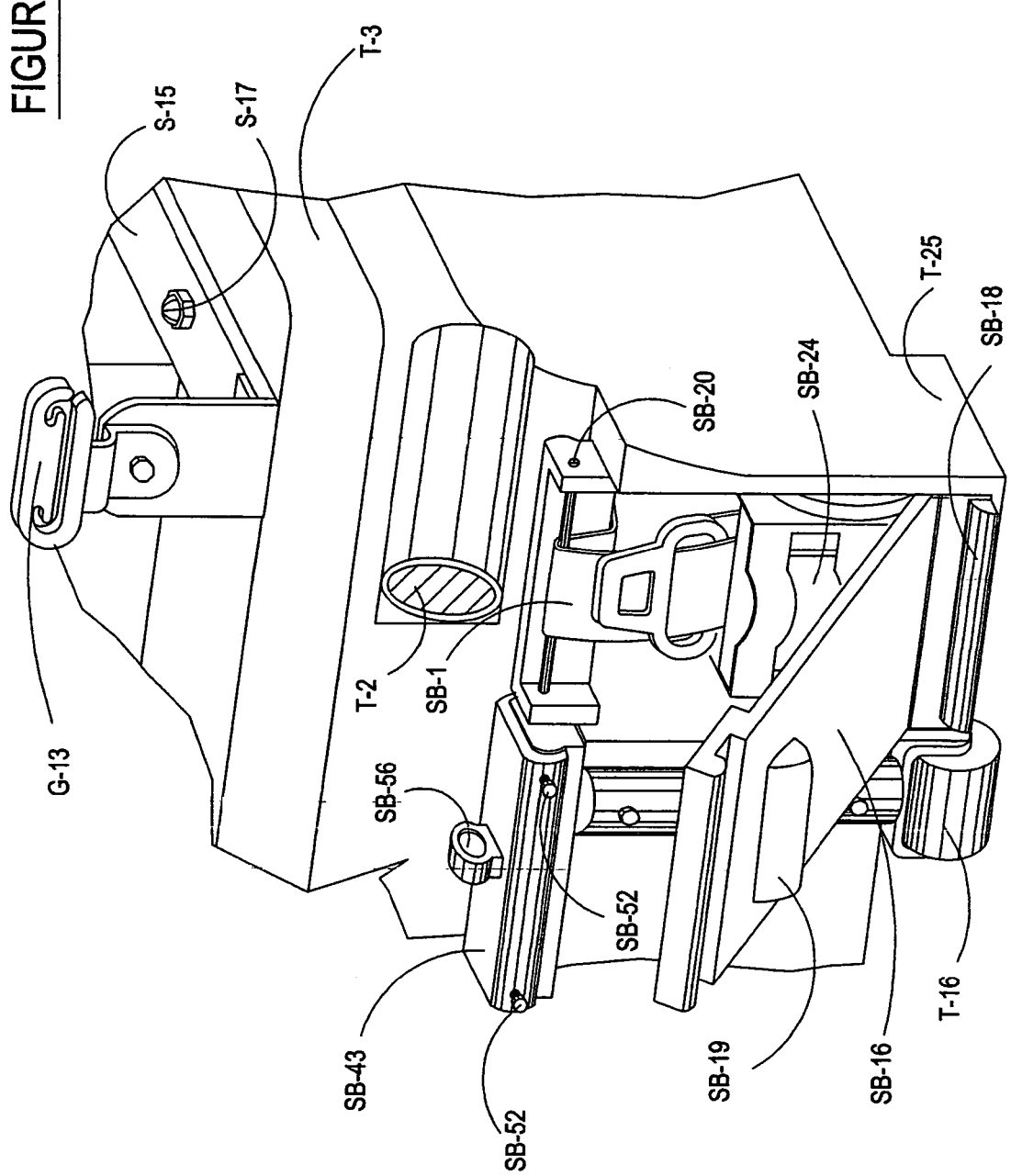
FIG. 16 shows a seat belt catch on the rear corner of the apparatus next to side panel SW1 (see side panel SW1 in FIG. 6). The seat belt catch has a lid SB16 to replace the seat belt and the reel inside at any time. Also illustrated in this FIGURE are rear trunk tube T2, trunk lid T3, swingable seat belt guide G13, catch-slide SB43 and rear trunk roller T16.
Figure 17:
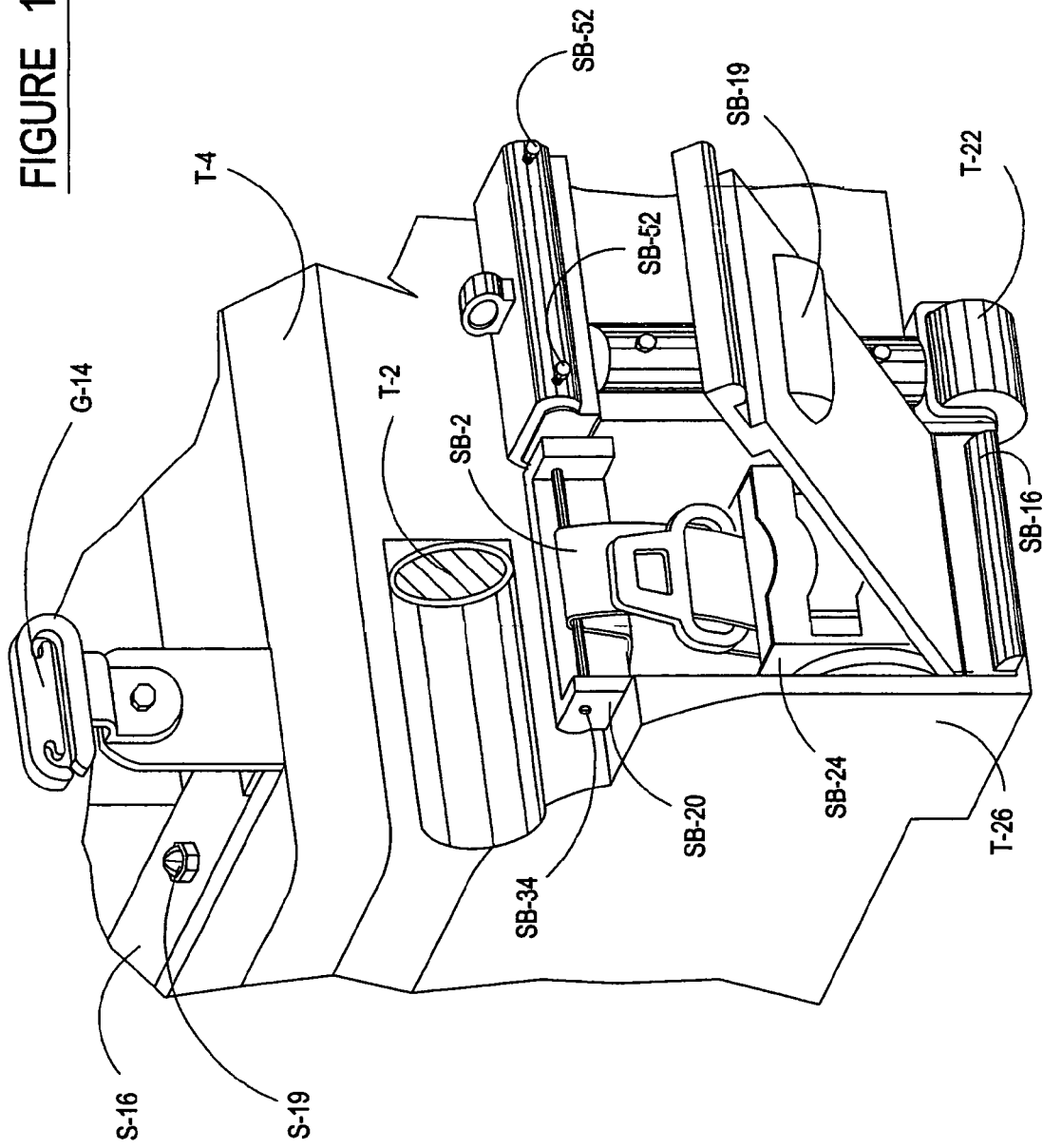
FIG. 17 shows a seat belt catch on the rear corner of the apparatus next to side panel SW2 (see side panel SW2 in FIG. 6). This seat belt catch is identical to the catch on the rear corner of the apparatus next to side panel SW1. Also illustrated in this FIGURE are rear trunk tube T2, swingable seat belt guide G14, trunk lid T4 and trunk roller T22.
Figure 18:
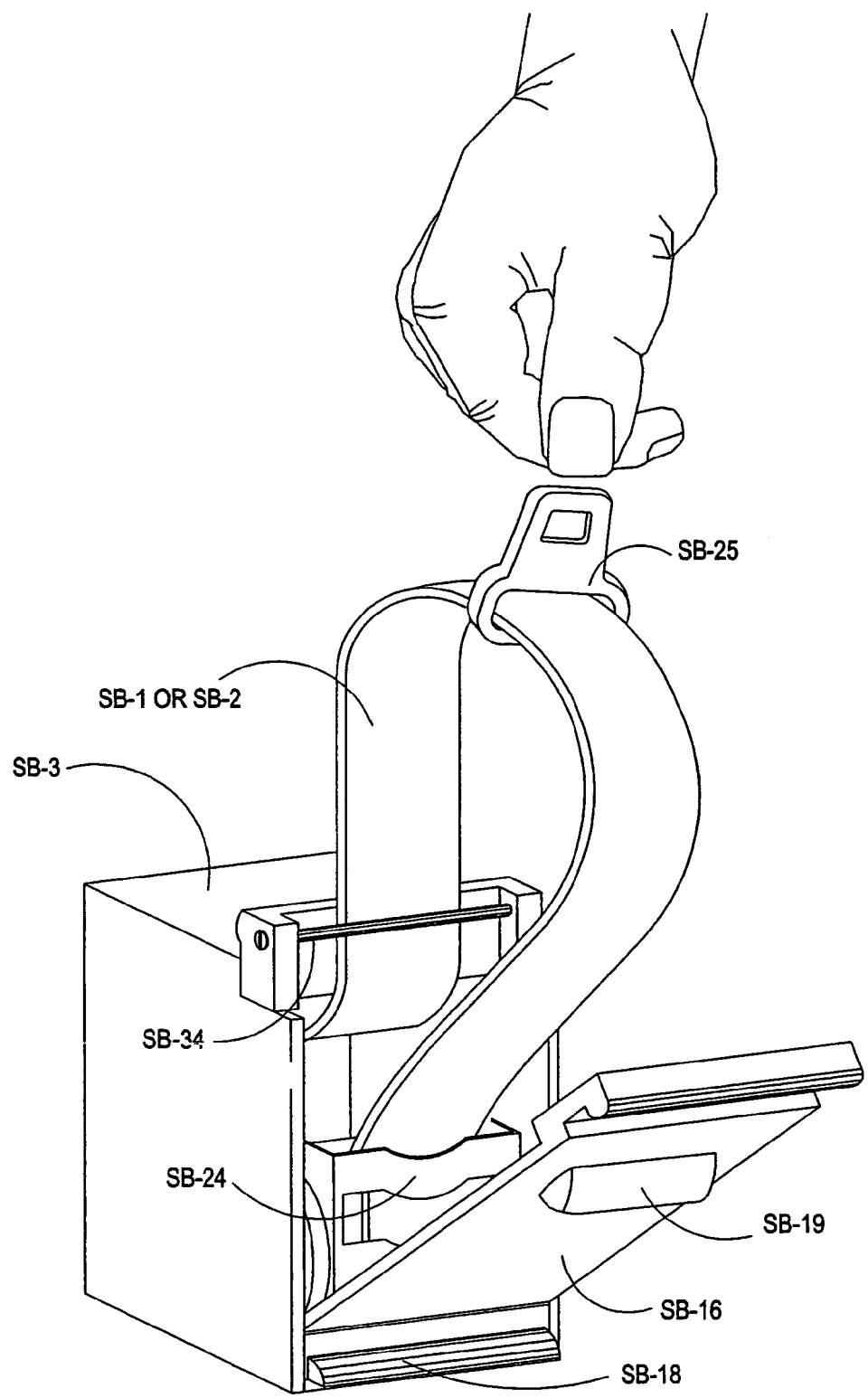
FIG. 18 shows seat belt SB1 or SB2 unwinding in a loop, secured from one end to reel SB24 in which it is recoiled and from another end to the rear wall of seat belt catch SB3. The seat belt catch has a removably secured retainer or bolt SB34 to keep the seat belt untangled. Also illustrated in this FIGURE are seat belt buckle SB25, catch lid SB16, and shield SB18 for the drainage outlet of catch SB3.
Figure 19:
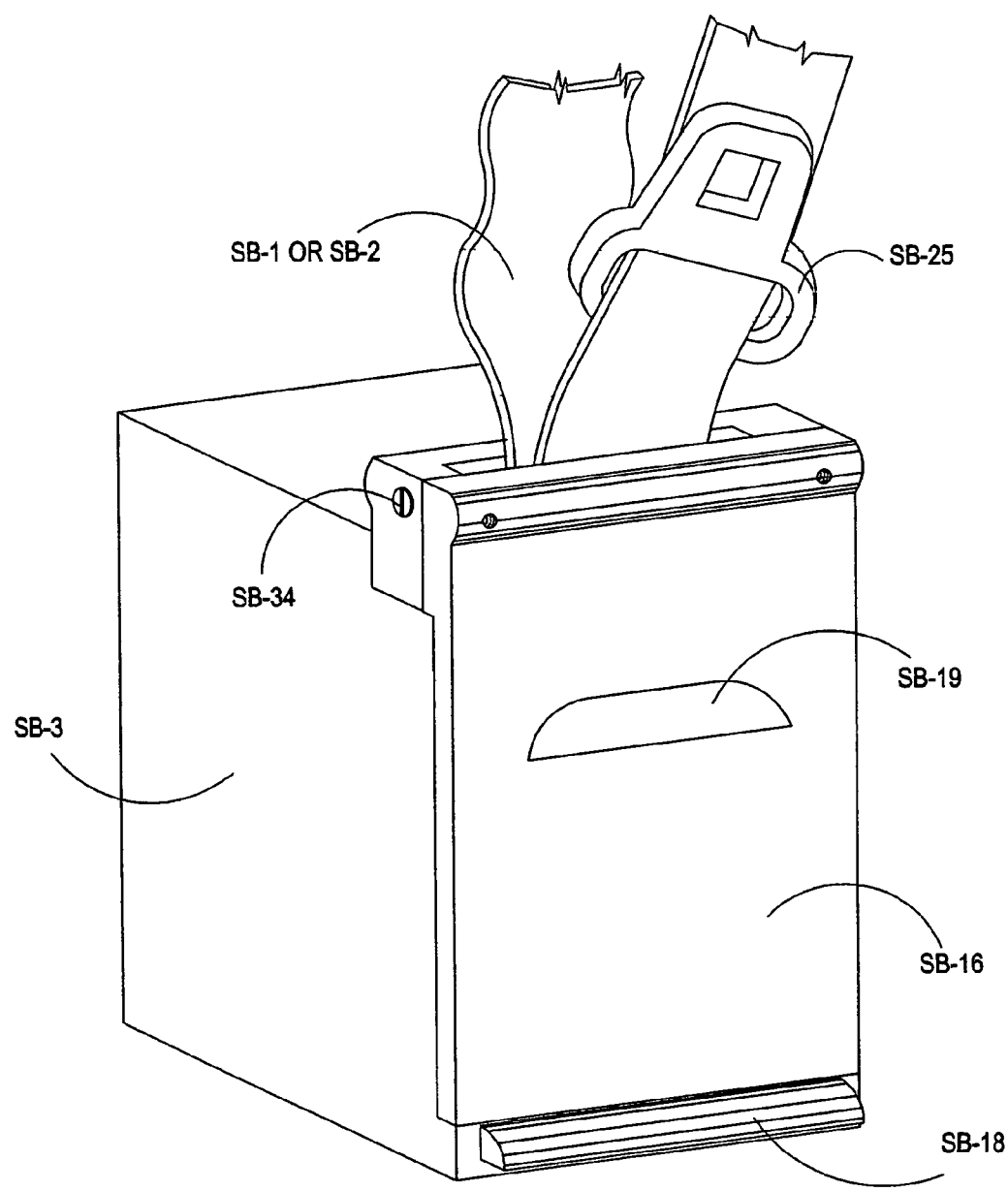
FIG. 19 shows seat belt SB1 or SB2 unwinding with catch lid SB16 closed. The seat belt unwinds through a small seat belt opening in catch SB3 with retainer or bolt SB34 in the middle. Also shown in this FIGURE are buckle SB25, grasp SB19, and shield SB18.
Figure 20:
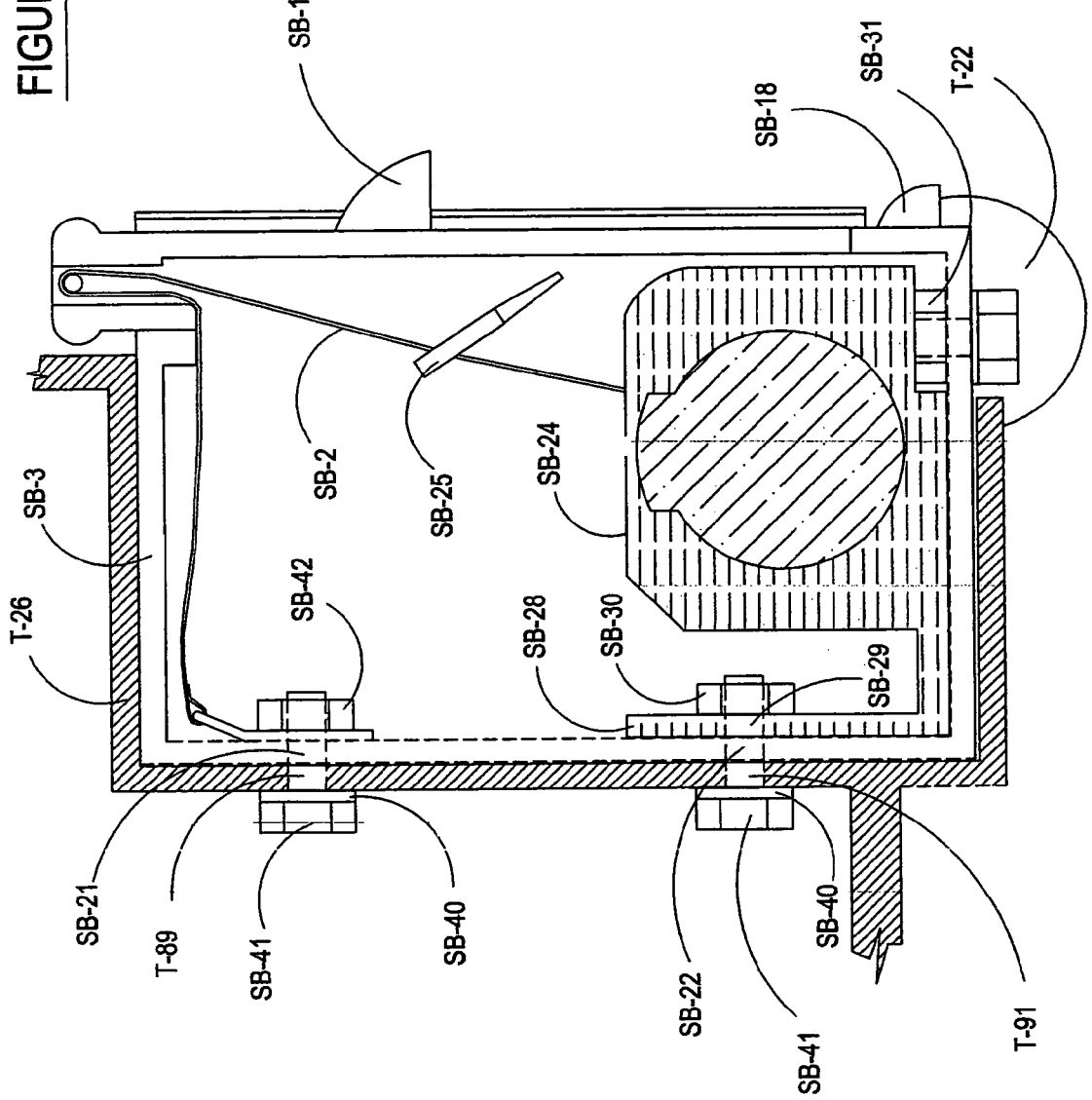
FIG. 20 is a side view of seat belt catch SB3 secured with bolts to a recess on the bottom of the rear corner of the trunk next to side panel SW2. The seat belt appears recoiled inside the catch except for the small segment passing over bolt SB34 (not identified). Also shown in this FIGURE are reel SB24, rear trunk roller T22, grasp SB19, shield SB18, and buckle SB25.
Figure 21:
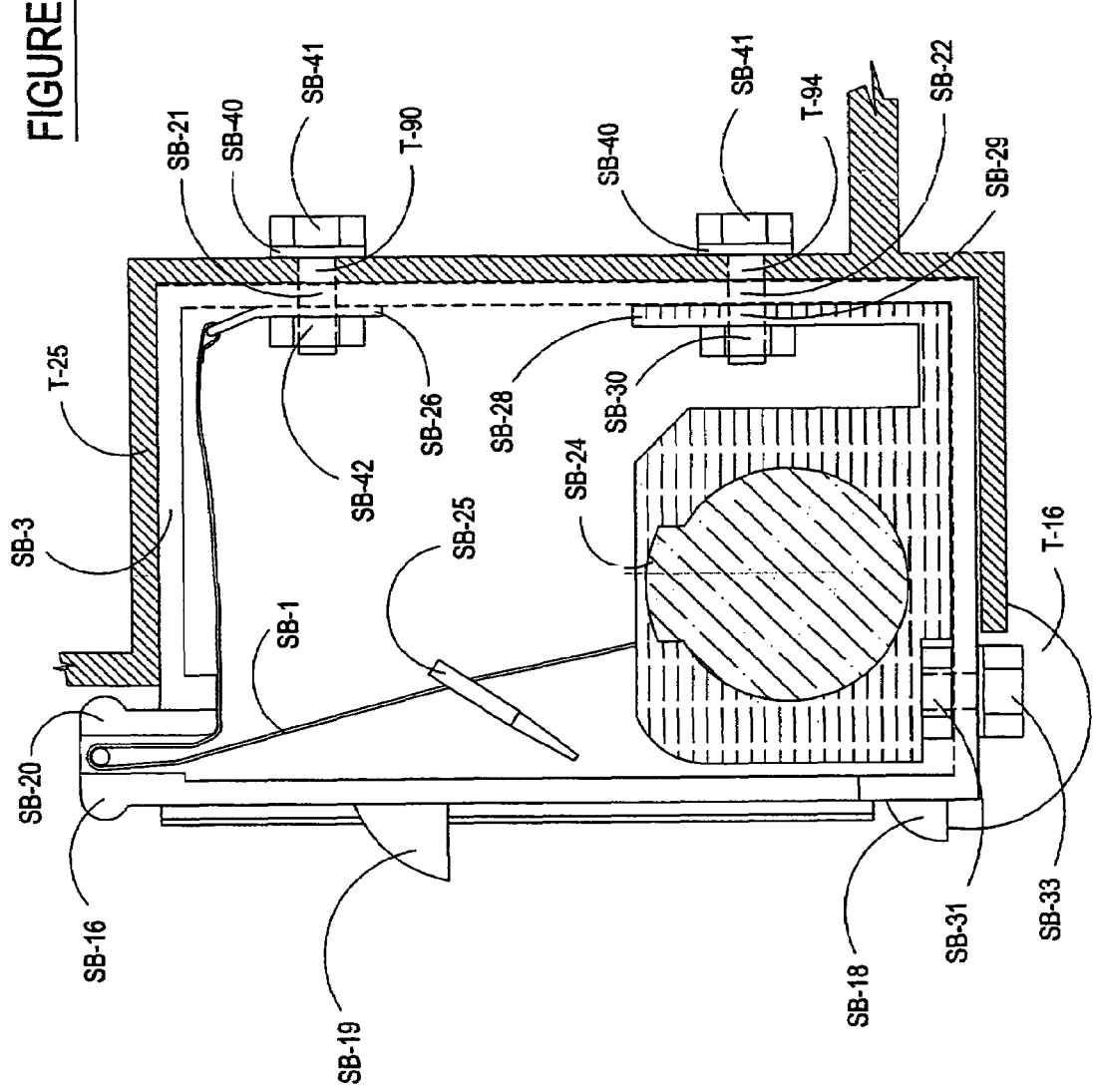
FIG. 21 is a side view of seat belt catch SB3 secured with bolts to a recess on the bottom of the rear corner of the trunk next to side panel SW1. As in the previous FIGURE, the seat belt appears recoiled inside the catch except for the small segment passing over bolt SB34 (not identified). Also shown in this FIGURE are reel SB24, trunk roller T16, grasp SB19, and shield SB18.

Front trunk tube T1 is designed to hold a double-ended telescopic arm comprised of front main tube A1 partially enclosing front inner tube A2. Rear trunk tube T2 is likewise designed to hold a second double-ended telescopic arm comprised of rear main tube A3 partially enclosing rear inner tube A4. See FIG. 9. As further shown in FIGS. 10 and 11, both front main tube A1 and rear main tube A3 have a long wide segment (A1-A and A3-A respectively) and a short thin segment (A1-B and A3-B respectively). Inner tubes A2 and A4 shown in FIGS. 12 and 13 have the same diameter as these short thin segments and can therefore be enclosed only by the long wide segments. As further shown in FIG. 9, each end of these double-ended telescopic arms has an end-disk and an end-block. The front double-ended telescopic arm thus has end-disk A5 and end-block A9 on one end, and end-disk A6 and end-block A10 on the other; while the rear double-ended telescopic arm has end-disk A7 and end-block A11 on one end, and end-disk A8 and end-block A12 on the other. In FIGS. 14 and 15 these end-disks and end-blocks are shown on opposite sides of the trunk while the long wide segments of front main tube A1 and rear main tube A3 (not shown) remain inside front trunk tube T1 and rear trunk tube T2, partially enclosing front inner tube A2 and rear inner tube A4, respectively. The trunk has a seat belt catch SB3 on each rear corner, one for each seat. (See FIGS. 16, 17, 18, 19, 20 and 21). Each seat belt catch holds a seat belt SB1 or SB2 and a reel SB24 with retractable means to recoil the seat belt automatically.

Figure 22:
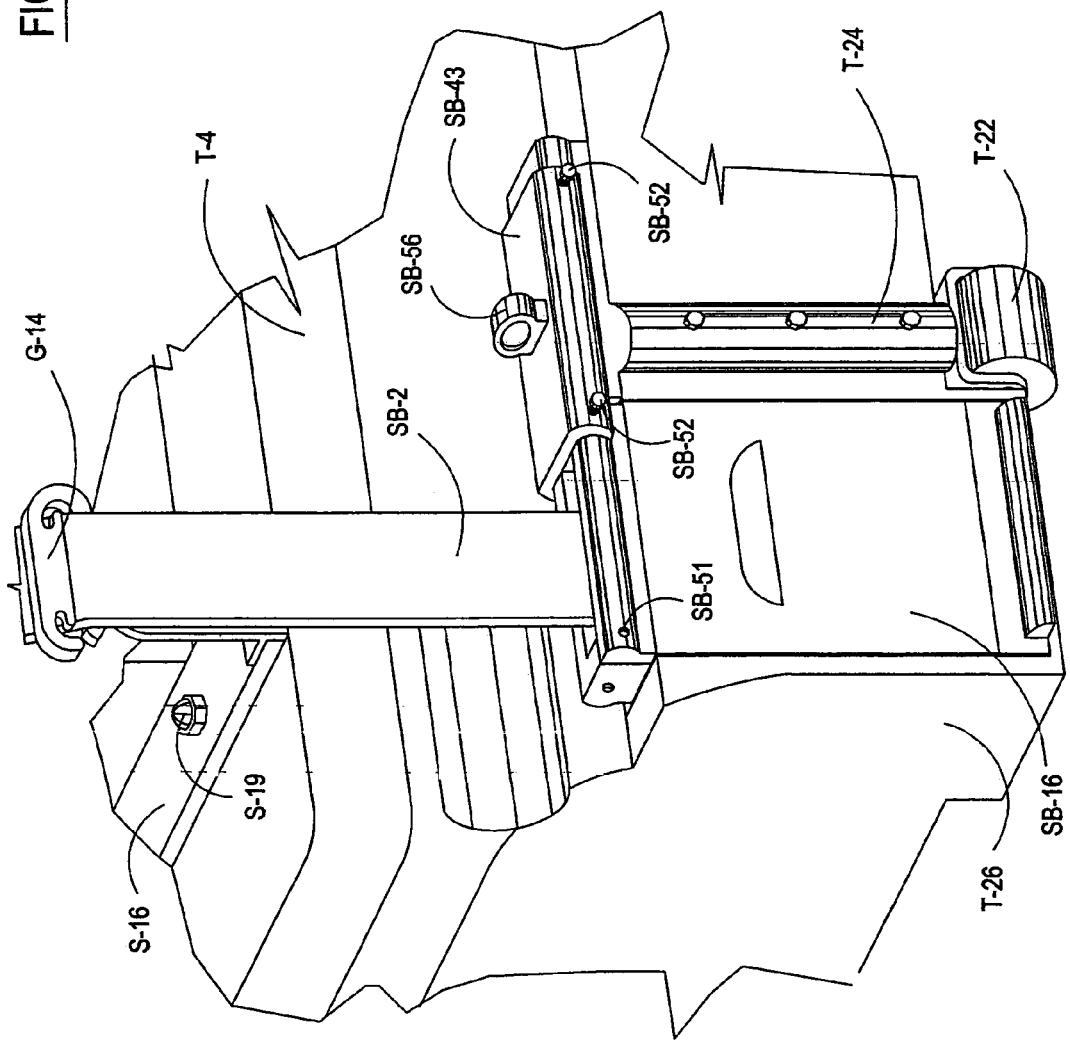
FIG. 22 shows seat belt SB2 unwound in the rear corner of the trunk next to side panel SW2, passing through swingable seat belt guide G14 in the rear of trunk lid T4. Also shown in this FIG. are trunk roller T22, catch lid SB16, and catch-slide SB43.
Figure 23:
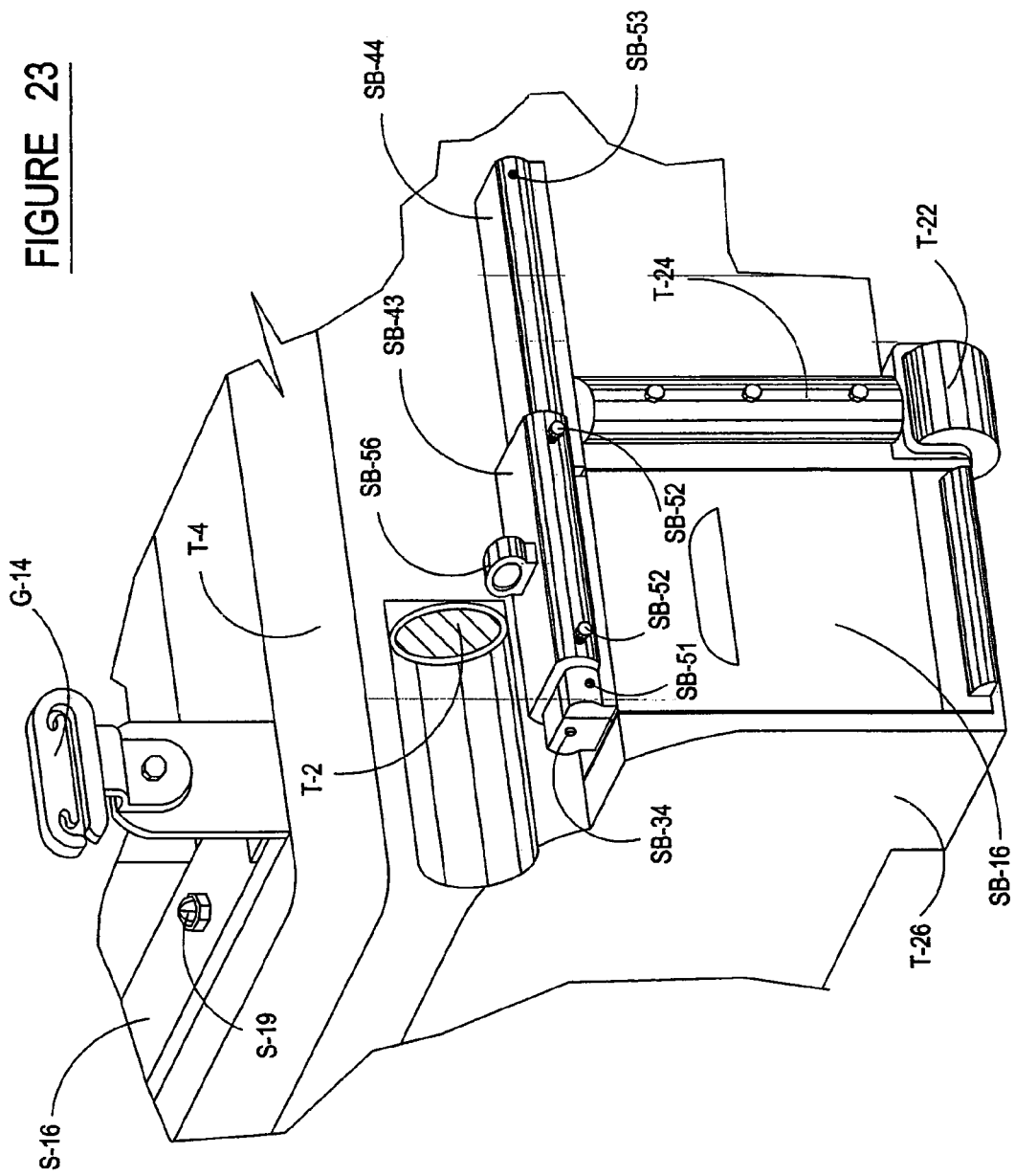
FIG. 23 shows the same seat belt catch of the previous FIGURE with seat belt SB2 (not shown) recoiled inside the catch and the small seat belt opening covered by catch-slide SB43. Swingable seat belt guide G14 on the rear of trunk lid T4 is also shown (without the seat belt).
Figure 24:
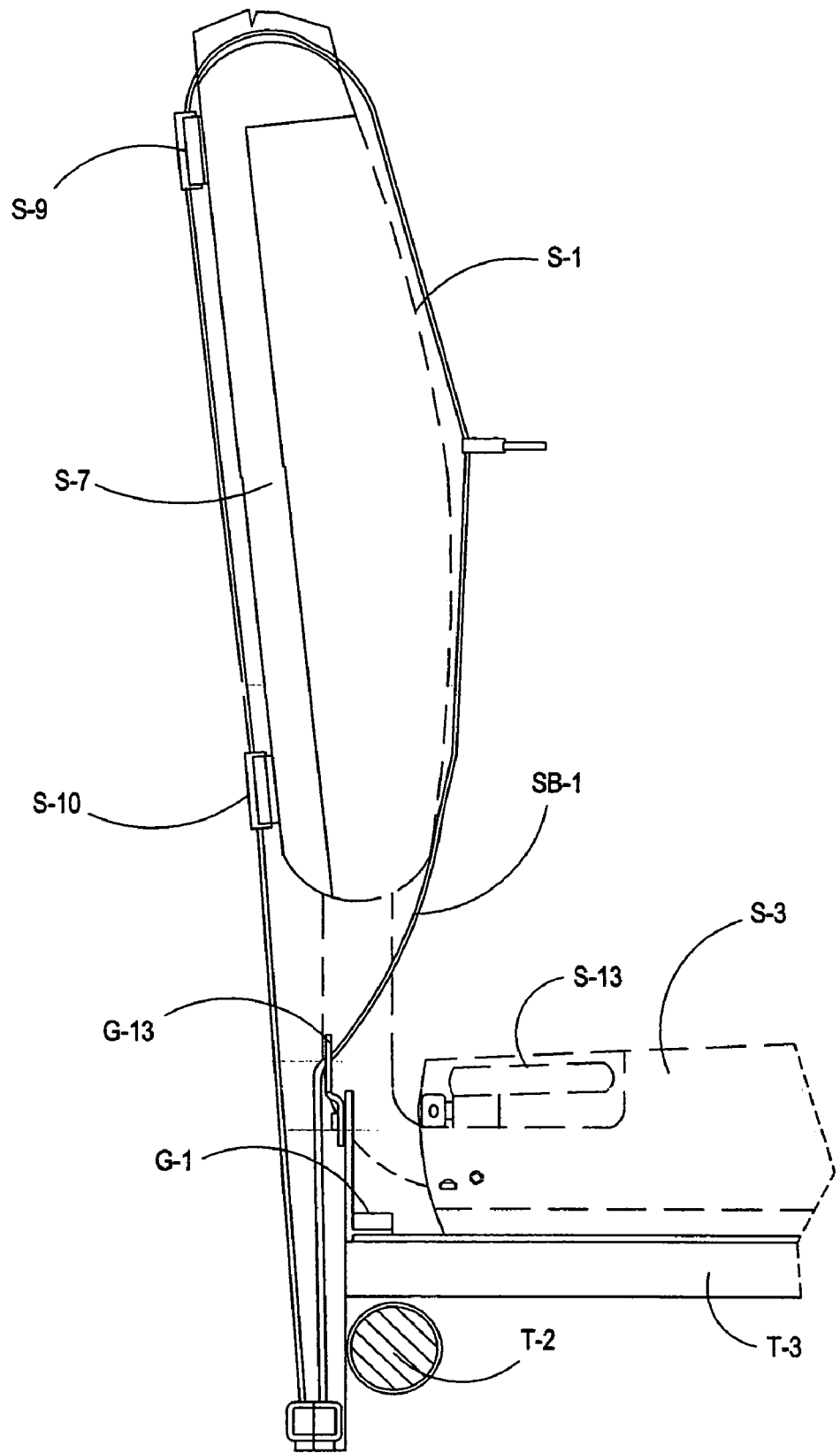
FIG. 24 shows seat belt SB1 of the seat next to side panel SW1 half-way unwound and stretched over the respective backrest. The seat belt unwinds in a loop with one segment going up directly behind the backrest and the other segment turning under the backrest to go up in front thereof. The belt is guided by three seat belt guides, a swingable guide G13 in the rear of trunk lid T3 and two fixed guides S10 and S9 in rear part S7 of the backrest. This FIGURE additionally shows rear trunk tube T2 and reclining lever S13.
Figure 25:
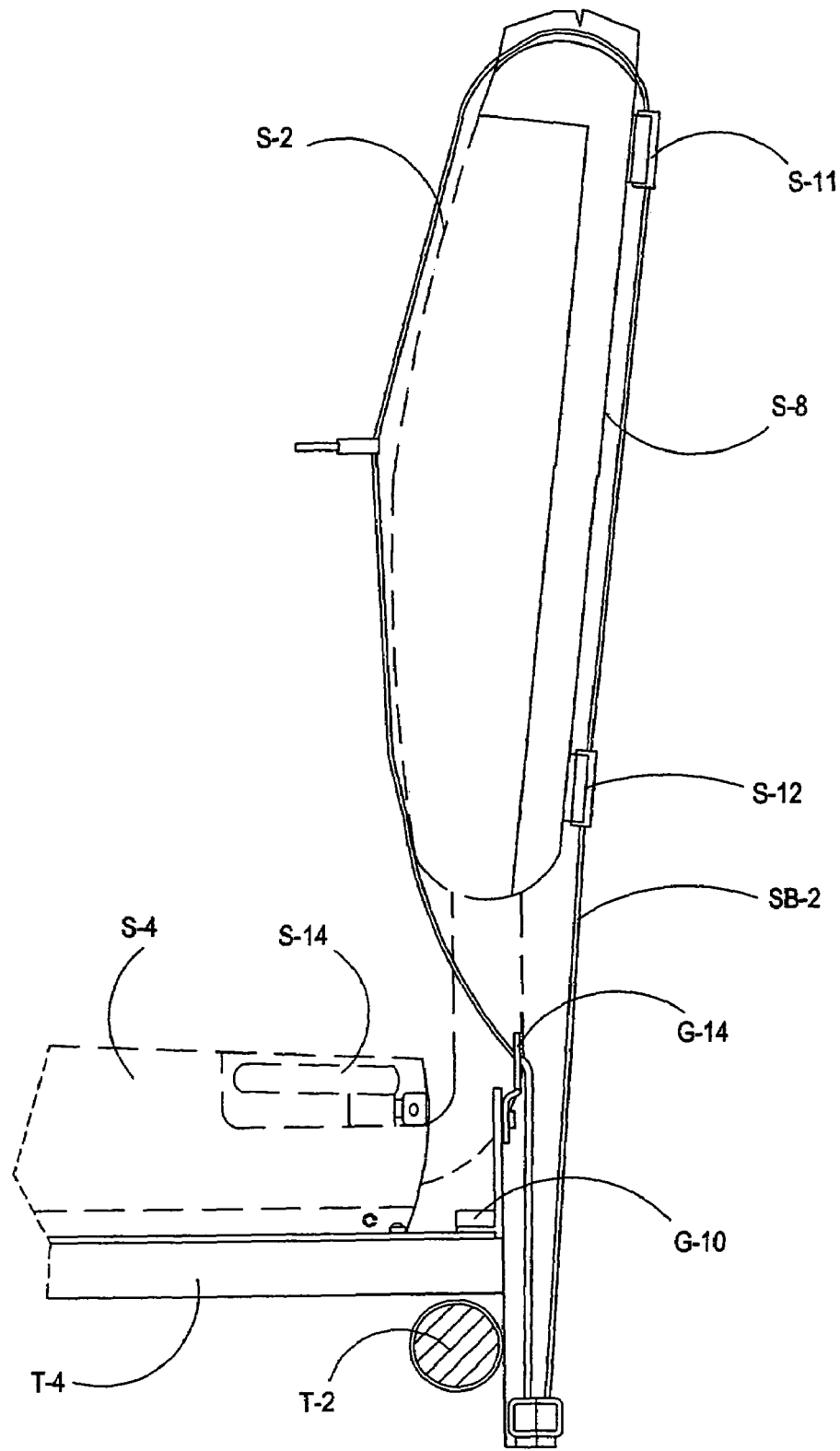
FIG. 25 shows seat belt SB2 of the seat next to side panel SW2 half-way unwound and stretched over the respective backrest. Like the seat belt of the previous FIGURE, this belt is guided by a swingable guide G14 in the rear of trunk lid T4 and two fixed guides S12 and S11 in rear part S8 of the backrest.
Figure 26:
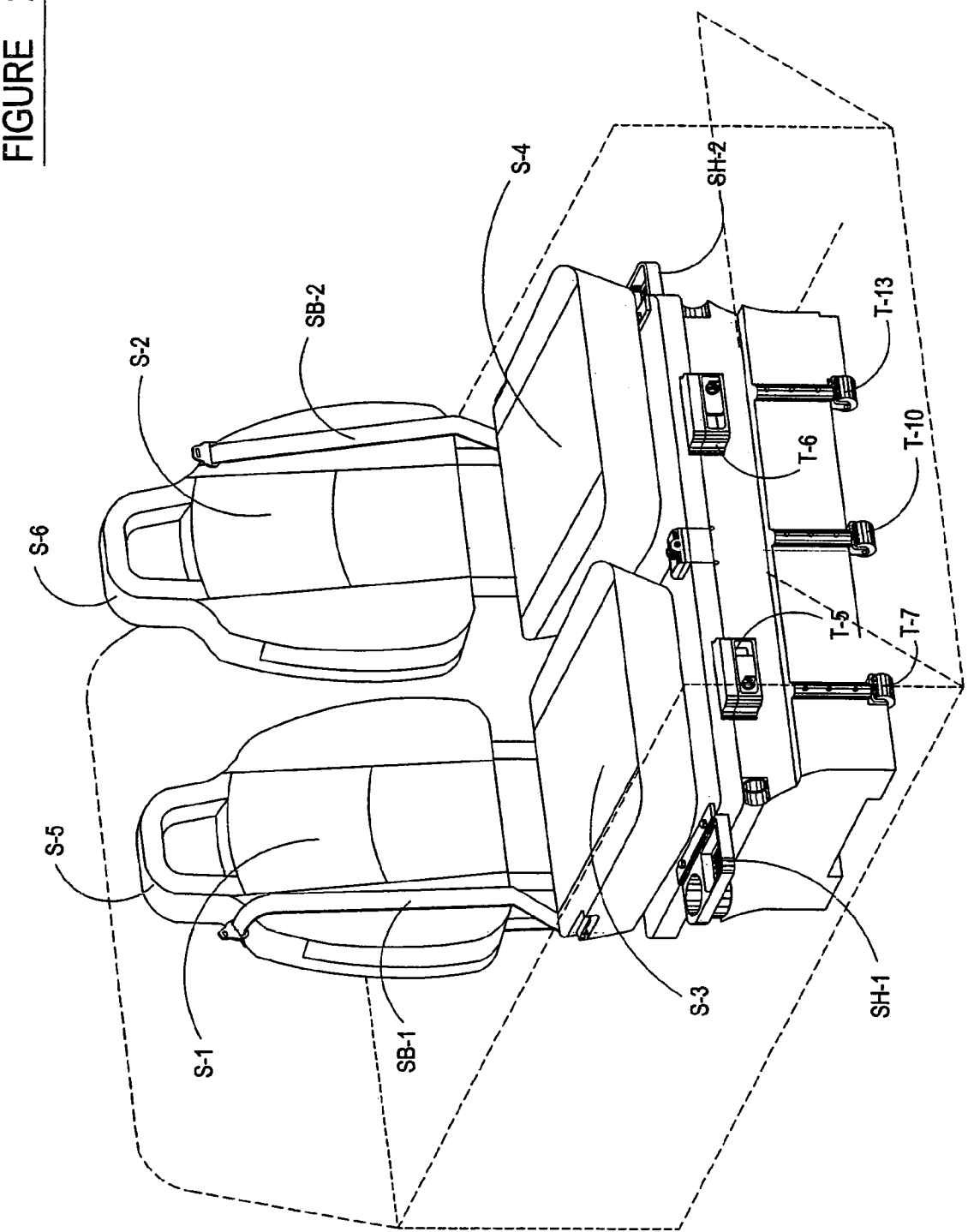
FIG. 26 shows seat belts SB1 and SB2 from the front of the apparatus. The seat belts are stretched over backrests S1 and S2. This FIGURE additionally shows seat bottoms S3 and S4, snack holders SH1 and SH2, trunk rollers T7, T10, and T13, security locks T5 and T6 for trunk lids T3 and T4 (not identified), and head rests S5 and S6.
Figure 27:
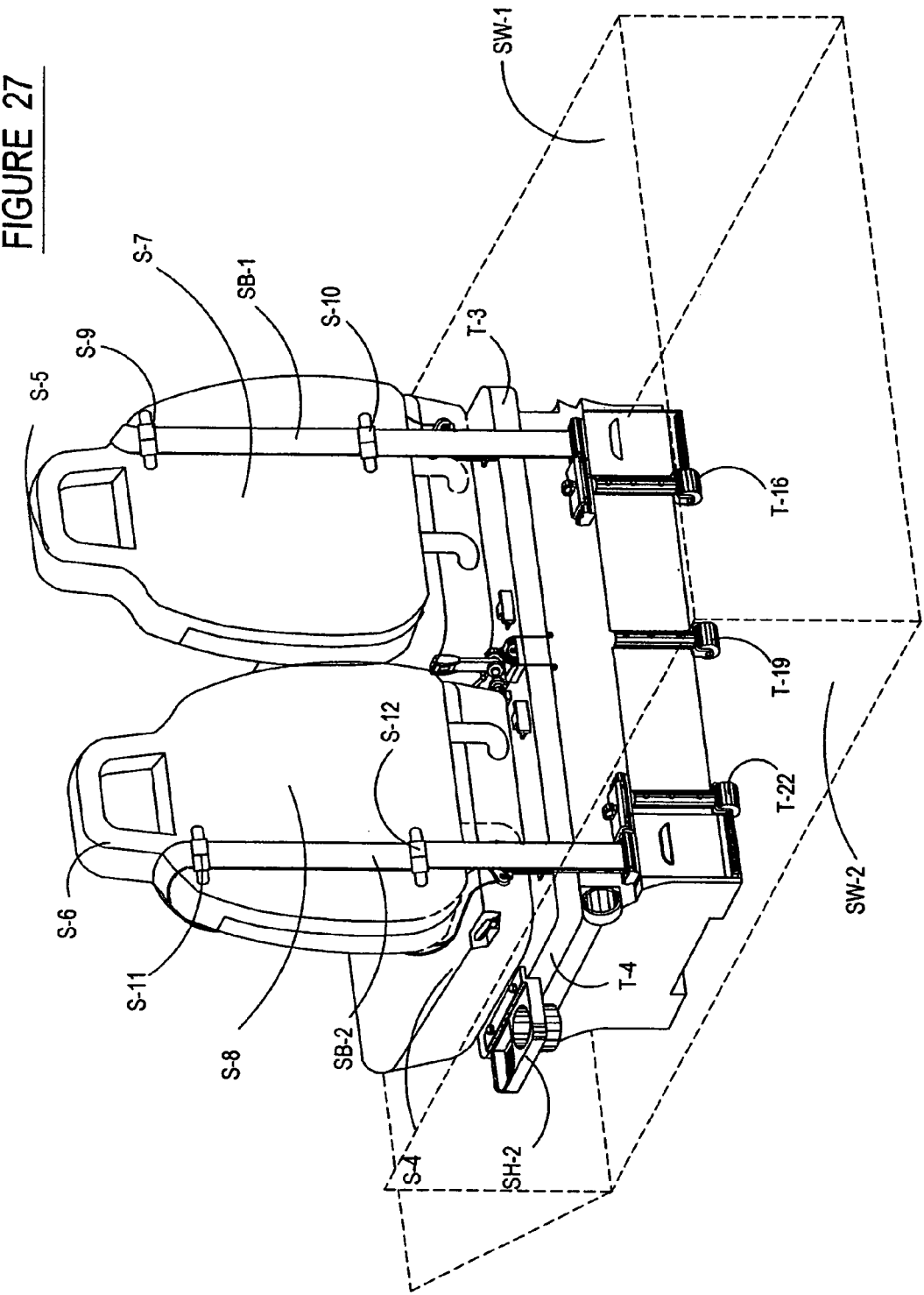
FIG. 27 shows seat belts SB1 and SB2 from the rear of the apparatus. Seat belt SB1 is shown guided by fixed seat belt guides S9 and S10 in rear part S7 of backrest S1 (not identified); and seat belt SB2 by fixed seat belt guides S11 and S12 in rear part S8 of backrest S2 (not identified). This FIGURE additionally shows snack holder SH2, rear trunk rollers T16, T19, and T22, seat bottom S4, headrests S5 and S6, trunk lids T3 and T4, and imaginary side panels SW1 and SW2.

The seat belt catch has a lid SB16 which can be opened to replace the seat belt and the reel at any time. The top of the catch has a base or catch-top SB20 on which a catch-slide SB43 can be slid. If the catch-slide is positioned totally out of said catch-top, the lid then opens. (See FIGS. 16 and 17). If the catch-slide is slid to an intermediate position in which only a small part of the catch-slide is over the catch-top, the lid is then kept closed, but with the small seat belt opening exposed to provide passage for the belt. (See FIG. 22). However, when the seat is not in constant use and the seat belt is kept fully recoiled, this opening on top of the lid should be closed to protect the seat belt and the reel inside the catch from water and the environment. To shut this opening catch-slide SB43 is slid further into catch-top SB20. (See FIG. 23).

Figure 28:
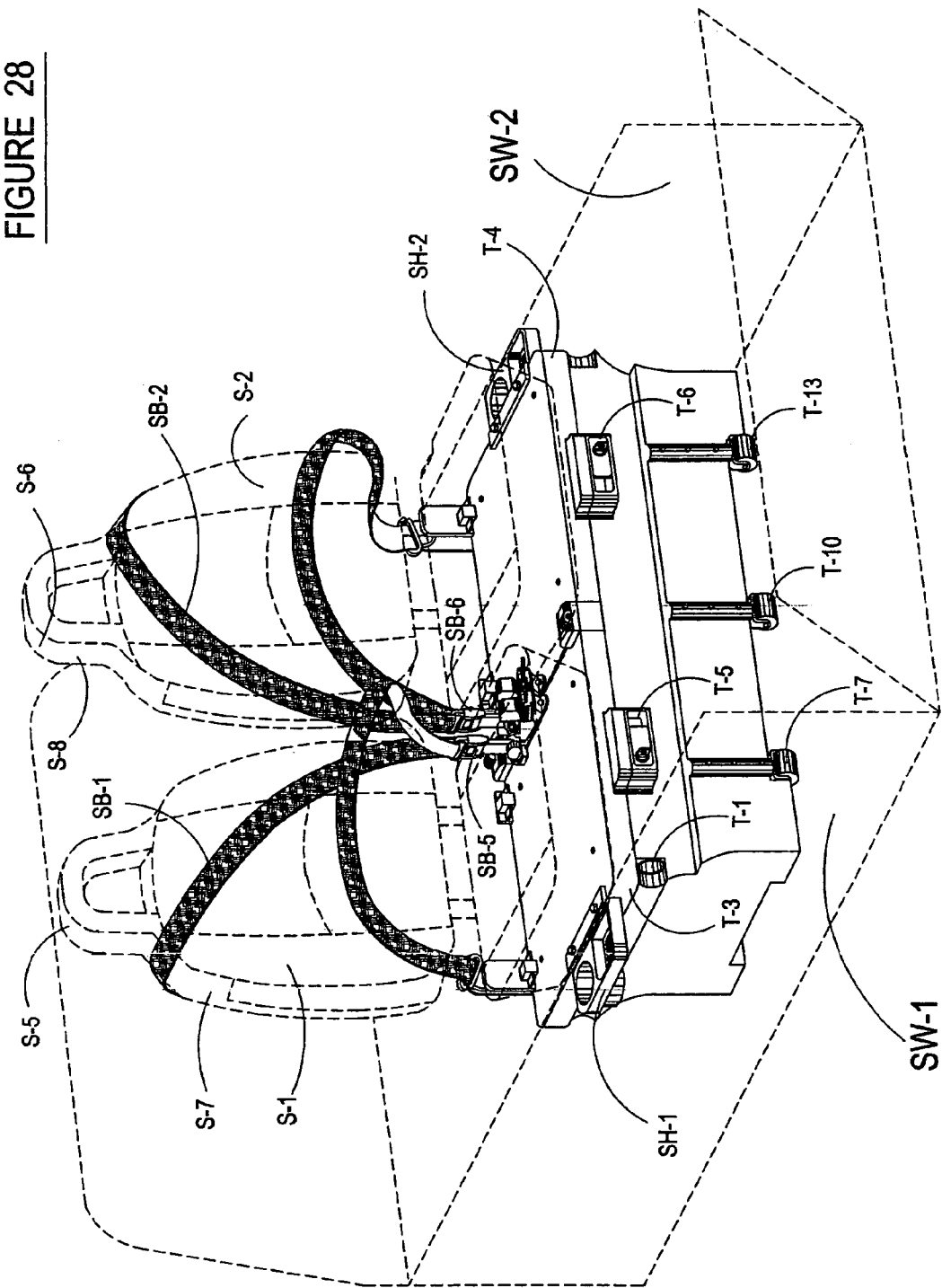
FIG. 28 shows seat belts SB1 and SB2 from the front of the apparatus. Each seat belt is fully unwound with the buckle fastened in the middle of the two seats. This FIGURE additionally shows imaginary side panels SW1 and SW2.
Figure 29:
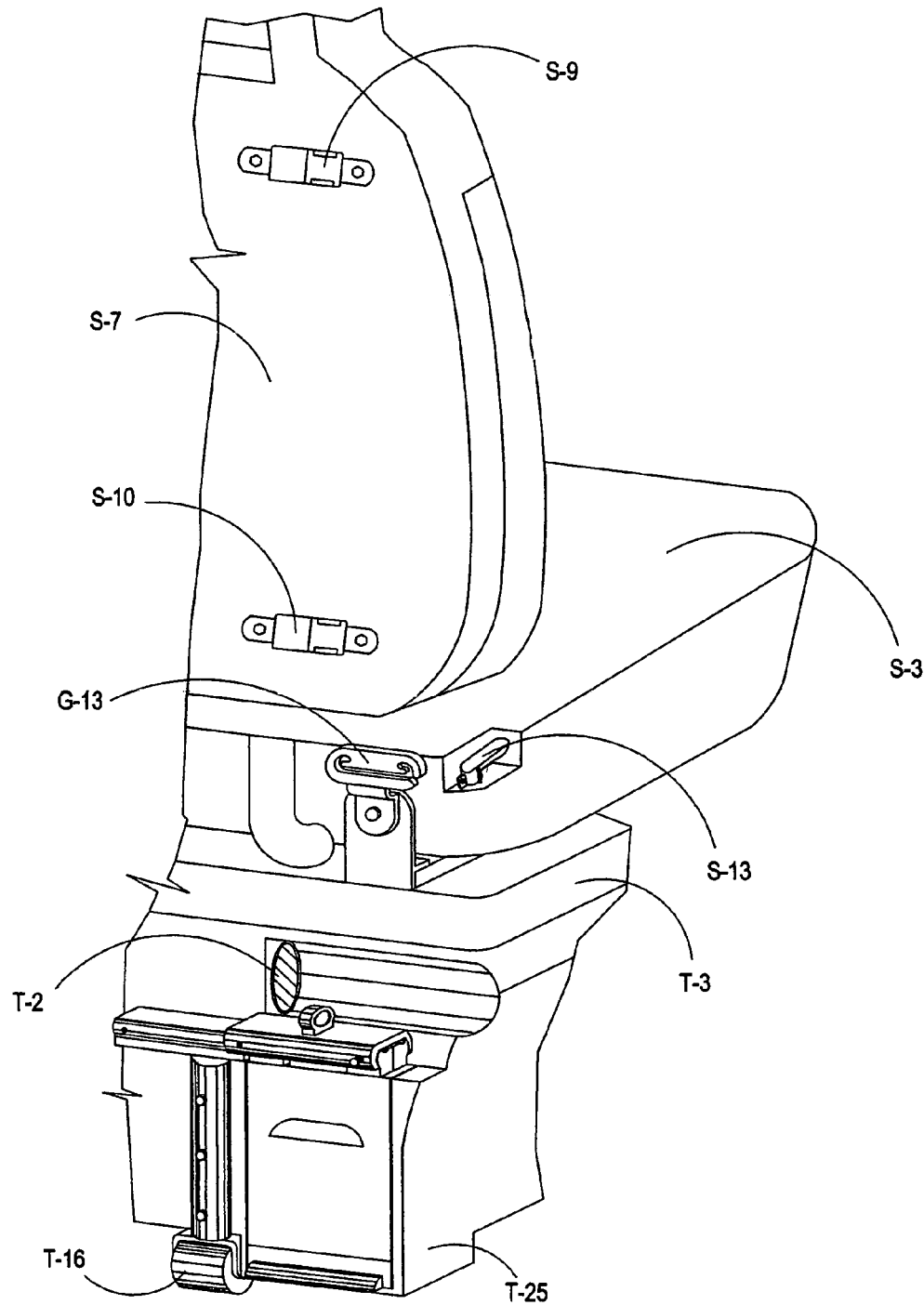
FIG. 29 is a close-up view of swingable seat belt guide G13 and fixed seat belt guides S10 and S9 for the seat belt of the seat next to side panel SW1.
Figure 30:
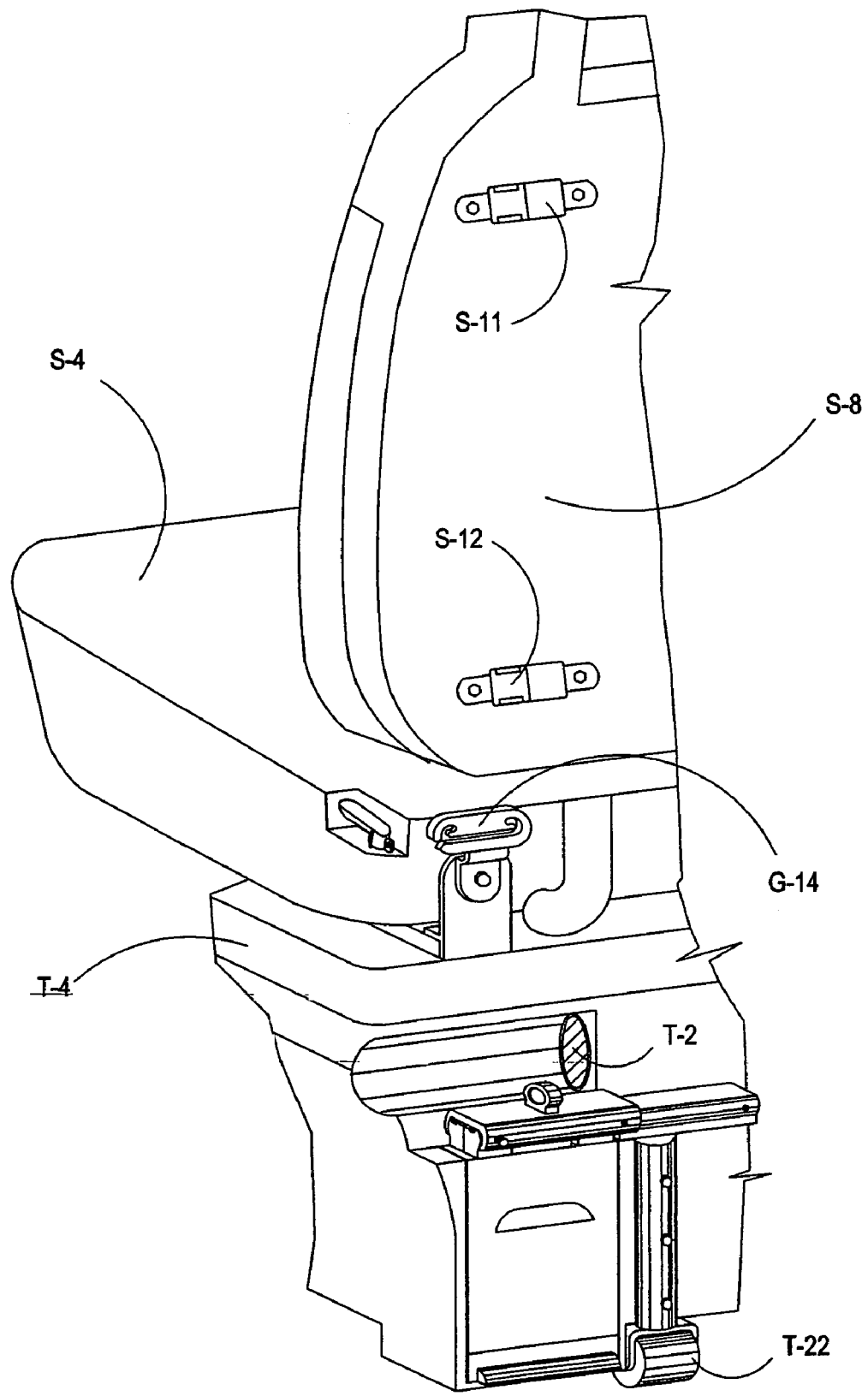
FIG. 30 is a close-up of swingable seat belt guide G14 and fixed seat belt guides S12 and S11 for the seat belt of the seat next to side panel SW2.

One end of the seat belt is secured to the reel and the other to the rear wall of the seat belt catch. (See FIGS. 20 and 21). The seat belt then unwinds in a loop, with one segment passing through the small seat belt opening between catch-top SB20 and the top of lid SB16 and going up directly behind the backrest and the other segment likewise passing through said opening but turning under the backrest to go up in front thereof. (See FIGS. 24, 25, 26, and 27). At this juncture, the seat belt no longer retracts to the reel freely as it is held and stretched over the backrest structure, half-way unwound to be readily available for use. To then use the seat belt, the seat occupant only has to extend the latter segment outwardly from the backrest until its buckle reaches a swingable seat belt fastener across the seat, where the buckle is fastened. (See FIG. 28). To keep the seat belt half-way unwound and stretched over the backrest as shown, each seat belt has three seat belt guides, a swingable guide in the rear of the respective trunk lid and two fixed guides in the rear of the respective backrest. (See in FIGS. 24, 25, 29, and 30 swingable seat belt guide G13 and fixed seat belt guides S9 and S10 for seat belt SB1 and swingable seat belt guide G14 and fixed seat belt guides S11 and S12 for seat belt SB2).

Figure 31:
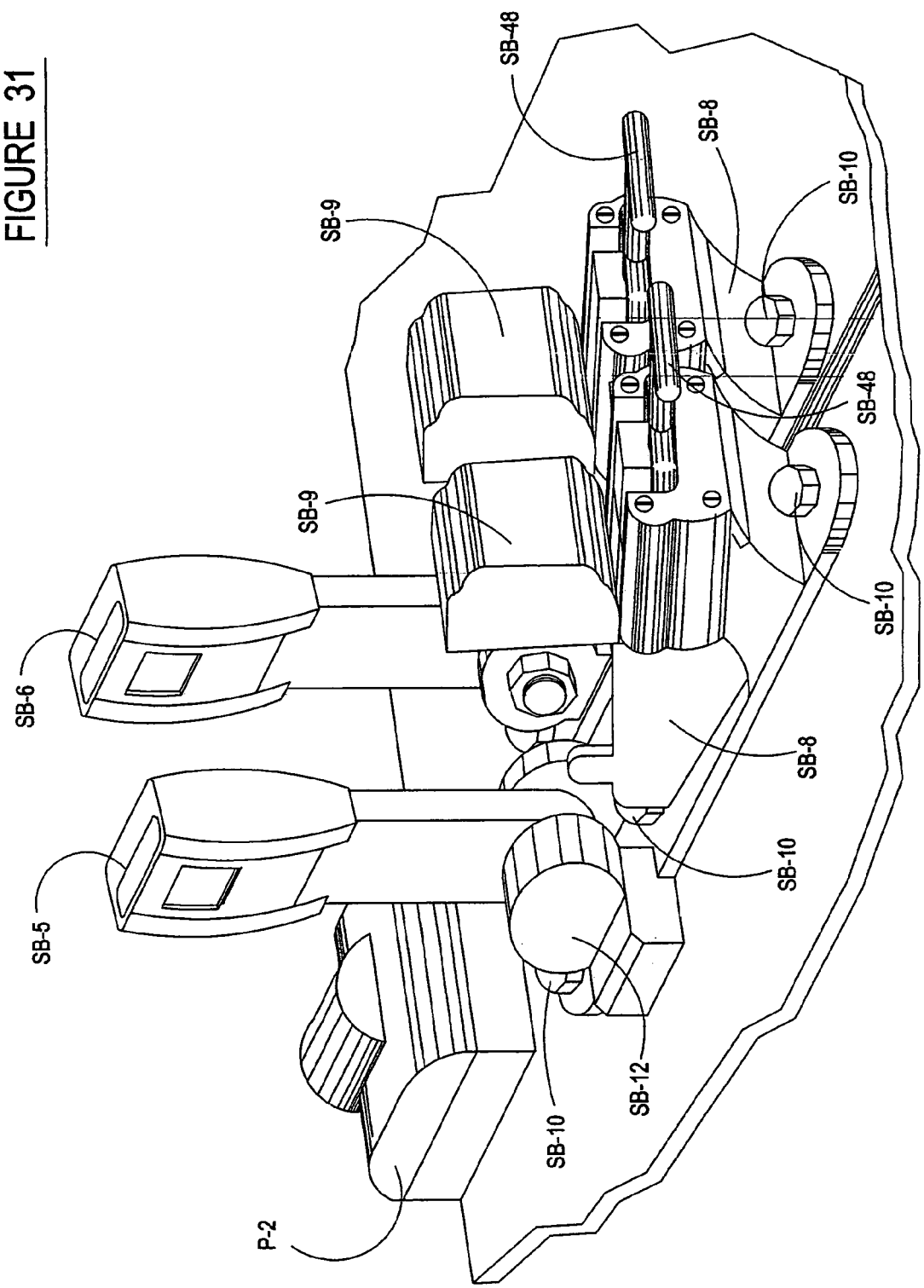
FIG. 31 shows swingable seat belt fasteners SB5 and SB6 from the front of the apparatus. The seat belt fasteners are side by side in the middle of the trunk, each one secured over a different trunk lid.
Figure 32:
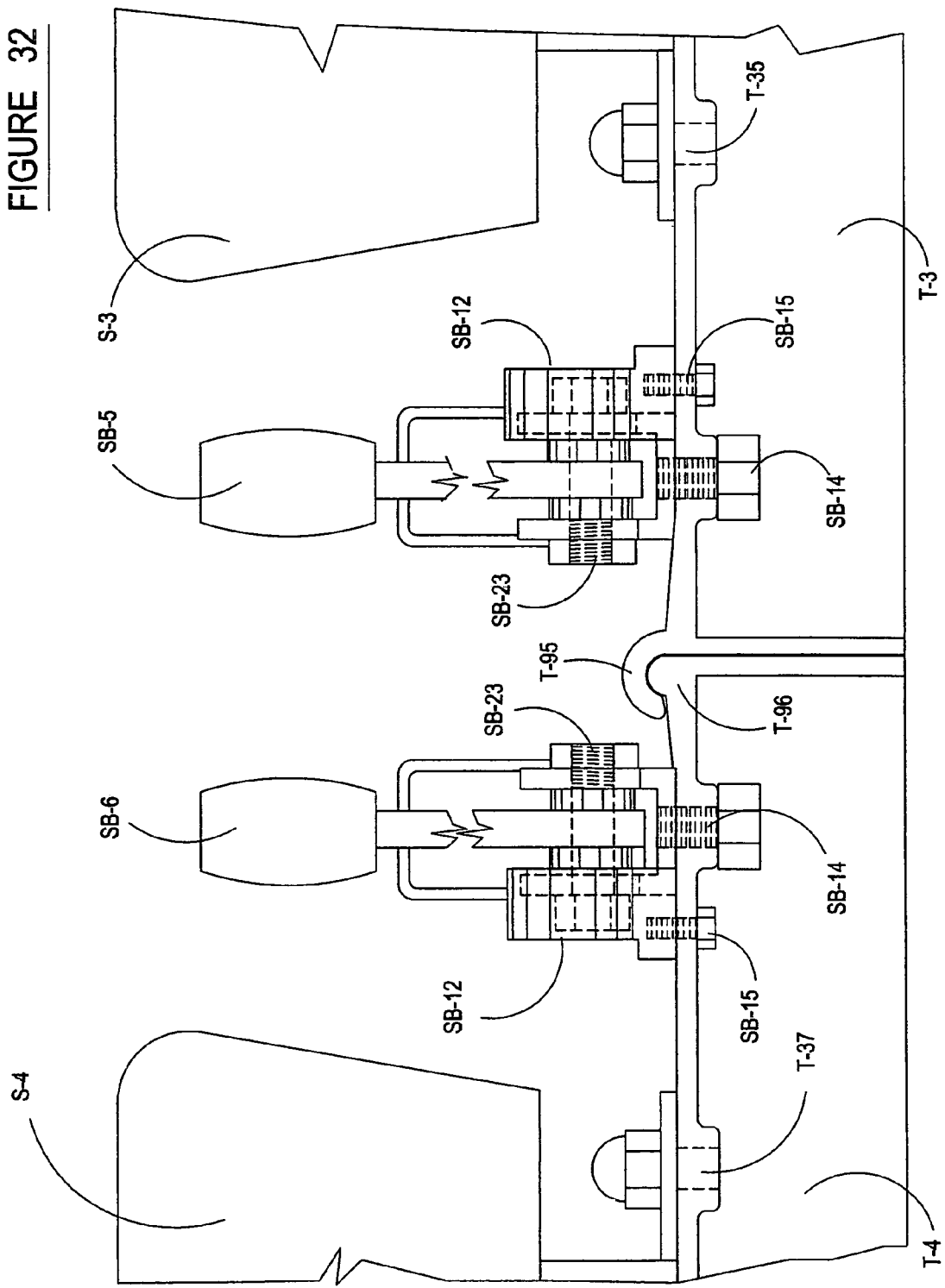
FIG. 32 is a view of the swingable seat belt fasteners from the rear of the apparatus. The two seat belt fasteners SB5 and SB6 are shown between the two seat bottoms S3 and S4. Fastener SB5 is secured over trunk lid T3 and fastener SB6 over trunk lid T4. As also shown, trunk lid T3 has a rain guard piece T95 and trunk lid T4 a rain guard base T96.

Each seat belt fastener is secured to the same trunk lid securing the seat for which the respective seat belt is intended, and is positioned side by side with another seat belt fastener on the other trunk lid. (See FIG. 31). FIG. 32 shows a pair of seat belt fasteners SB5 and SB6 between the two seat bottoms S3 and S4, one on each trunk lid T3 and T4. To fasten the seat belt buckles, the seat belt fasteners have to be pivoted upward. When the seat belt buckles are later released, the seat belt fasteners should be pivoted downward and to the front so that they again rest on respective holders which retain them in place until they are again needed for use.

Figure 33:
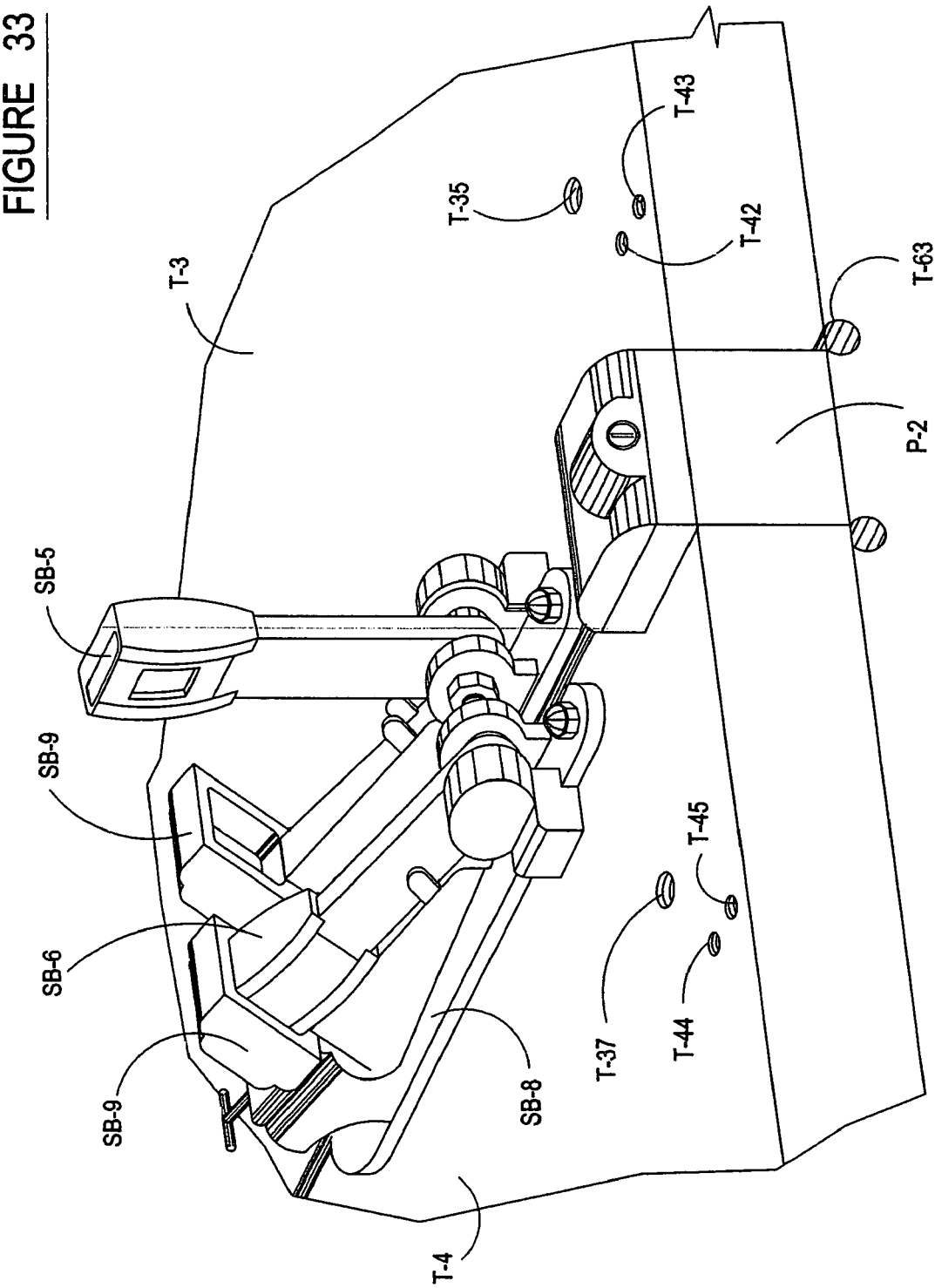
FIG. 33 shows the two swingable seat belt fasteners SB5 and SB6 from the rear of the apparatus. Fastener SB5 is pivoted upward to receive a respective seat belt buckle while fastener SB6 is resting in a 30 degree angle over a respective base with retractable head SB9 securing it and covering its internal mechanism to protect it from water and the environment in the open-topped pickup. This FIGURE additionally shows rear bolt box P2 for vertical security bolt P3.
Figure 34:
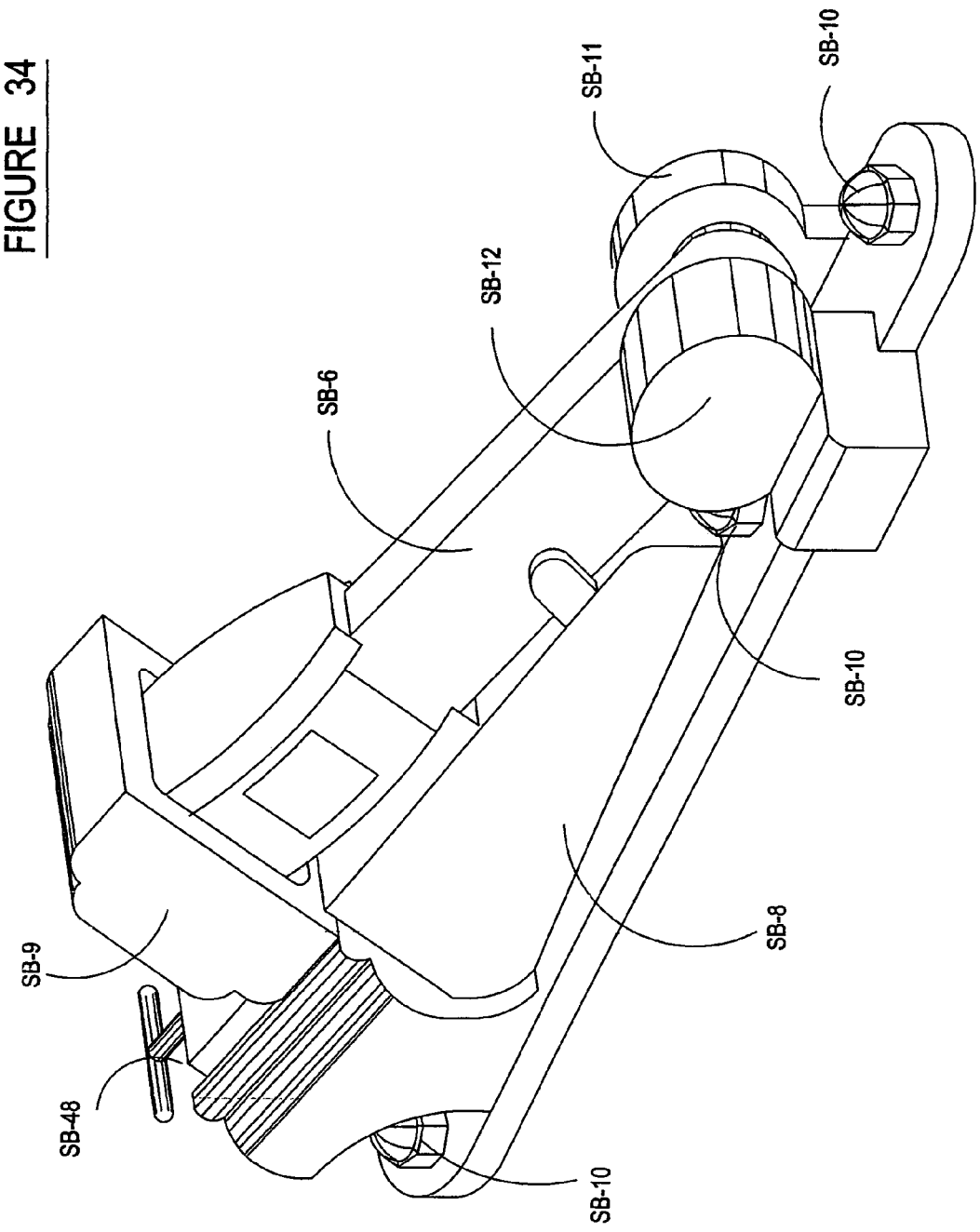
FIG. 34 is a close-up view of retractable head SB9 retracted backward to keep seat belt fastener SB6 in place with its internal mechanism covered. This FIGURE additionally shows inclined base SB8, lever SB48 and covers SB11 and SB12 to prevent the removal of swingable seat belt fasteners SB5 and SB6. The covers are secured with bolts from under the trunk lids.
Figure 35:
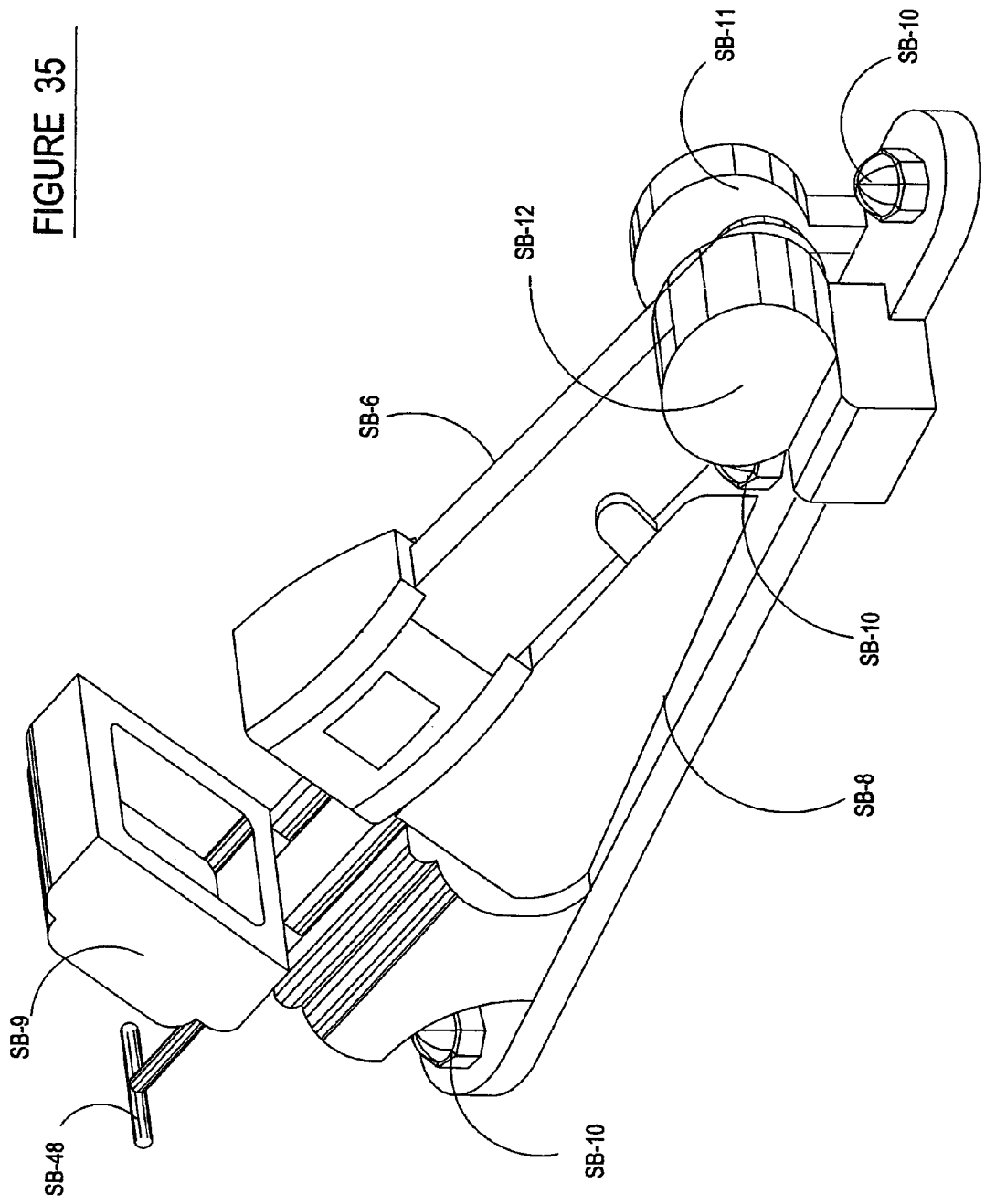
FIG. 35 is a close-up view of swingable seat belt fastener SB6 and retractable head SB9 pulled out with lever SB48 so that the fastener can be pivoted upward to fasten a respective seat belt buckle.

Each holder has an inclined base SB8 and a retractable head SB9 which slides in said base. (See FIGS. 33, 34, and 35). The inclined base supports the seat belt fastener in a thirty degree angle while the retractable head keeps it in place, also covering its internal mechanism to protect it from water and the environment in the open-topped pickup. More precisely, the retractable head has a lever SB-48 which is pulled out to slide the retractable head forward and thus free the seat belt fastener so that it can be pivoted upward to fasten the seat belt buckle. As lever SB-48 is then released the retractable head automatically slides backward. Thus, to again rest the seat belt fastener in the inclined base after the seat belt buckle is released, lever SB-48 has to be pulled out again to slide the retractable head out of the way. When the lever is then released and the retractable head slides backward, it secures the seat belt fastener already resting in the inclined base, also covering its internal mechanism.

Figure 36:
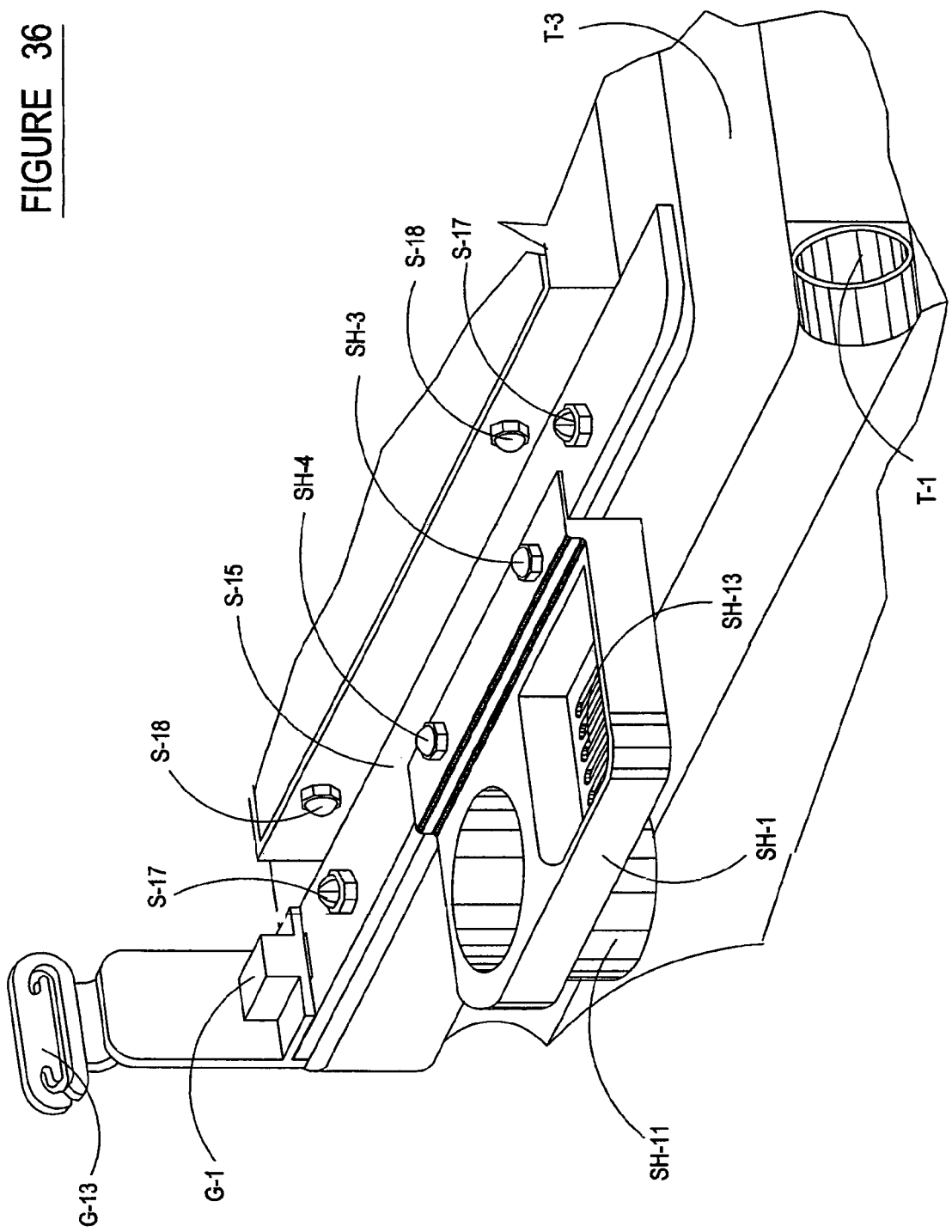
FIG. 36 is a close-up of snack holder SH1 secured to a side of the seat next to side panel SW1. The other seat next to side panel SW2 also has a similar snack holder SH2 to a side thereof Both snack holders are secured with bolts from under trunk lids T3 and T4.

Furthermore, the trunk has two snack holders, one for each seat occupant. (See FIG. 36). It additionally has six telescopic leg supports with front trunk rollers T7, T10, and T13, and rear trunk rollers T16, T19, and T22 in the bottom. (See FIGS. 26 and 27). The telescopic leg supports are to adjust the height of the trunk and the pair of seats. The trunk rollers facilitate the movement of the apparatus from one position to another in the pickup bed.

Figure 6:
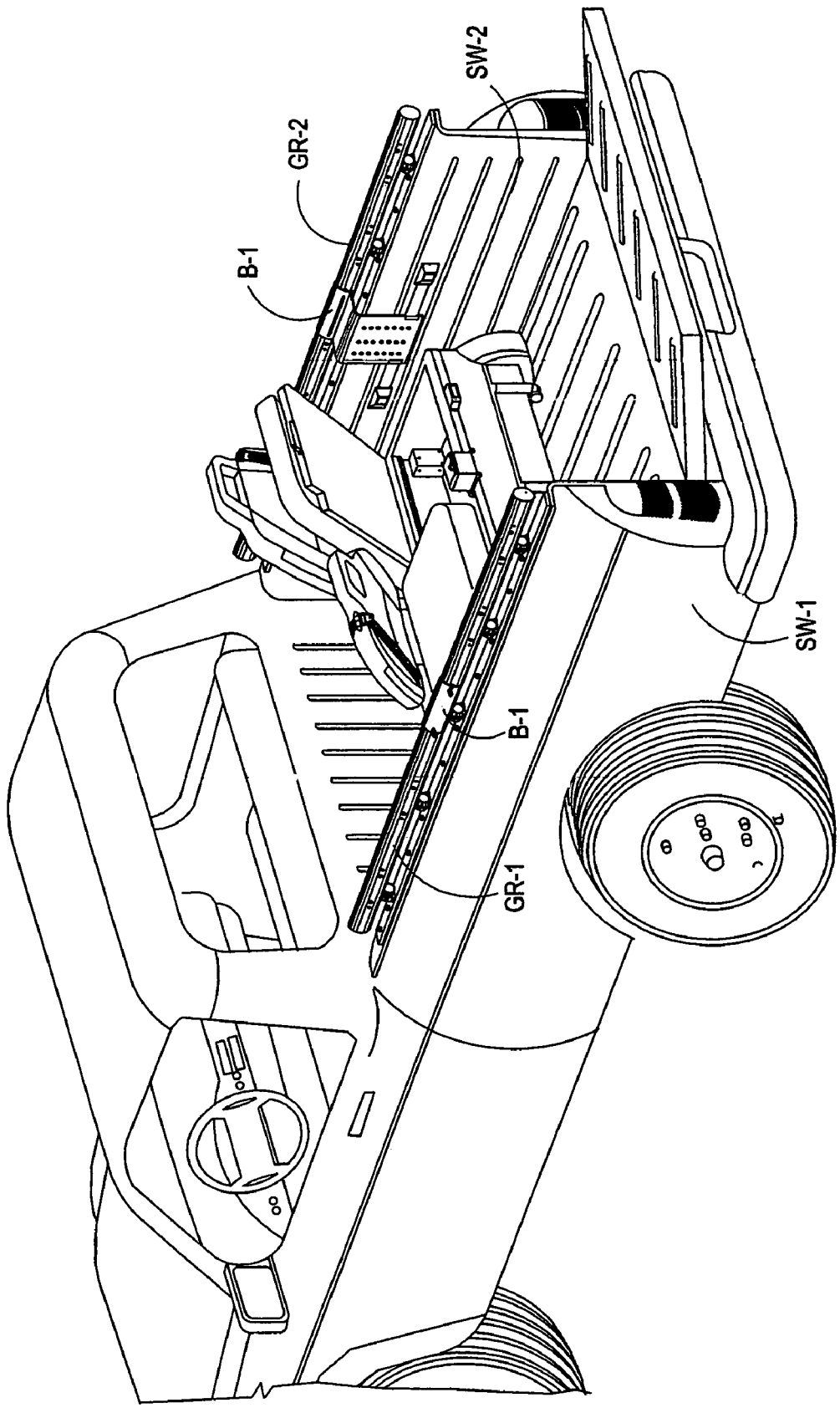
FIG. 6 shows the pair of seats mounted on a pair of trunk lids. One lid is opened and the other is not. When a lid is opened, the cushioned seat bottom over it likewise pivots backward and up. When the lid is closed, the seat bottom is likewise pivoted frontward and down, to rest in position for people to occupy the seat. The cushioned seat bottoms are identified as S3 and S4, and the backrests as S1 and S2. This FIGURE additionally shows guide rails GR1 and GR2 mounted on side walls or side panels SW1 and SW2 respectively.
Figure 7:
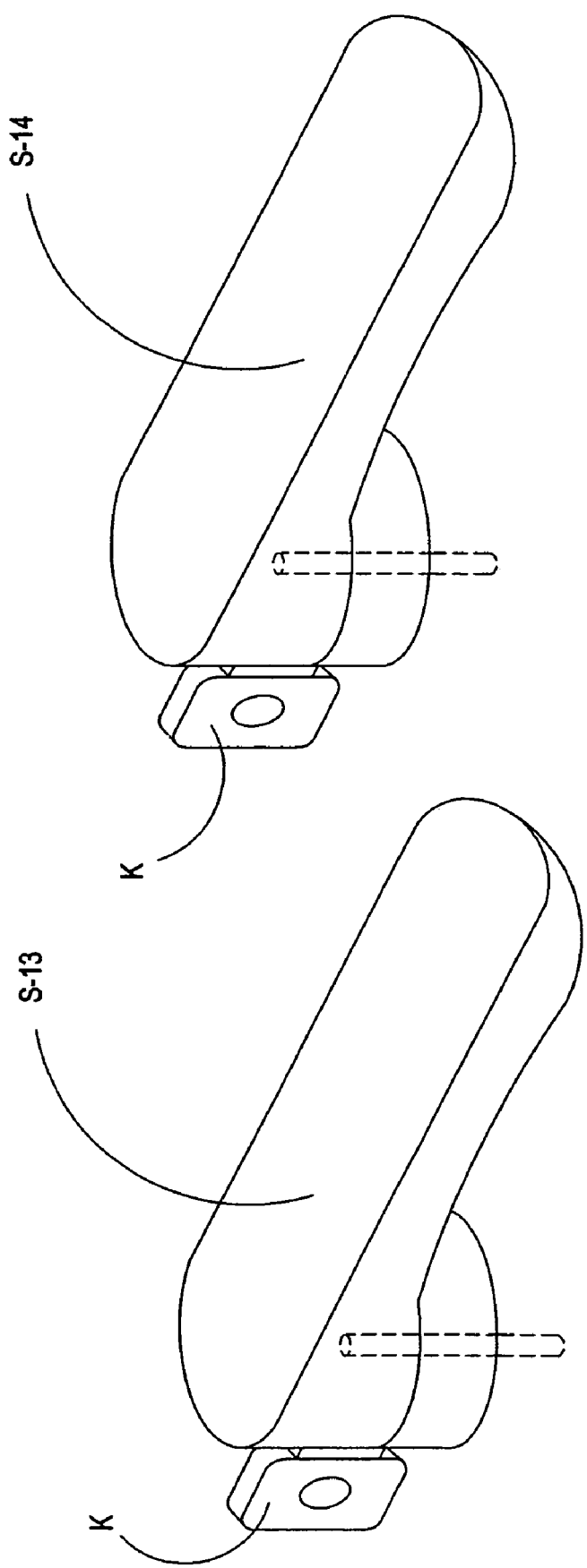
FIG. 7 shows the levers with which the backrests are reclined and locked in place with a key K. When a reclining lever is locked, the respective backrest is immobilized. Reclining lever S13 is located in the rear corner of seat bottom S3, next to side panel SW1, and reclining lever S14 in the rear corner of seat bottom S4, next to side panel SW2.

Referring now to FIG. 6, a conventional pickup truck has an open-topped area behind the cab. This area behind the cab has a bottom wall or bed, front and back sides and two opposite side walls or side panels SW1 and SW2.

Figure 37:
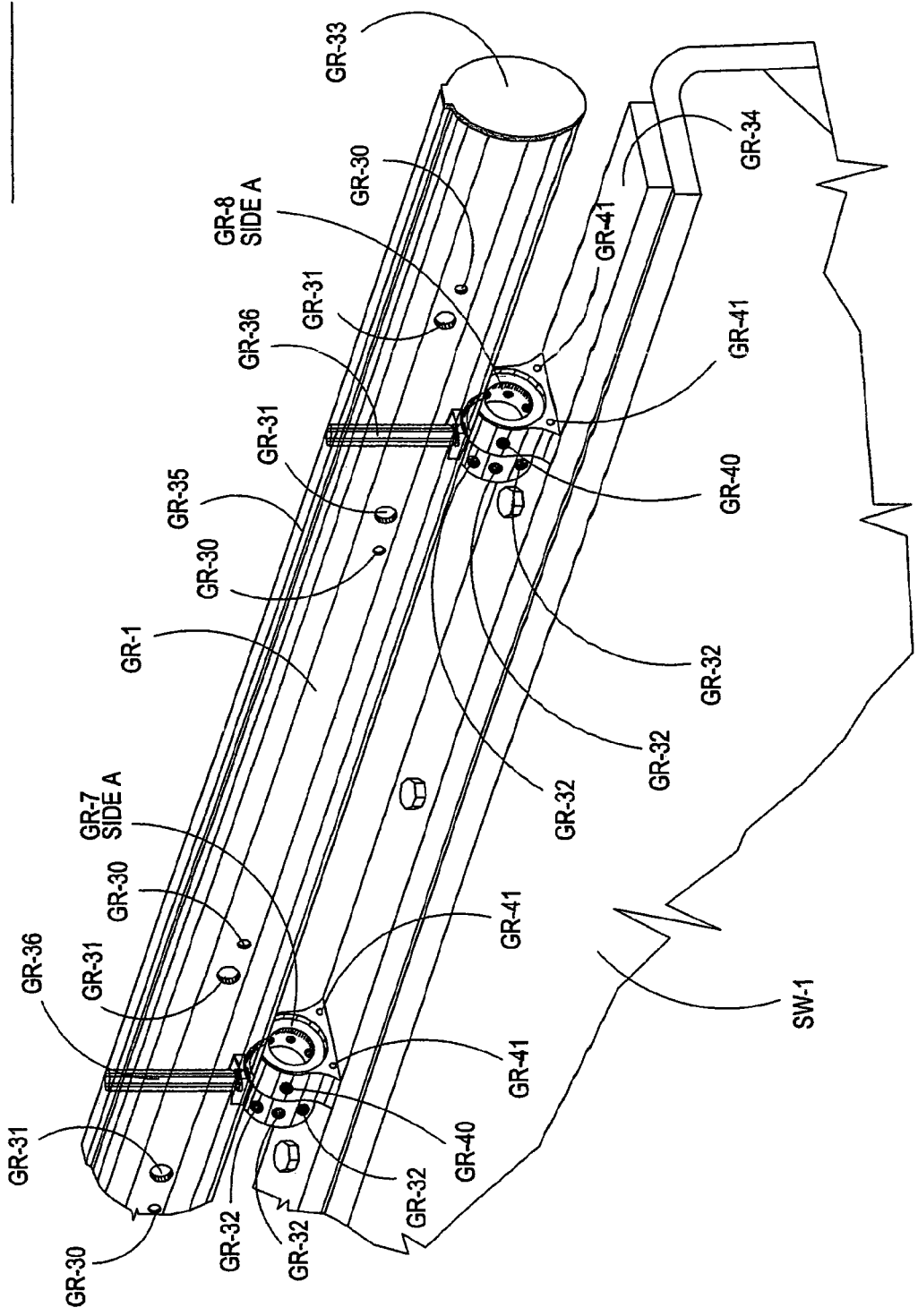
FIG. 37 is a side view of round-like guide rail GR1 mounted on side panel SW1. Side panel SW2 (not shown) has an identical guide rail GR2 mounted on it. Both round-like guide rails have a flat surface GR35 on top and are hollow inside. The guide rails have series of pairs of lock holes GR31 and stop holes GR30. Also shown in this FIGURE are internal reinforcements GR36 to give firmness to the hollow guide rail. Also shown is a cover GR33 for the end of the hollow guide rail.

FIG. 6 shows rigid guide rails GR1 and GR2 mounted over side panels SW1 and SW2. The guide rails are round-like but have a flat surface GR35 on top, and are hollow inside. (See FIG. 37).

Figure 38:
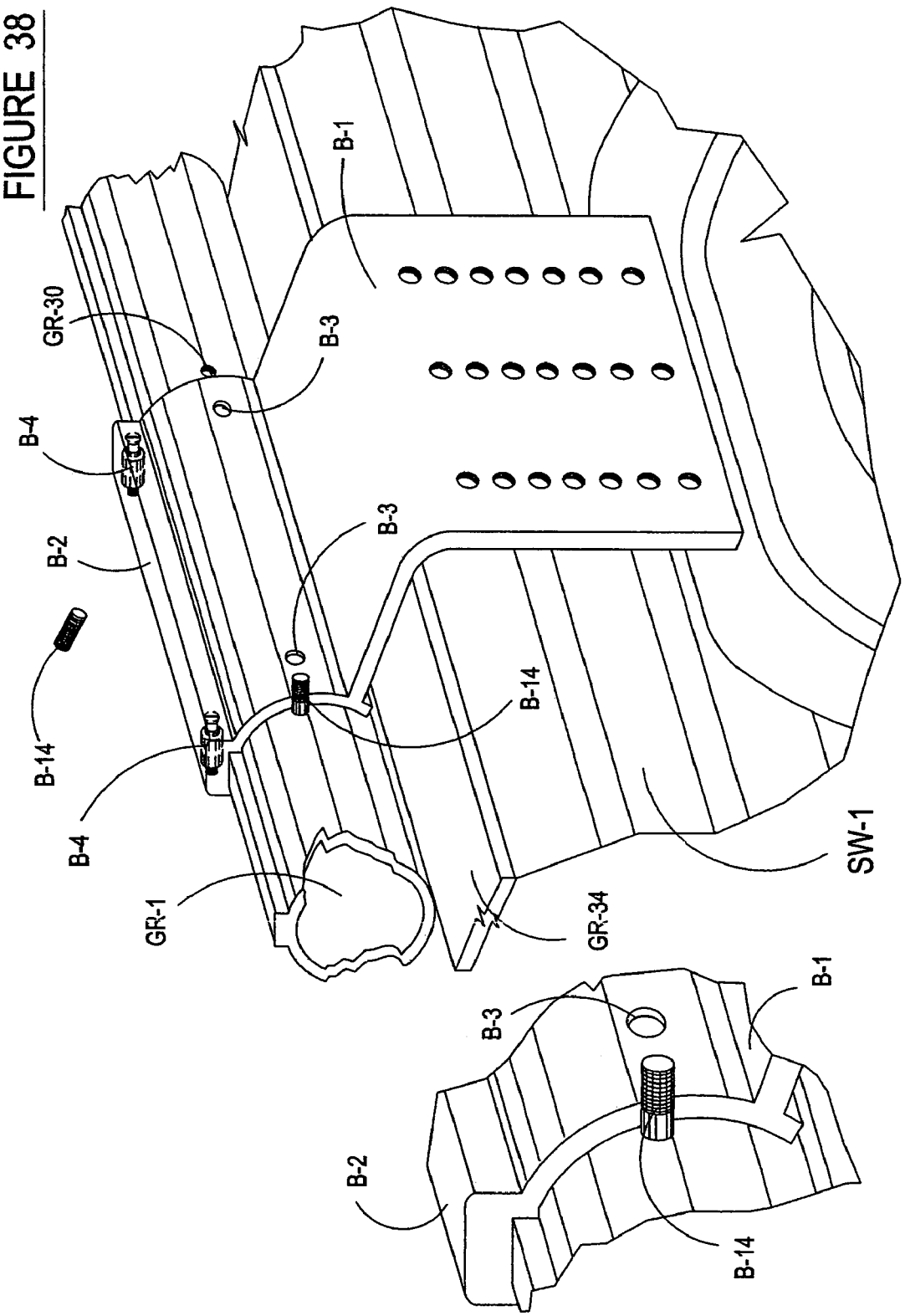
FIG. 38 shows a rolling bracket B1 with a pair of rollers B4 mounted on guide rail GR1 (over side panel SW1). Guide rail GR2 (not shown) has an identical rolling bracket mounted on it. As also shown, the lower section of the bracket has seven sets of triple holes. A blockage pin B14 is also shown stopping the rolling bracket from rolling.

FIG. 38 is a close-up of guide rail GR1 on side panel SW1 with a rolling bracket B1 mounted on it. The upper section of the rolling bracket is designed to enclose more than half of the round-like surface of the guide rail, so that the rolling bracket is disengaged only off the ends of the guide rail. (An identical rolling bracket B1 should be mounted on guide rail GR2 on opposite side panel SW2).

Figure 39:
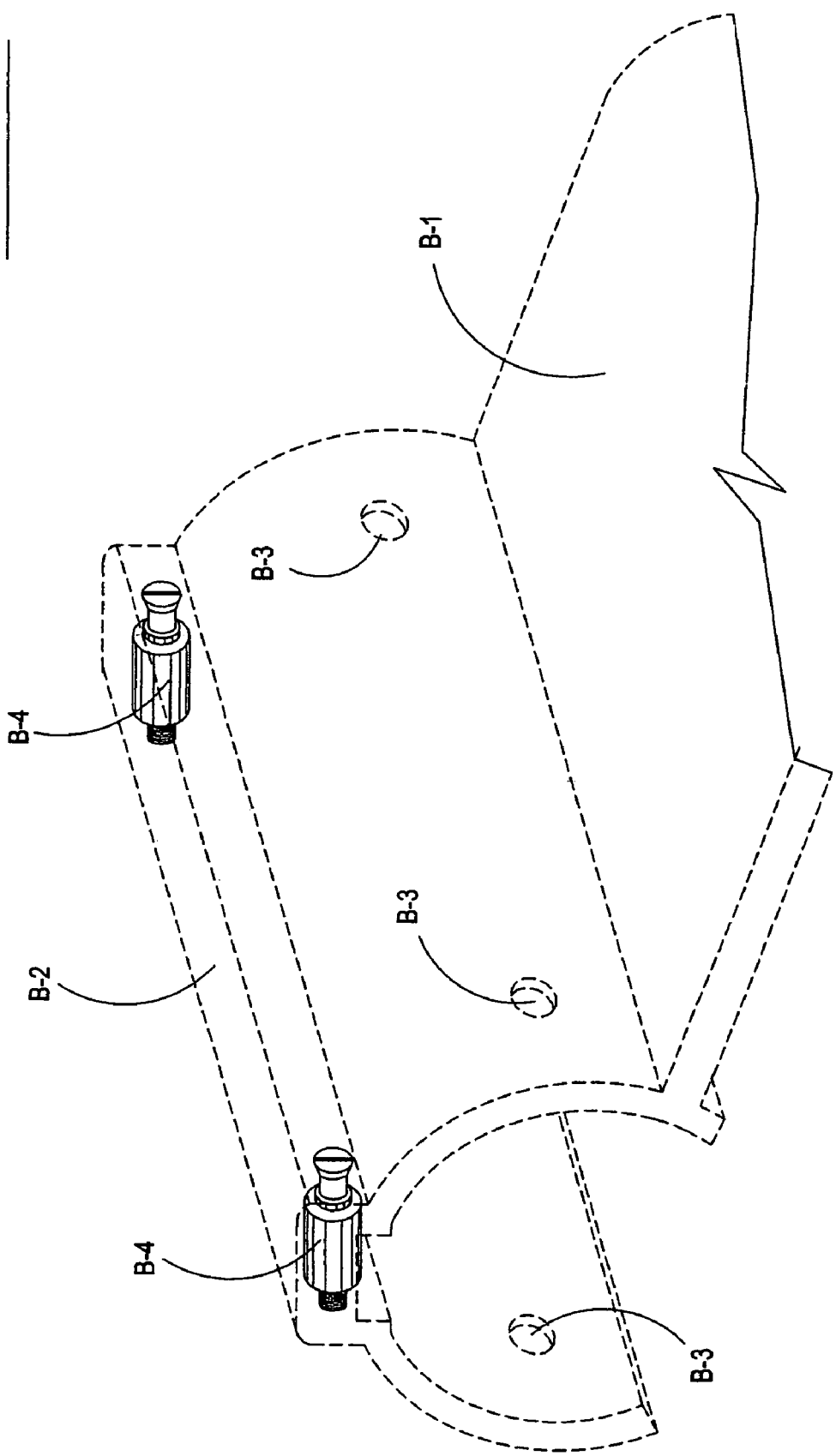
FIG. 39 is a close-up view of the upper section of rolling bracket B1. As shown, this upper section of the bracket is designed to enclose more than half of the round-like surface of the guide rails, and has a bracket top B2 with a roller B4 on each end. Rollers B4 roll on flat surface GR35 of the guide rails to facilitate the movement of the rolling bracket from one position to another. As also shown, this upper section of the bracket has two lock holes B3.
Figure 40:
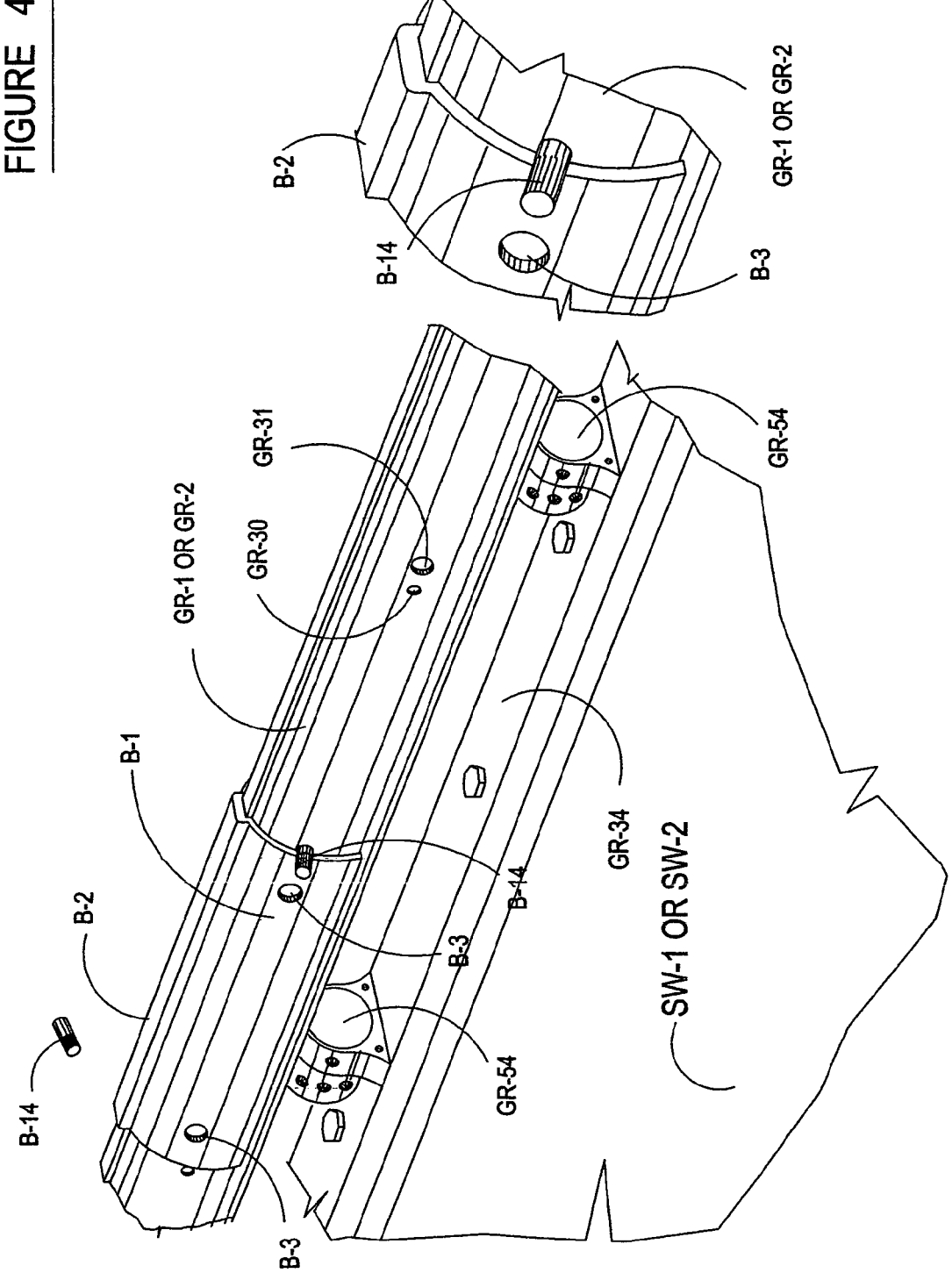
FIG. 40 shows rolling bracket B1 mounted on guide rail GR1 or GR2 (on side panel SW1 or SW2). Blockage pin B14 is blocking the movement of the bracket to indicate the exact position where the pair of lock holes B3 on the rolling bracket coincide with lock holes GR31 on the guide rail.
Figure 41:
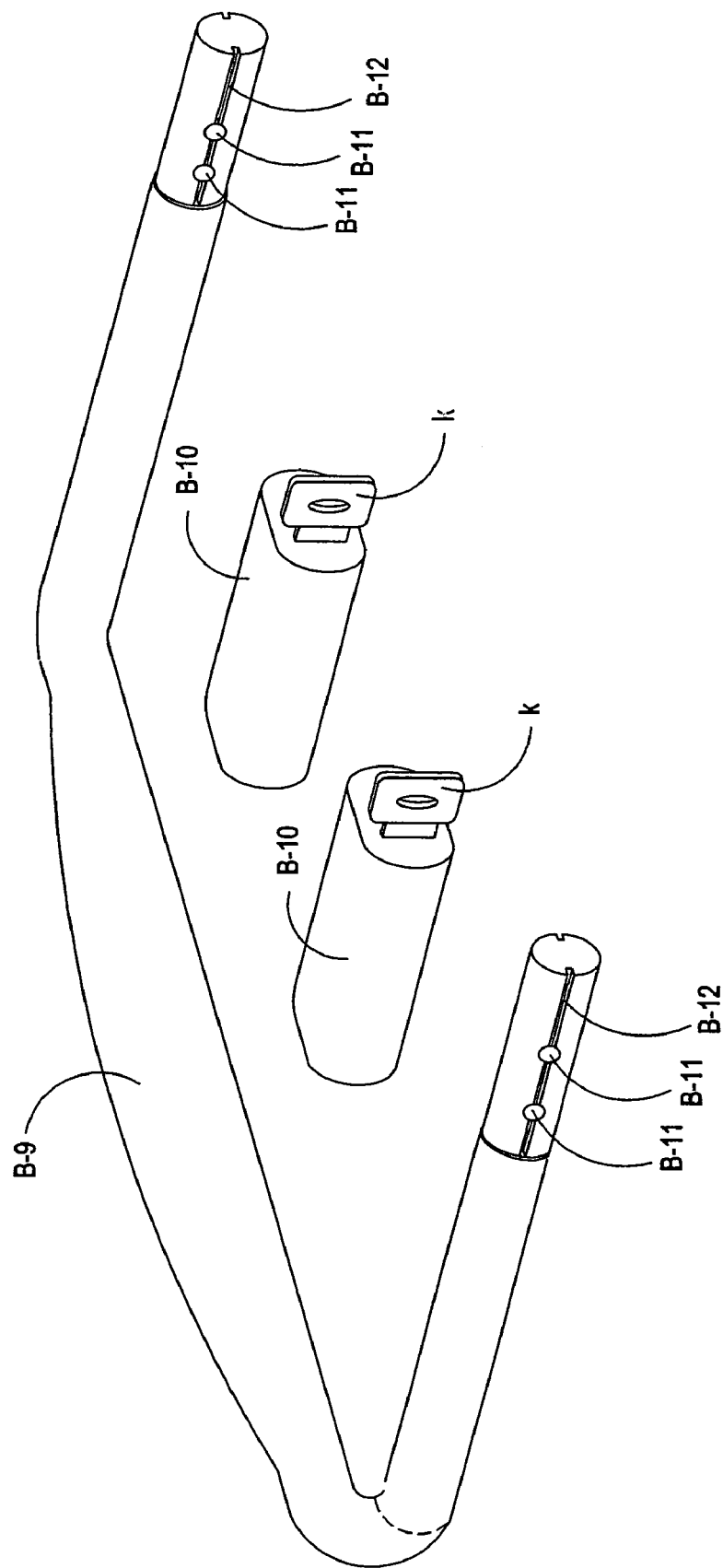
FIG. 41 shows a pair of lock units B10 and the two grooved segments of U-bar B9. Once the grooved segments pass through coinciding lock holes B3 (on rolling brackets B1) and GR31 (on the guide rails), the lock units are secured to them to keep the rolling brackets on the guide rails in place.
Figure 42:
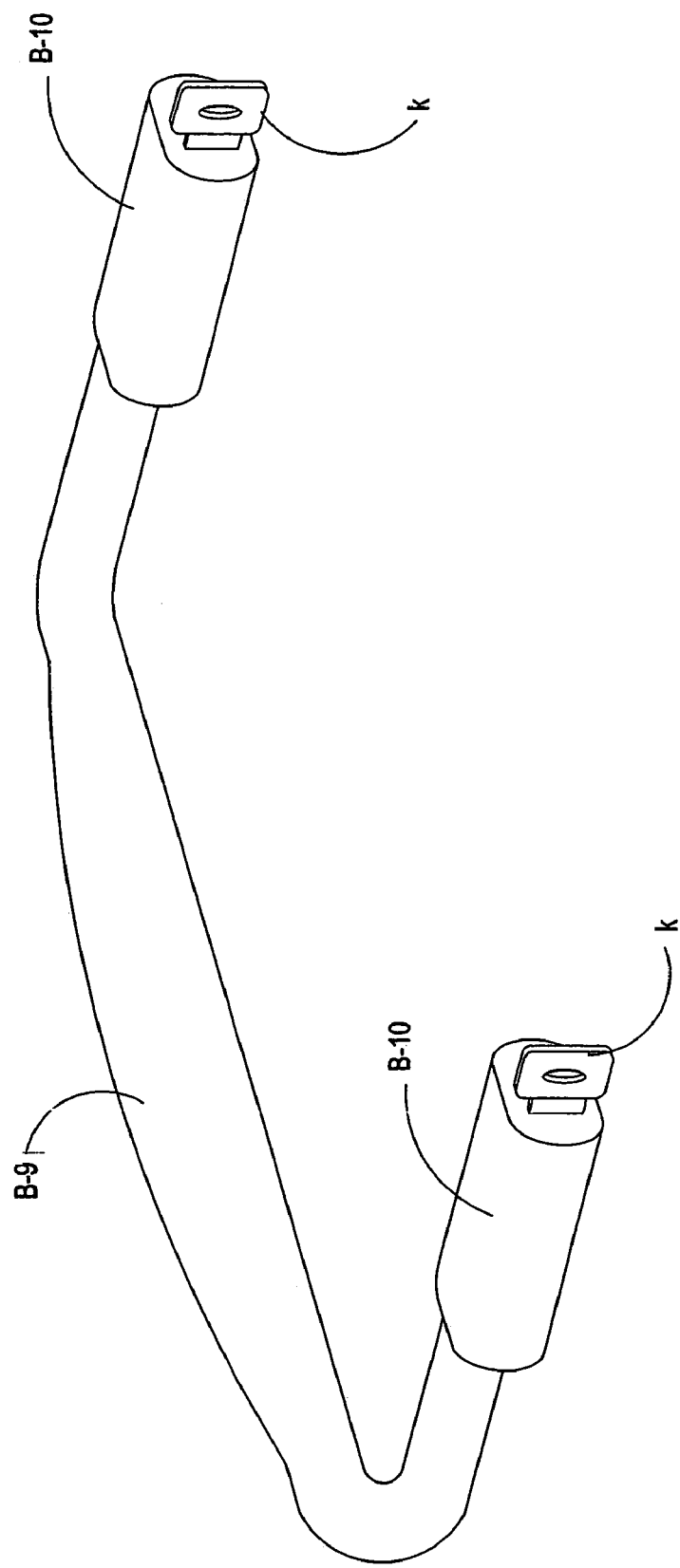
FIG. 42 shows a pair of lock units B10 locked to U-bar B9.
Figure 43:
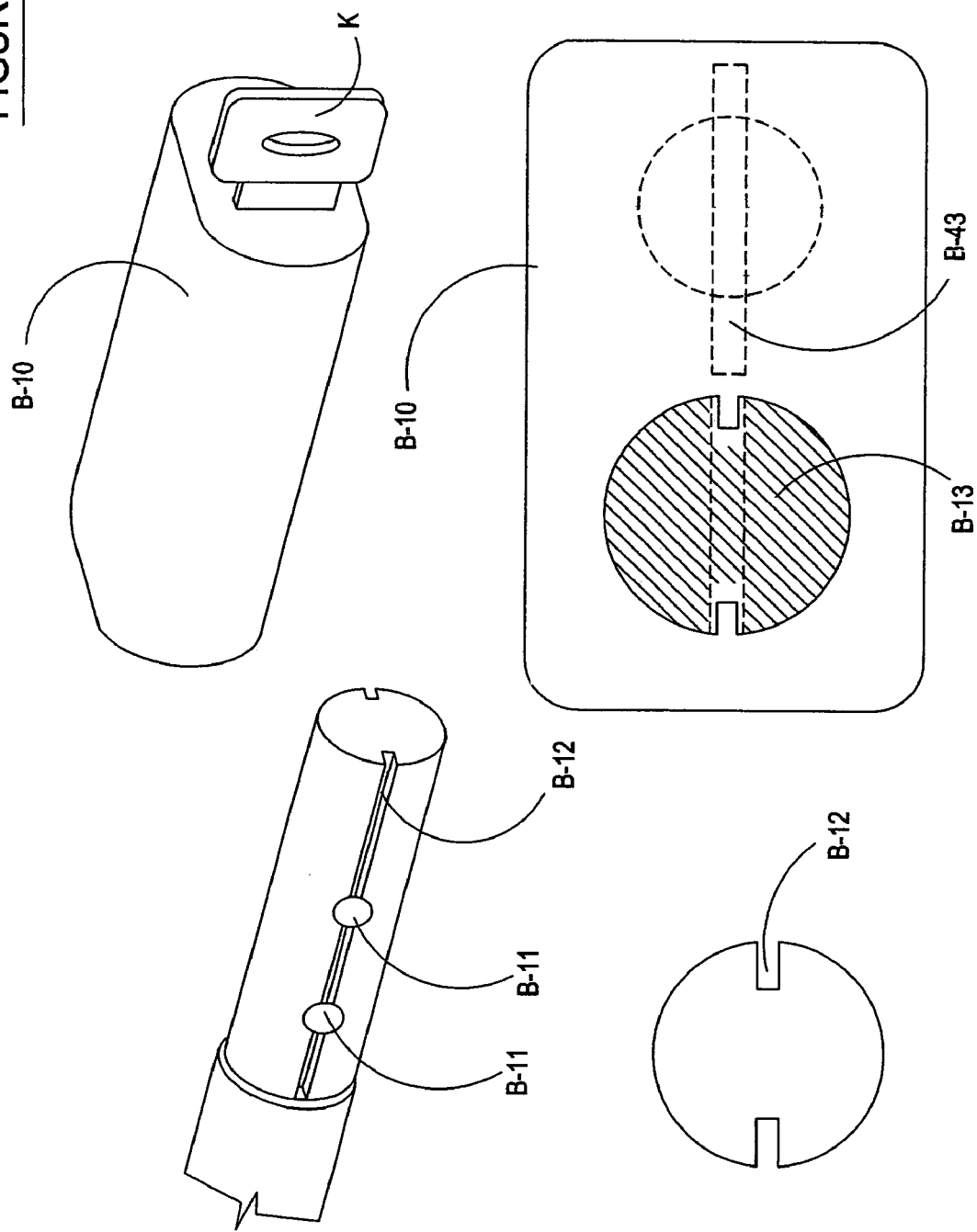
FIG. 43 is a close-up of grooved segment B12 on a U-bar B9 end-segment and of lock-unit B10. The grooved segment has a pair of holes B11 for pins B43 on lock unit B10. As pins B43 fill said holes B11 on each U-bar end-segment, the lock units secure U-bar B9 to keep the rolling bracket in the guide rail in place.
Figure 44:
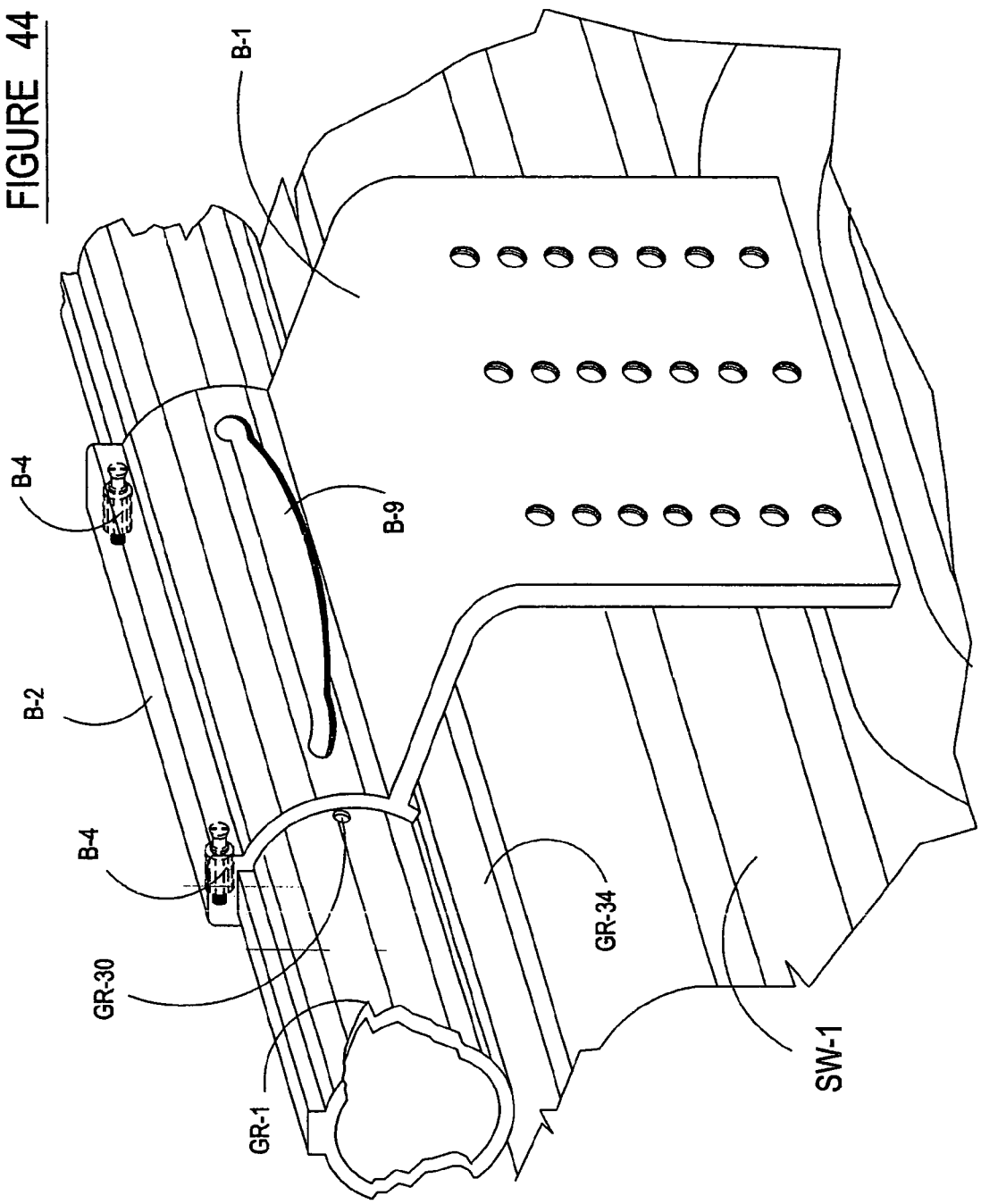
FIG. 44 shows U-bar B9 in position to keep rolling bracket B1 in guide rail GR1 in place.
Figure 45:
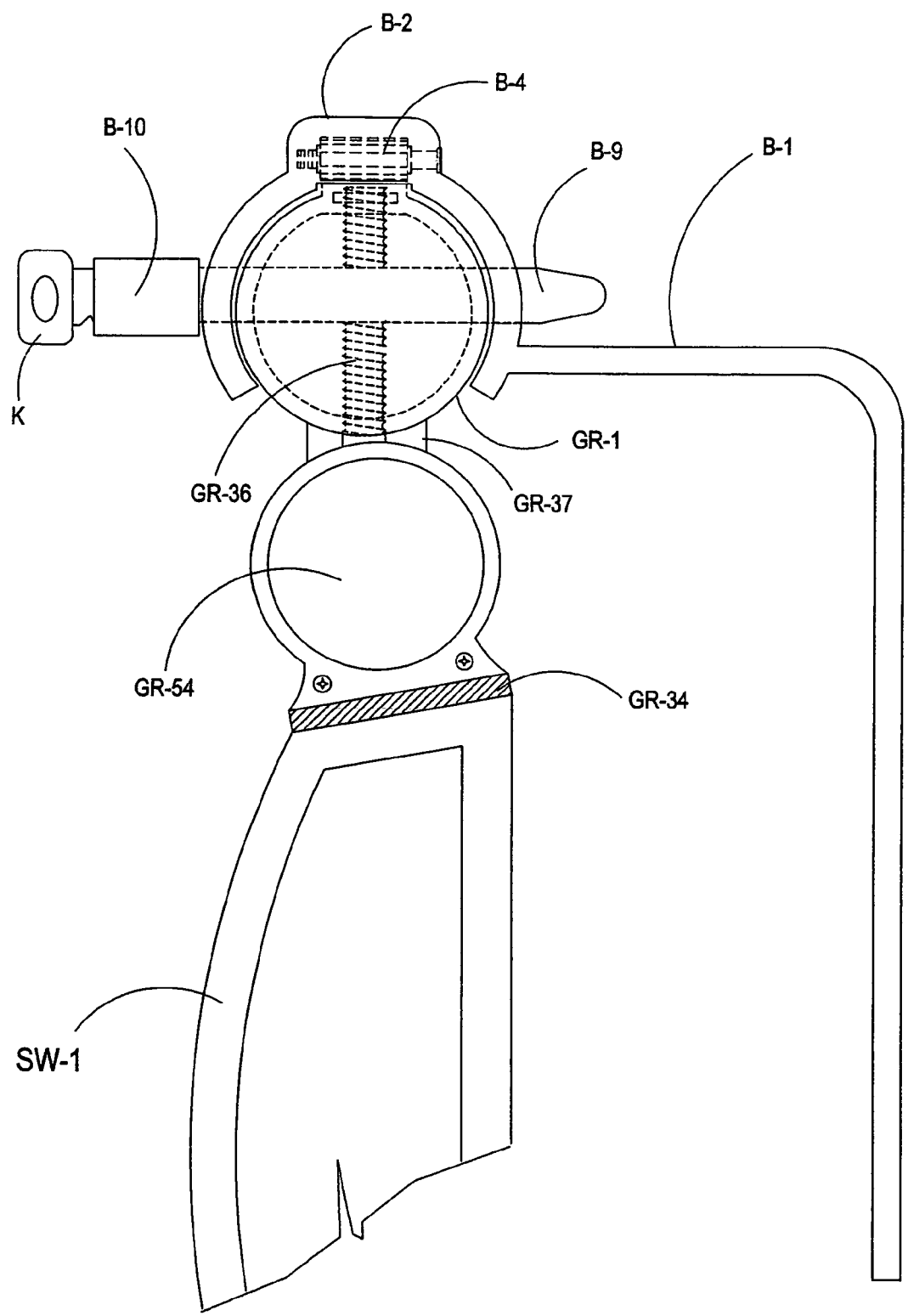
FIG. 45 is a front view of rolling bracket B1 kept in place in guide rail GR1 as U-bar B9 is secured to a pair of coinciding lock holes B3 and B31 with lock units B10. The upper section of the rolling bracket also shows a roller B4 under bracket top B2. Also worth noting is the separation between side panel SW1 and the lower section of the rolling bracket. The bracket is shaped to move alongside and spaced apart a few inches from the side panel.
Figure 46:
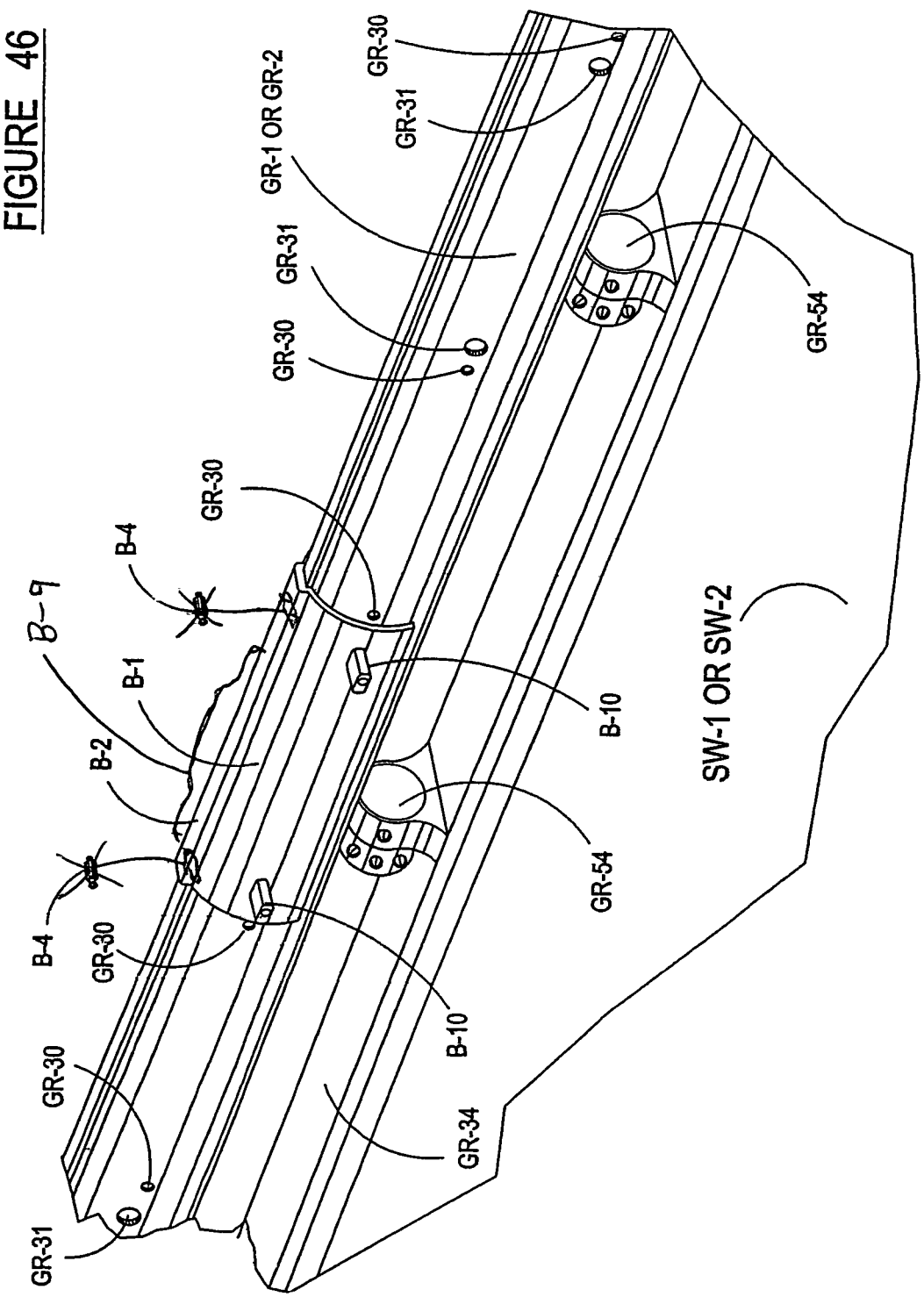
FIG. 46 shows a pair of lock units B10 securing the end-segments of U-bar B9 to keep rolling bracket B1 in guide rail GR1 or GR2 in place.

FIG. 39 shows that rolling bracket B1 has a hollow bracket top B2 with a roller B4 on each end. Rollers B4 roll on flat surface GR35 of the guide rails to facilitate the movement of the rolling bracket from one position to another.

As also shown in FIG. 38, the upper section of rolling bracket B1 partially enclosing the guide rail has two lock holes B3. Lock holes B3 are spaced apart to coincide with a series of identical pairs of lock holes GR31 on guide rails GR1 or GR2. (See FIG. 47). When the rolling bracket is thus rolled to where the position of its lock holes B3 coincides with any one of the several pairs of lock holes GR31 on the guide rail, the rolling bracket is kept in place with U-bar B9 and lock unit B10. See FIGS. 41, 42, 43, 44, 45, and 46. As shown in these FIGURES, the two end-segments of U-bar B9 pass through coinciding lock holes B3 on rolling bracket B1 and lock holes GR31 on guide rail GR1 (or GR2) and are then locked thereto with lock units B10. As further shown in these FIGURES, said end-segments have a grooved segment B12 for guiding lock units B10 so that their pins B43 can pass through holes B11, to thus secure the lock units B10 to U-bar B9 and retain rolling bracket B1. Pins B43 are controlled with a key K on lock units B10.

Figure 47:
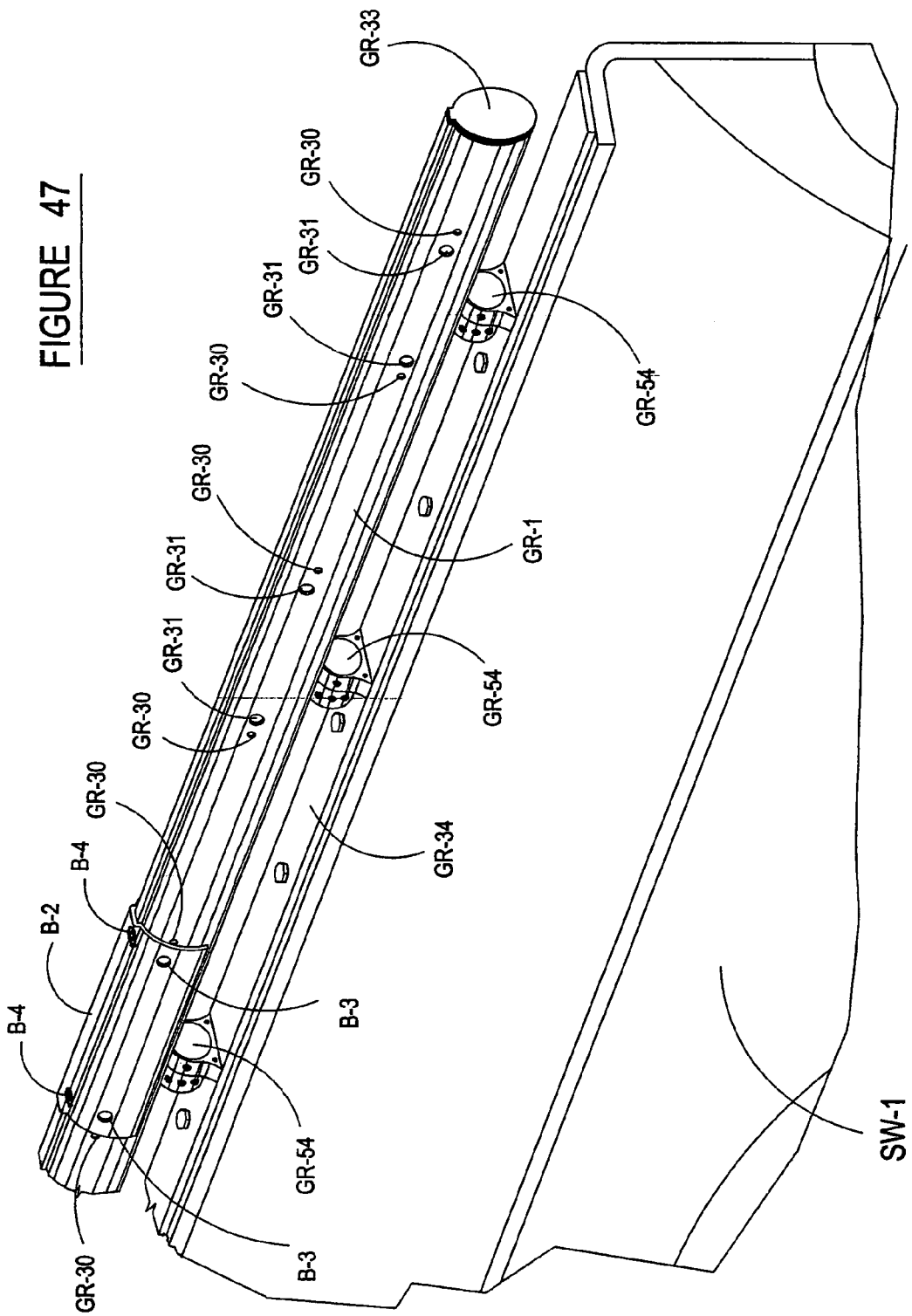
FIG. 47 shows series of pairs of lock holes GR31 and stop holes GR30 in guide rail GR1 with rolling bracket B1 mounted on the rail over a pair of lock holes GR31.

As further shown in FIG. 47, guide rails GR1 and GR2 additionally have a series of pairs of stop holes GR30. These pairs of stop holes are smaller than the pairs of lock holes GR31 and are intended to introduce blockage pins B14 to stop rolling brackets B1 from rolling at such points where its lock holes B3 coincide with lock holes GR31 on the guide rails. Stop holes GR30 and blockage pins B14 thus serve to indicate the positions where lock holes B3 and lock holes GR31 coincide to retain in place rolling brackets B1. (See FIG. 47). The blockage pin B14 should always be positioned only in the second stop hole of the pair of stop holes to which the rolling bracket is being transferred.

Figure 48:
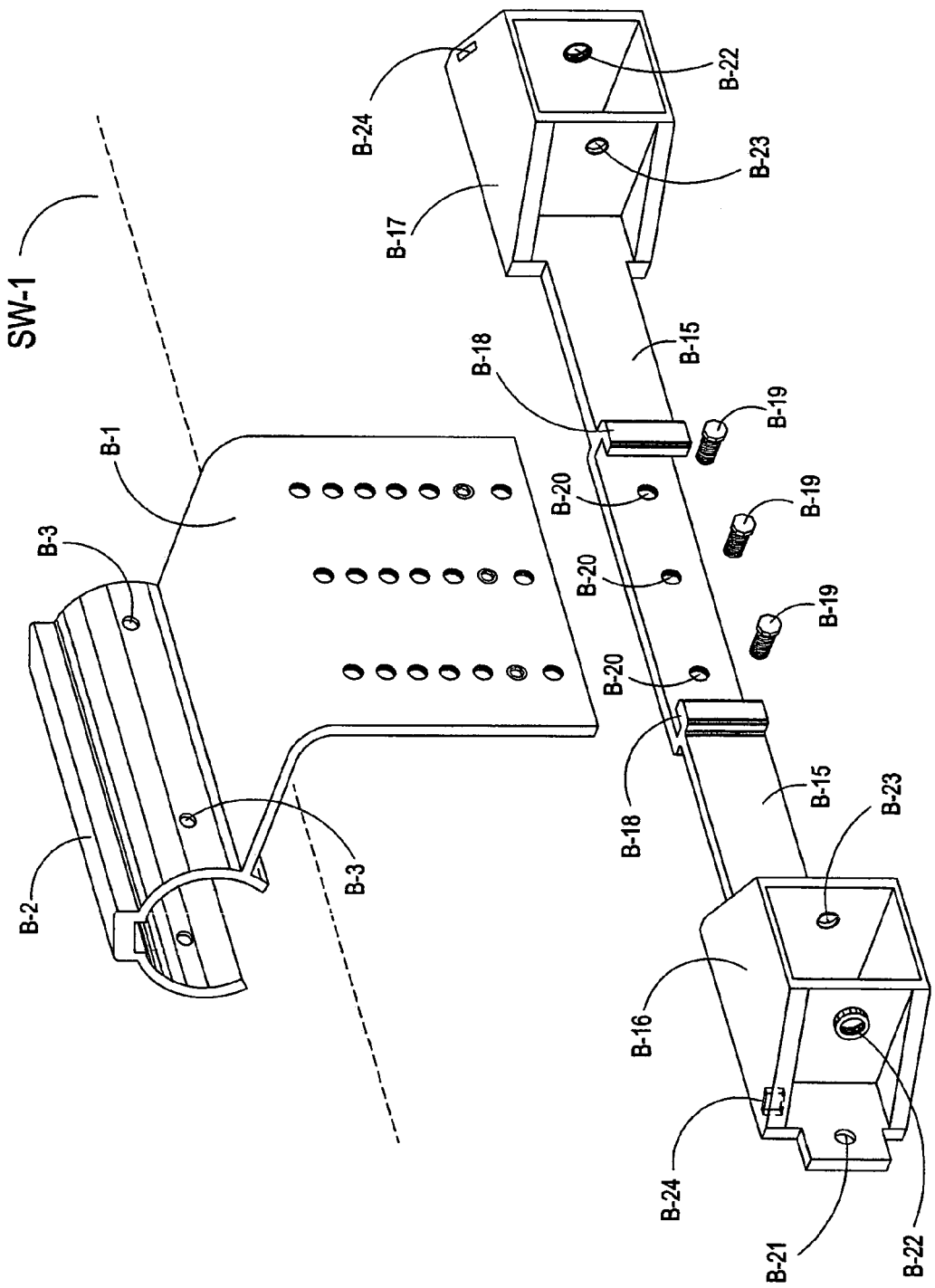
FIG. 48 shows an end-joint assembly B15 about to be secured to the lower section of a rolling bracket B1. The end-joint assembly has an end-joint B16 and an end-joint B17. Each end-joint has factory-made guide holes B22 and B23. The end-joint assembly additionally has a C-shaped section in the middle to give added strength to the union of the assembly and the lower section of rolling bracket B1.
Figure 49:
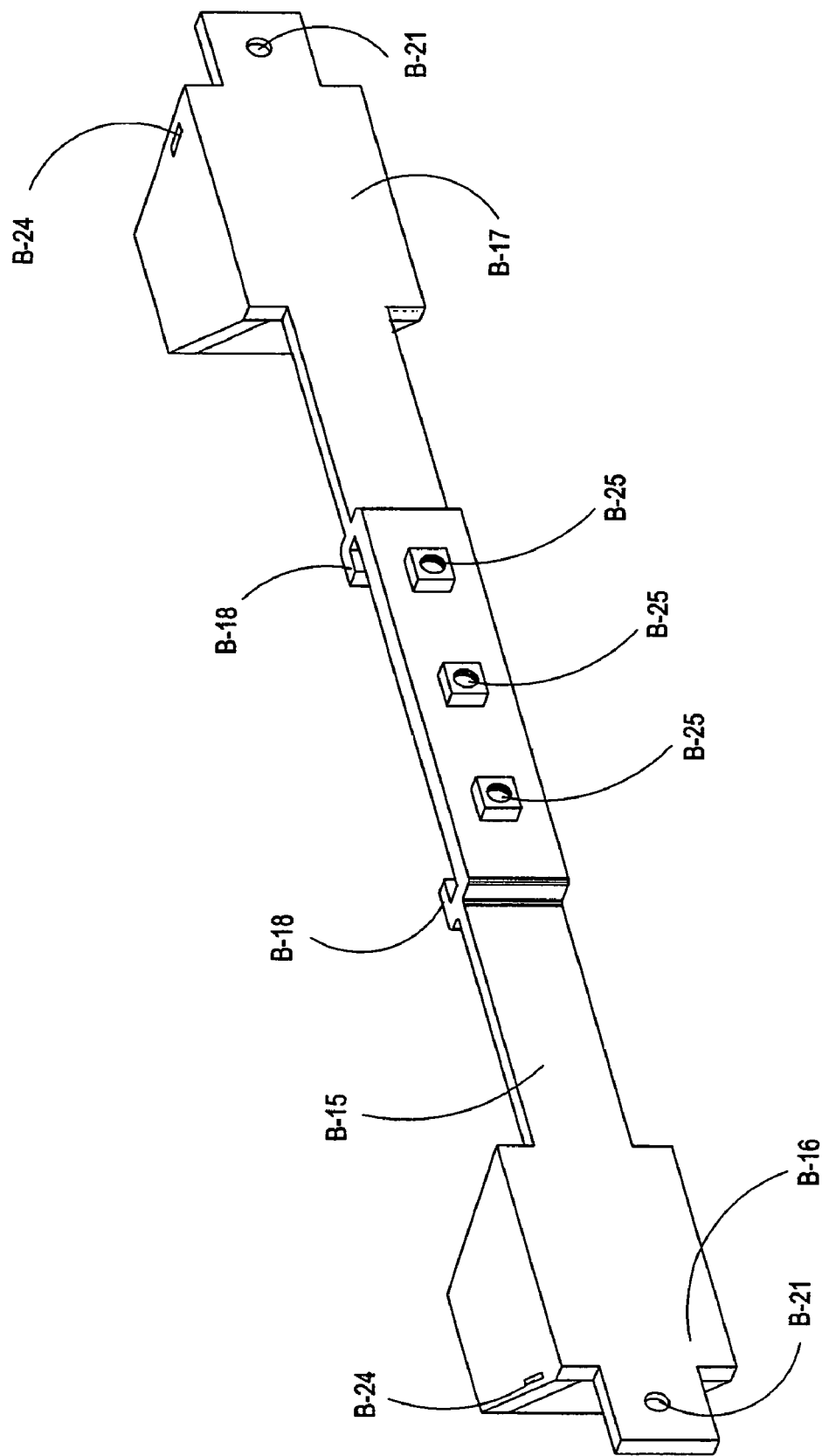
FIG. 49 shows the rear part of end-joint assembly B15.
Figure 50:
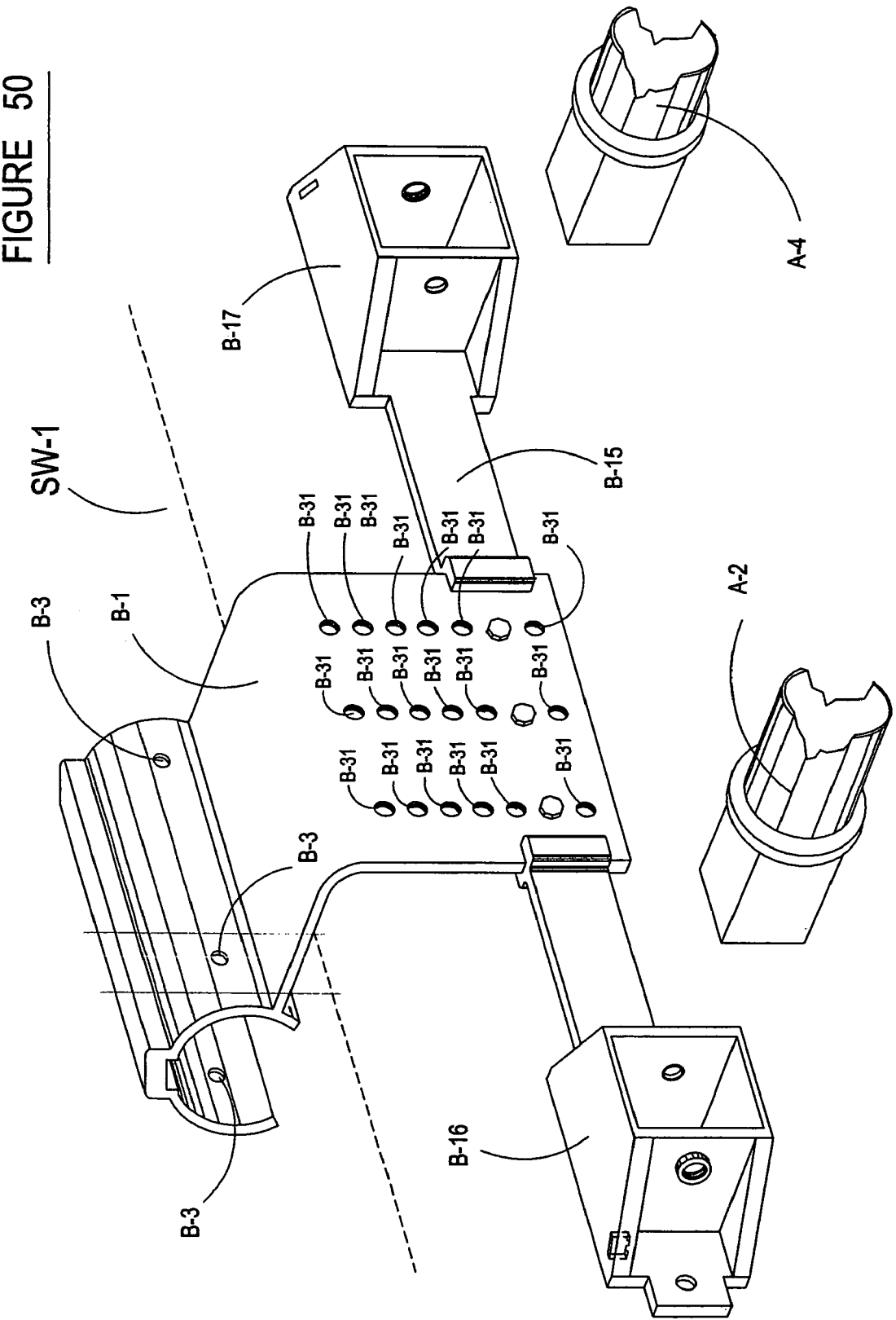
FIG. 50 shows end-joint assembly B15 already secured with bolts to the lower section of rolling bracket B1, as its end-joints B16 and B17 are about to receive end-blocks on the front and rear double-ended telescopic arms. The end-joint assembly is secured to the sixth set of triple holes in the rolling bracket; and the rolling bracket is mounted on a guide rail (not shown) over imaginary side panel SW1. It should be noted that the end-joint assembly B15 mounted on side panel SW1 will always have end-joint B16 in the front and end-joint B17 in the rear.

The lower section of rolling brackets B1 is shaped to move alongside, and spaced apart a few inches from, side panels SW1 and SW2. (See FIG. 45). As FIG. 38 shows, this lower section has seven sets of triple holes B31. The triple hole sets are designed to secure with bolts end-joint assembly B15 at any one of seven different distances from the top of rolling brackets B1. FIGS. 48 and 49 illustrate both the front and the rear side of this end-joint assembly. If the side panels SW1 and SW2 over which the guide rails and the rolling brackets are to be mounted are especially high, then end-joint assembly B15 has to be secured to one of the lower sets of triple holes on said rolling brackets so that the seats and the trunk can rest on the pickup bed. Conversely, if the pickup truck has especially low side panels SW1 and SW2, then end-joint assembly B15 has to be secured to one of the higher sets of triple holes on rolling brackets B1. FIG. 50 shows end-joint assembly B15 secured to one of the lower sets of triple holes (the sixth set), meaning that the rolling bracket is mounted on a pickup truck having very high side panels SW1 and SW2 (not shown).

As further illustrated in FIGS. 49 and 50, end-joint assembly B15 has a C-shaped segment B18 which partially encloses the lower section of rolling bracket B1. This C-shaped segment gives added strength to the union of end-joint assemblies B15 and the lower section of rolling brackets B1.

Figure 51:
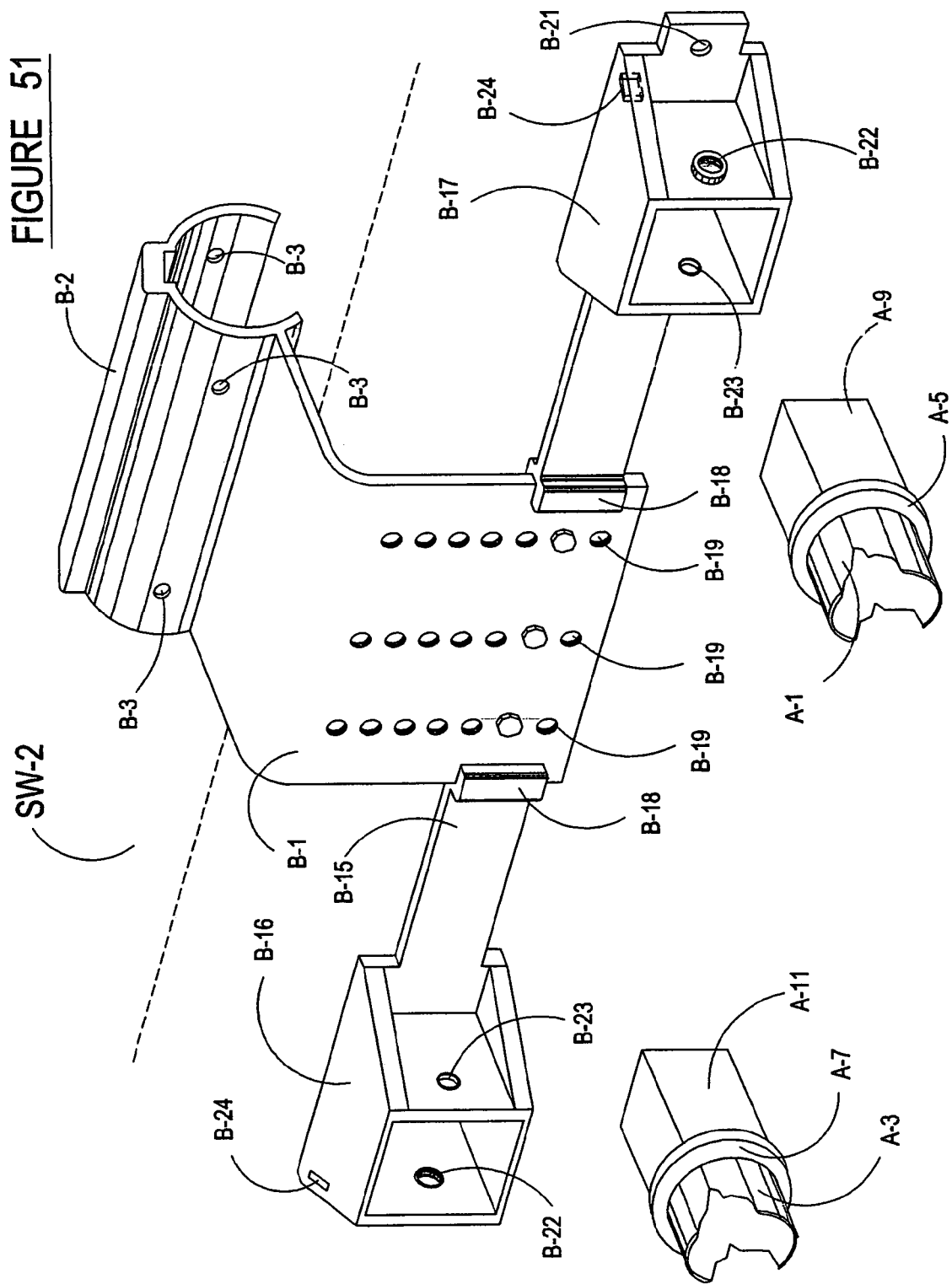
FIG. 51 shows the same scenario illustrated in FIG. 50 but on the other end of the double-ended telescopic arms. The rolling bracket B1 of this FIGURE is mounted on a guide rail (not shown) over imaginary side panel SW2. It should be noted that, unlike the end-joint assembly B15 mounted on side panel SW1, the end-joint assembly B15 mounted on side panel SW2 will always have end-joint B17 in the front and end-joint B16 in the rear.
Figure 52:
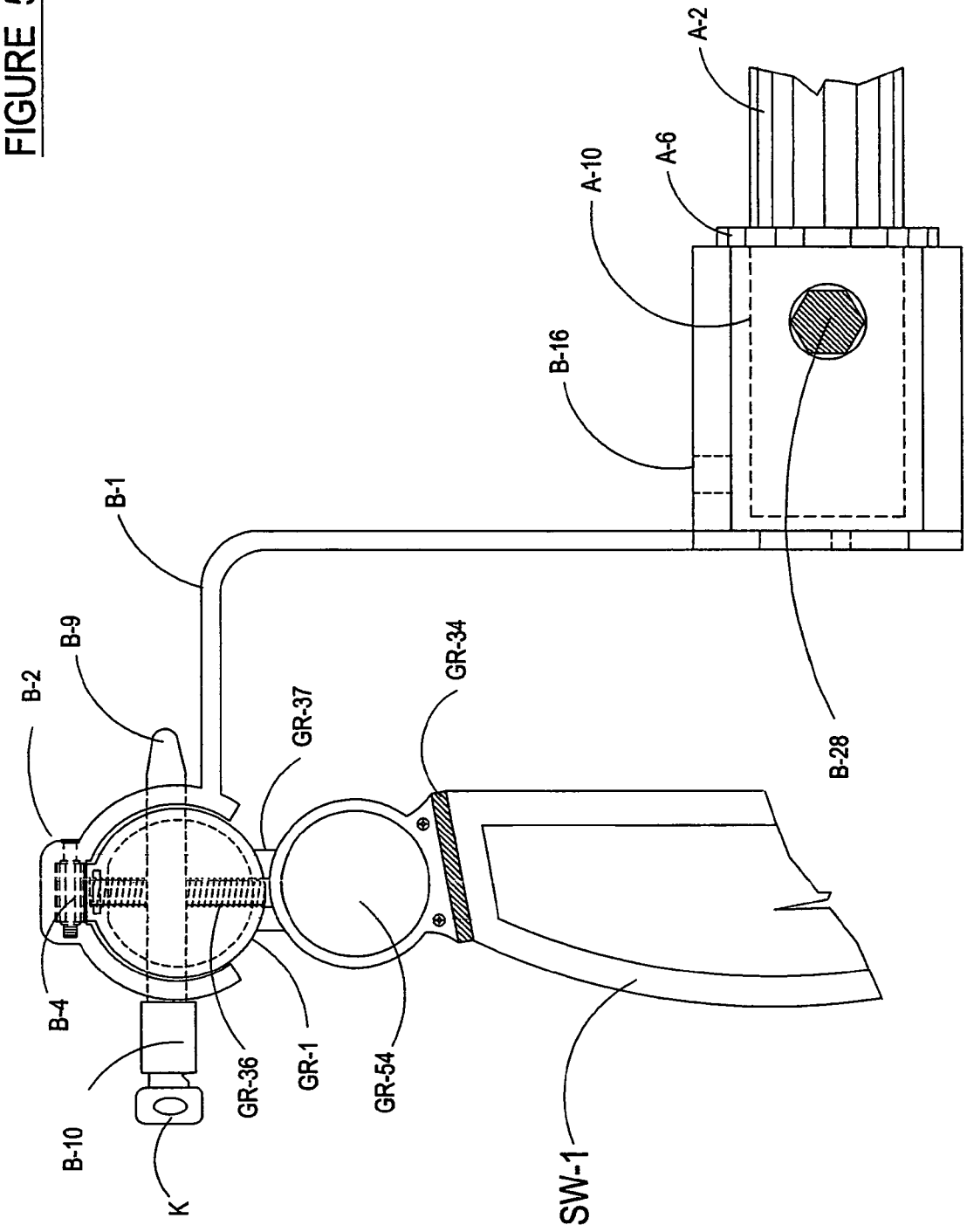
FIG. 52 shows end-block A10 (of front inner tube A2) represented in segmented lines within end-joint B16, mounted on side panel SW1. The end-block fills the entire space from side to side of end-joint B16 but not from top to bottom because there will be an adjustment space to allow the end-block to fit in either more towards the top or more towards the bottom. As also shown, the end-block is secured to the end-joint with horizontal security bolt B28. This FIGURE additionally shows U-bar B9 and a lock unit B10 and key K securing rolling bracket B1. An internal reinforcement GR36 is also shown giving firmness to the hollow guide rail.
Figure 53:
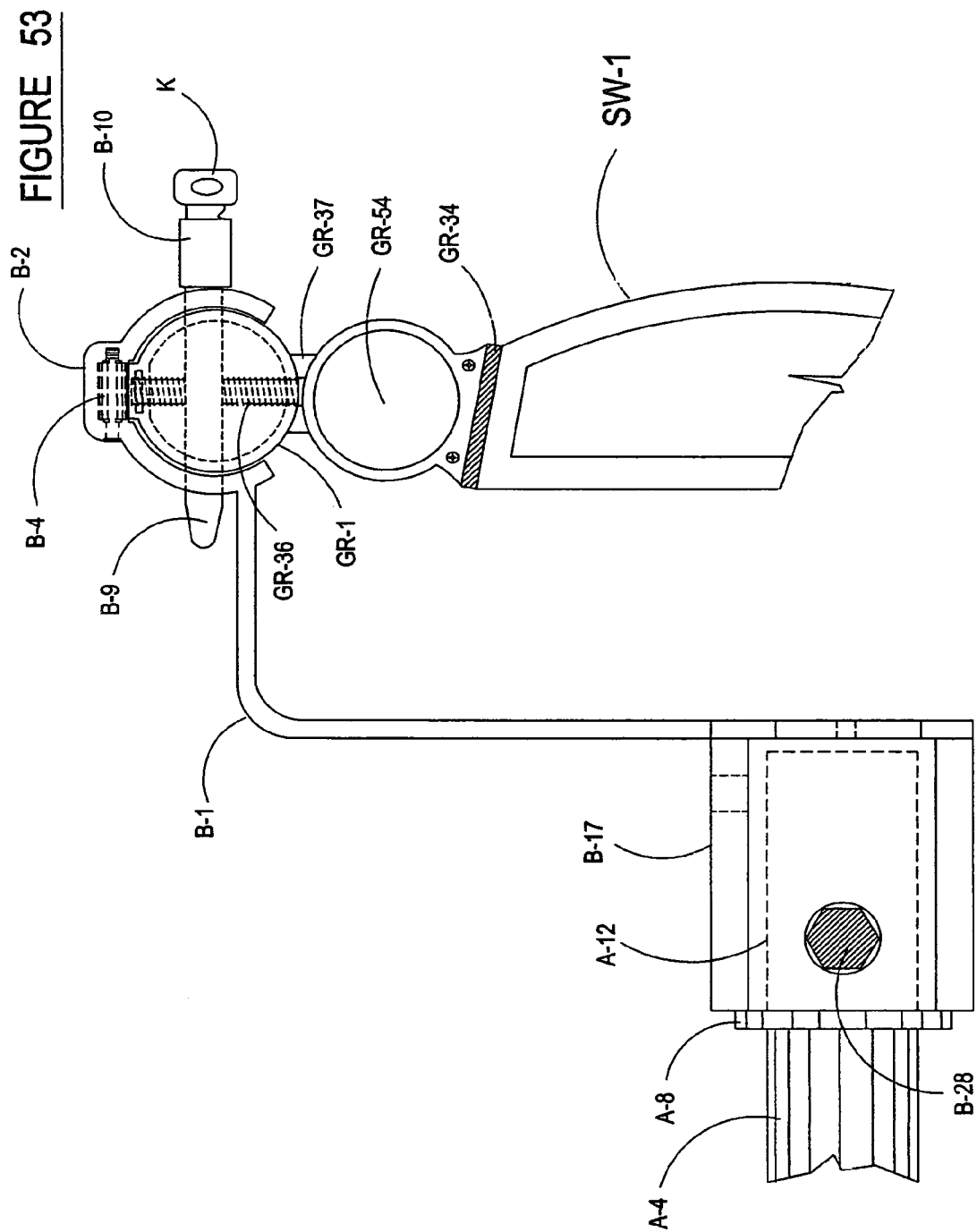
FIG. 53 shows the same scenario illustrated in FIG. 52 but in relation to end-block A12 (of rear inner tube A4) within end-joint B17, mounted on side panel SW1.
Figure 54:
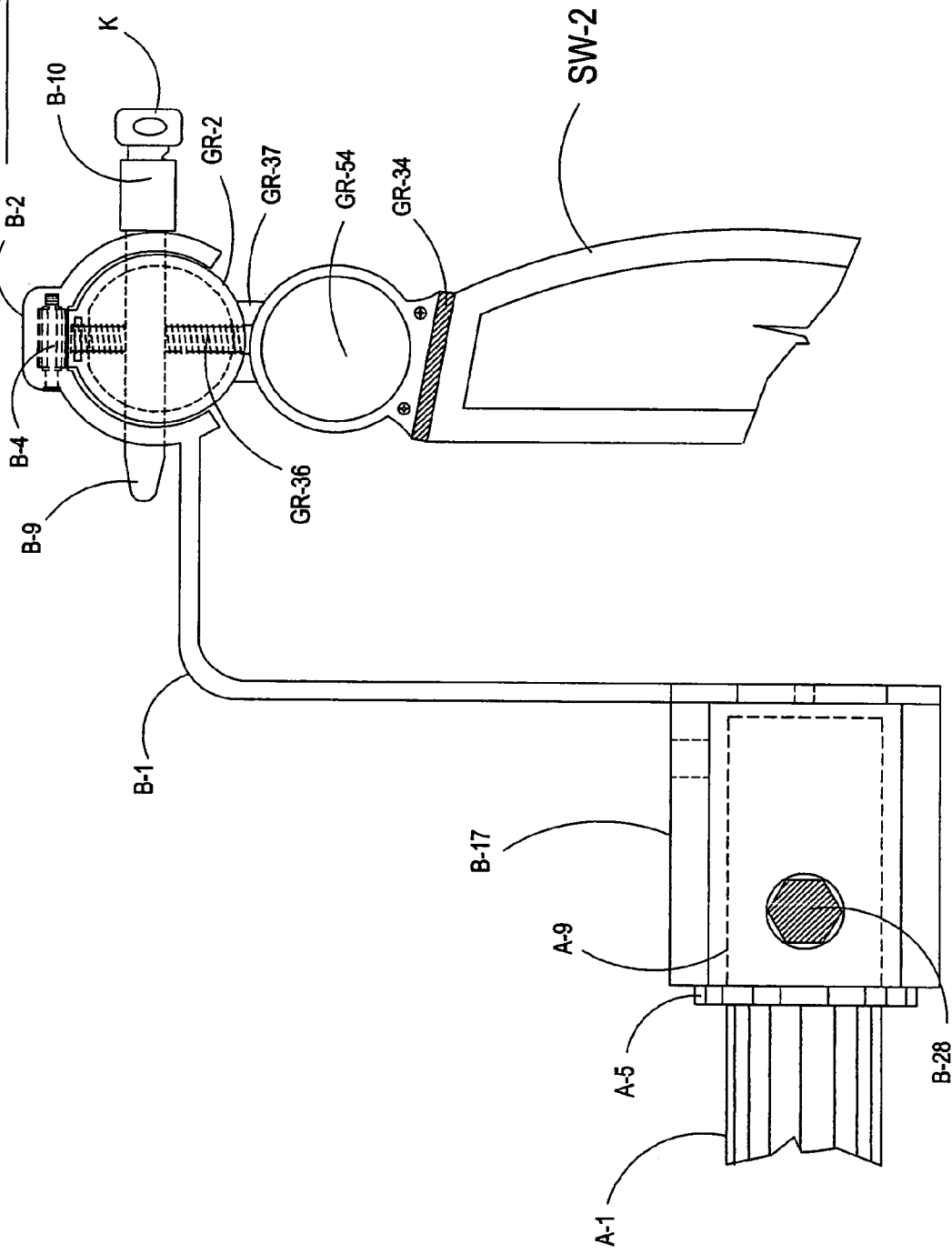
FIG. 54 also shows the same scenario illustrated in FIG. 52, but in relation to end-block A9 (of front main tube A1) within end-joint B17, mounted on side panel SW2.
Figure 55:
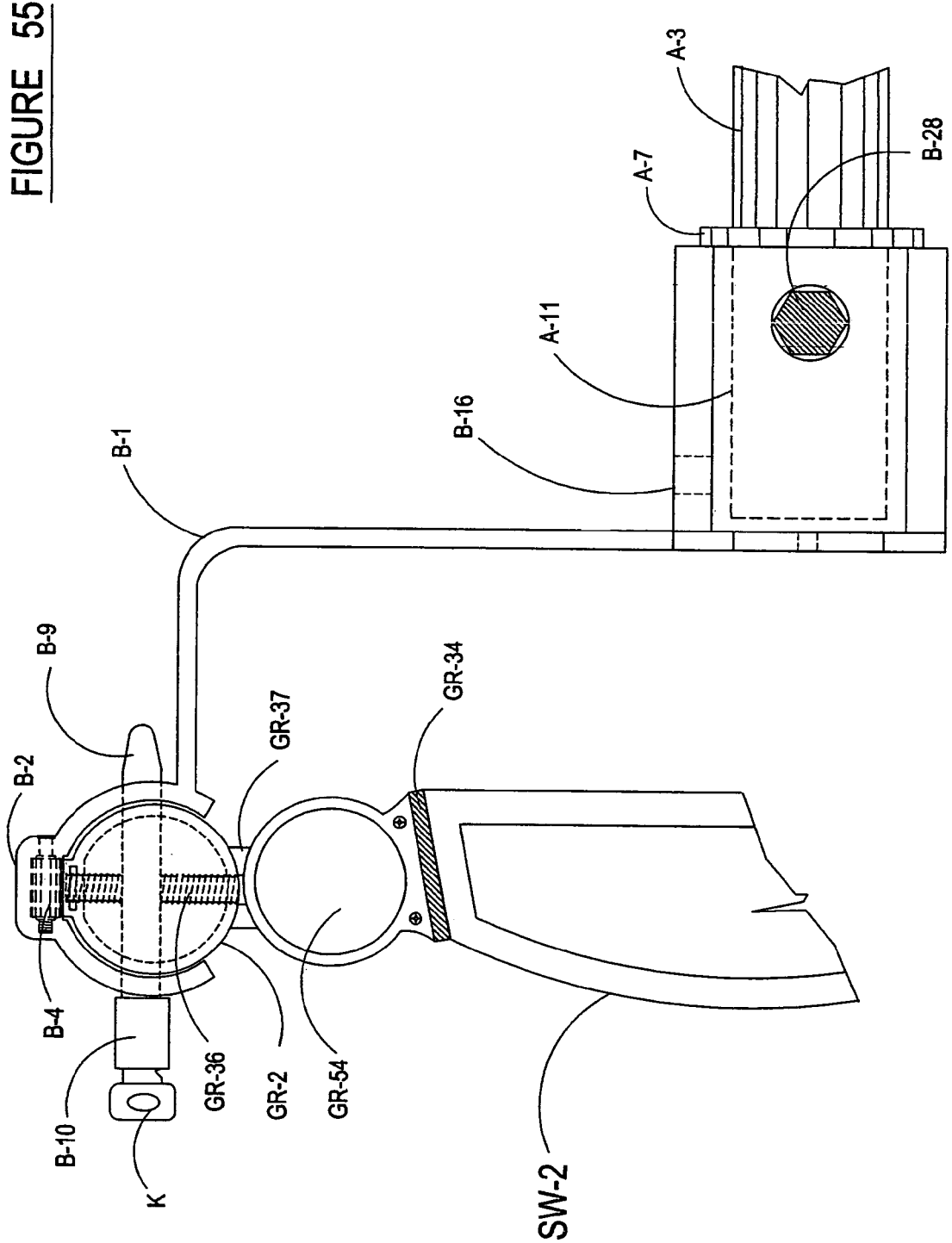
FIG. 55 likewise shows the same scenario illustrated in FIG. 52, but in relation to end-block A11 (of rear main tube A3) within end-joint B16, mounted on side panel SW2.
Figure 57:
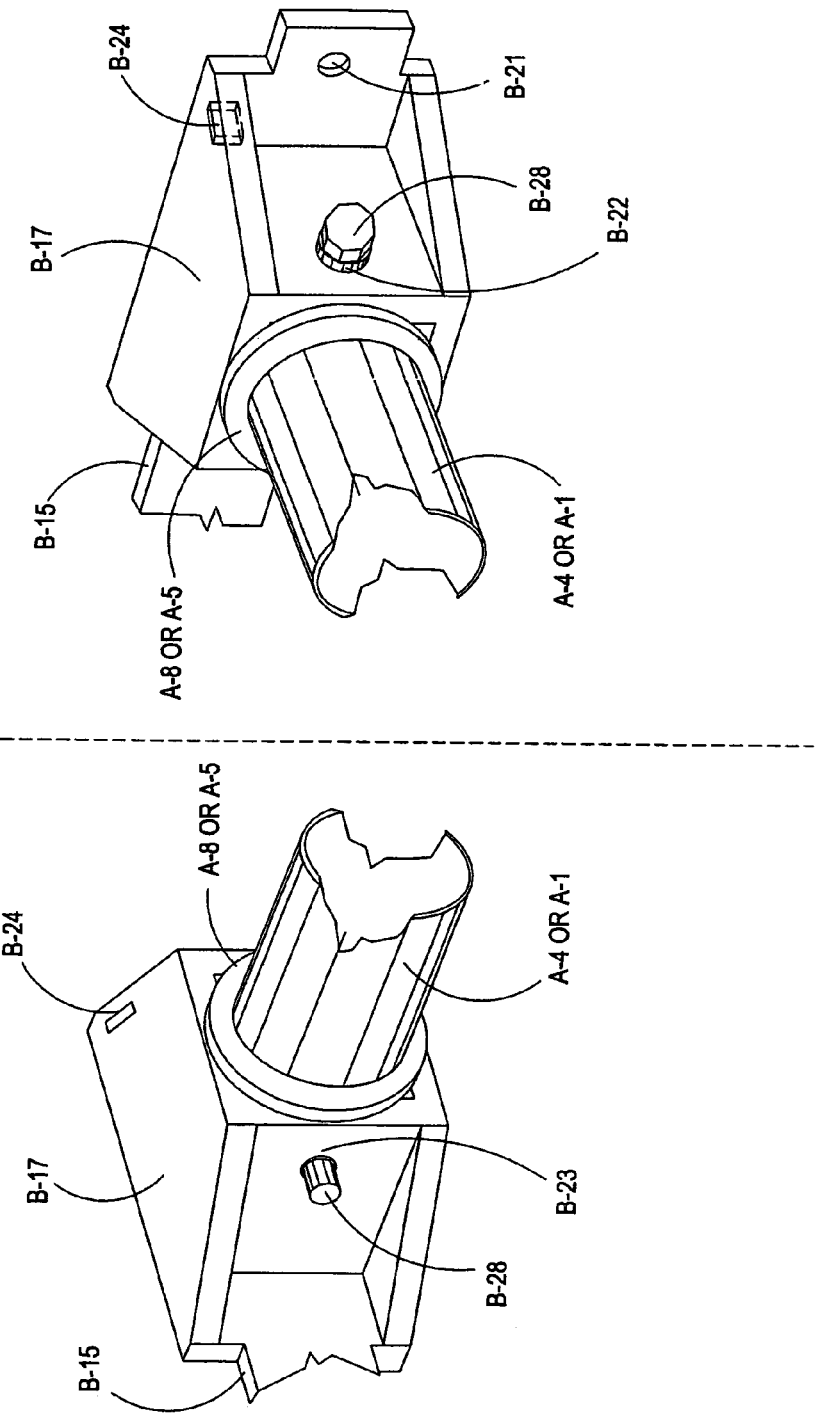
FIG. 57 shows how horizontal security bolt B28 likewise passes completely from one side to the other of end-joint B17. The bolt passes through factory-made guide holes B22 and B23 on the sidewalls of the end-joint, and a bored hole on the end-block within the end-joint.
Figure 58:
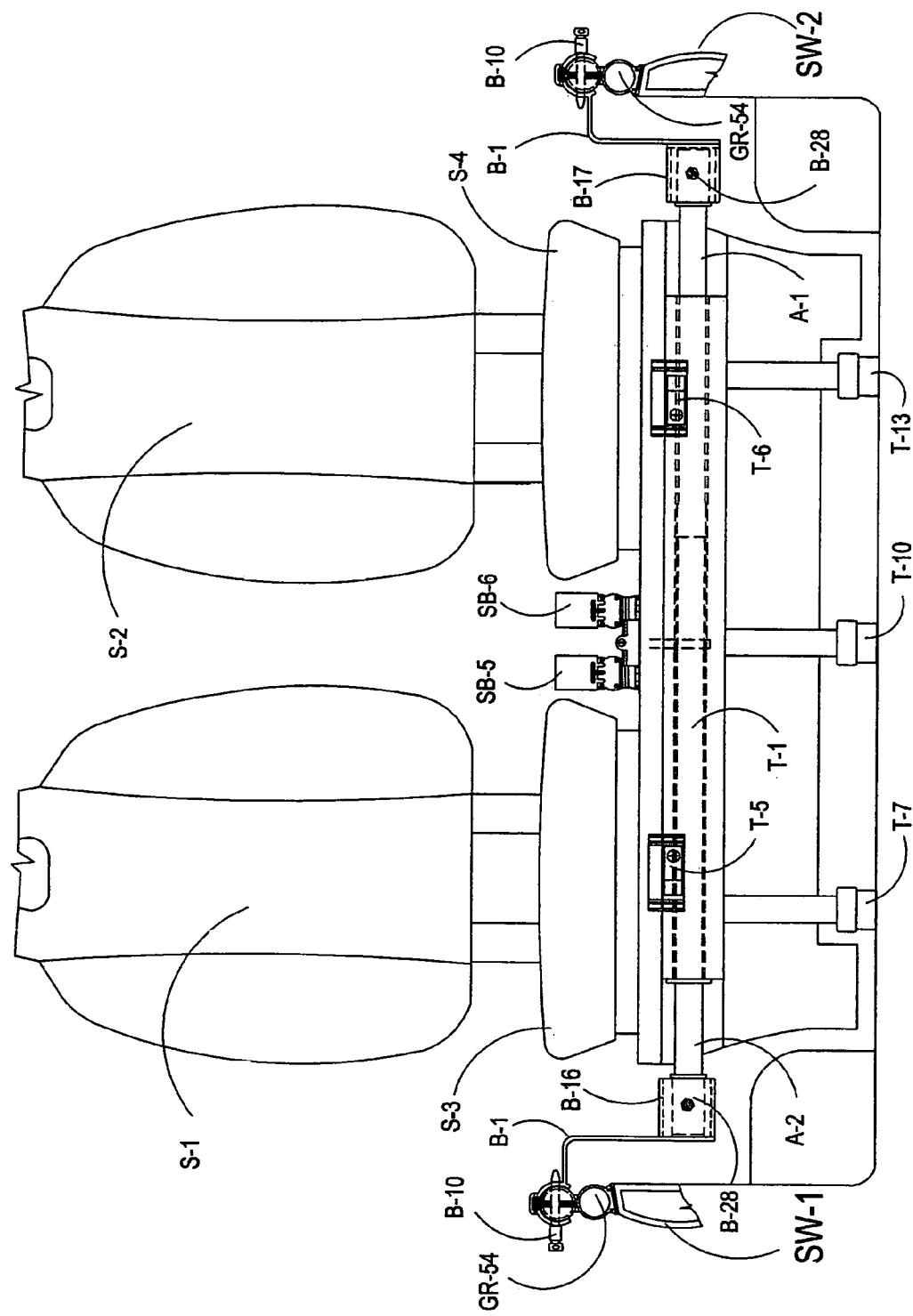
FIG. 58 is a front view of the whole apparatus with end-blocks within end-joints and horizontal security bolts B28 securing one to the other.
Figure 59:
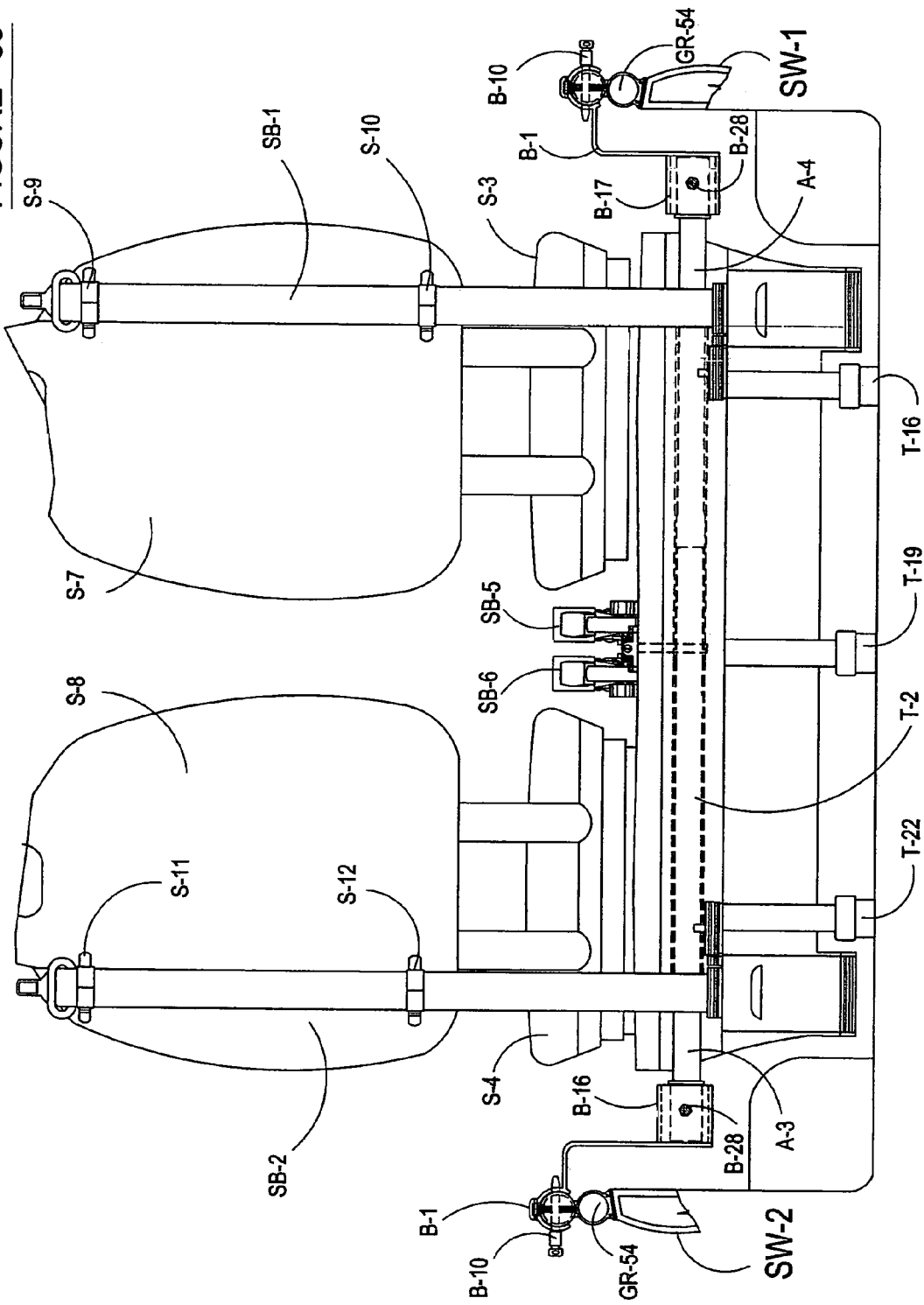
FIG. 59 is a rear view of the whole apparatus with end-blocks within end-joints and horizontal security bolts B28 securing one to the other.
Figure 60:
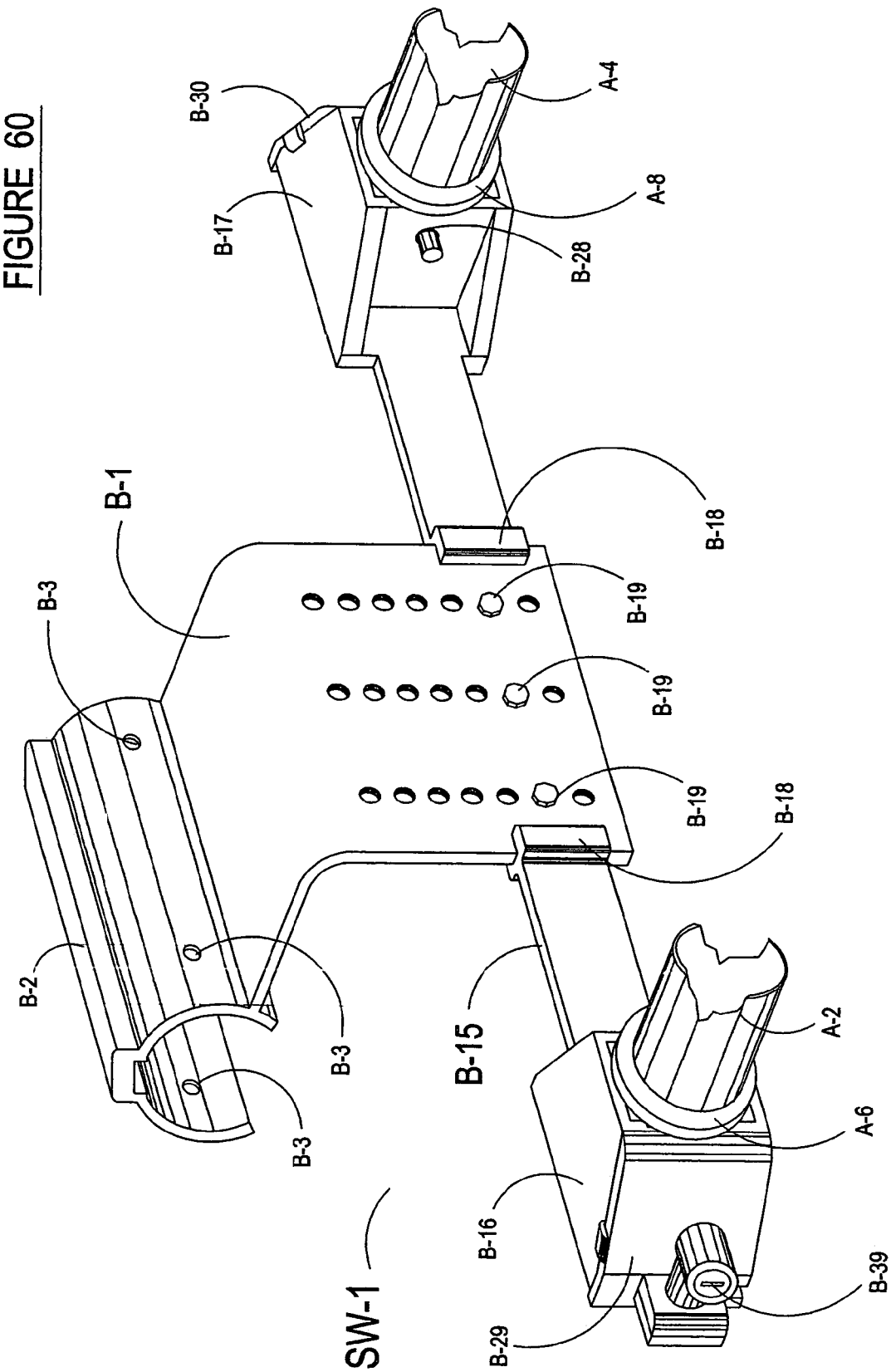
FIG. 60 shows cover plates B29 and B30 locked to the sidewall of end-joints B16 and B17 from which horizontal security bolts B28 can be removed. Cover plates B29 are designed for end-joints B16 and cover plates B30 for end-joints B17. The cover plates are locked to their respective sidewalls with the turn of a key to protect from theft horizontal security bolts B28 and thus the whole apparatus.
Figure 61:
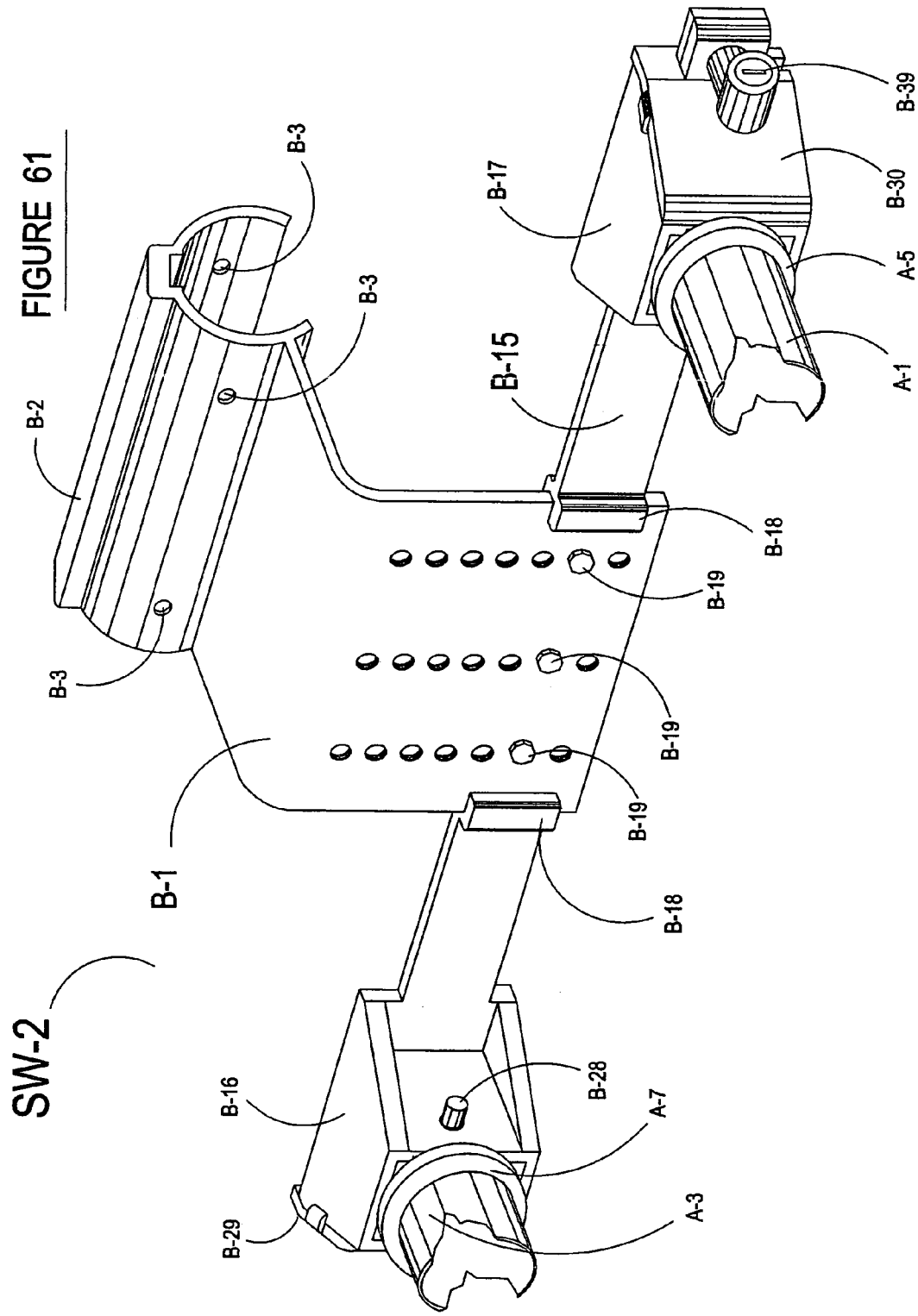
FIG. 61 also shows cover plates B29 and B30 locked to sidewalls on end-joints B16 and B17 respectively. But whereas the cover plates in FIG. 60 are secured to an end-joint assembly B15 mounted on (imaginary) side panel SW1, the cover plates in this FIGURE are secured to an end-joint assembly B15 mounted on (imaginary) side panel SW2. Thus, whereas in FIG. 60 cover plate B29 and end-joint B16 are shown in the front, in this FIGURE they are shown in the rear; and whereas in FIG. 60 cover plate B30 and end-joint B17 are shown in the rear, in this FIGURE they are shown in the front.
Figure 62:
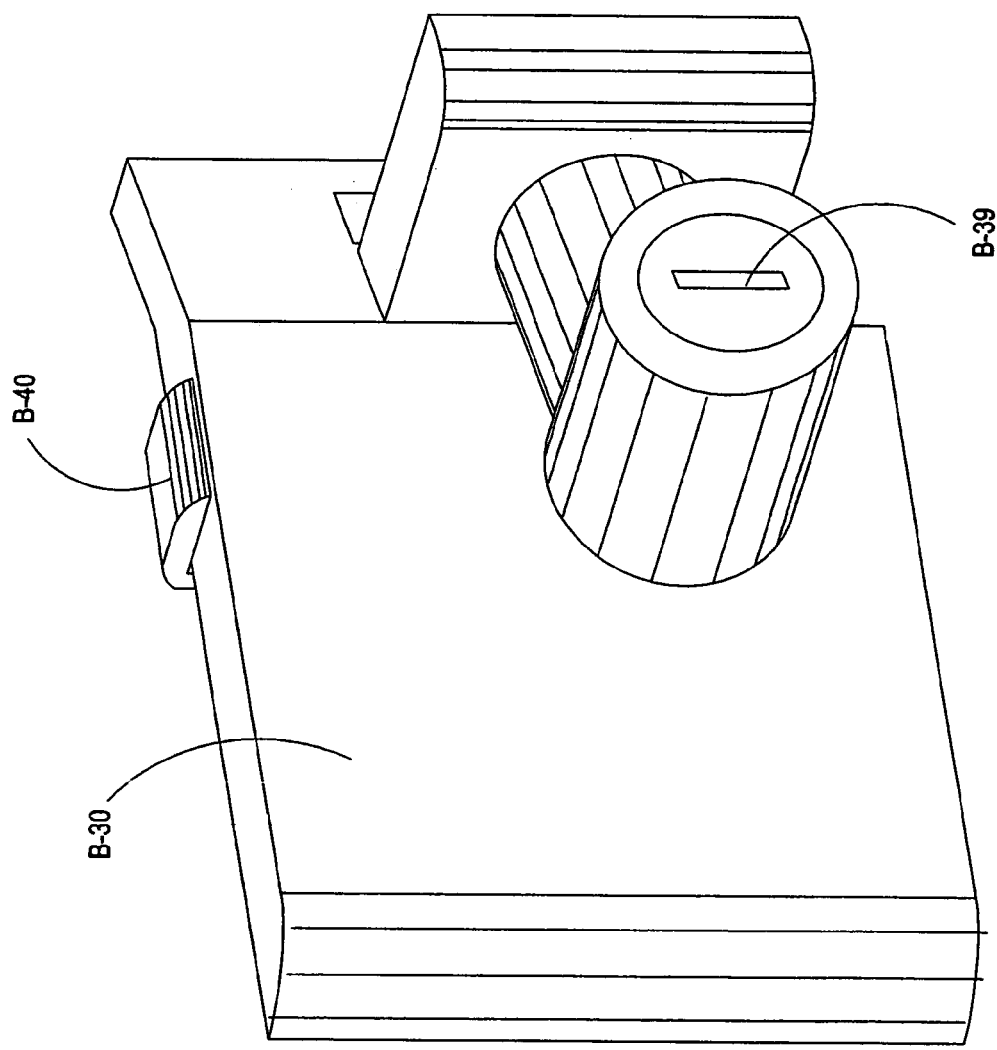
FIG. 62 is a front view of cover plate B30 with lock unit B39 and clasp B40. The clasp goes inside small notches on top of end-joints B17.
Figure 63:
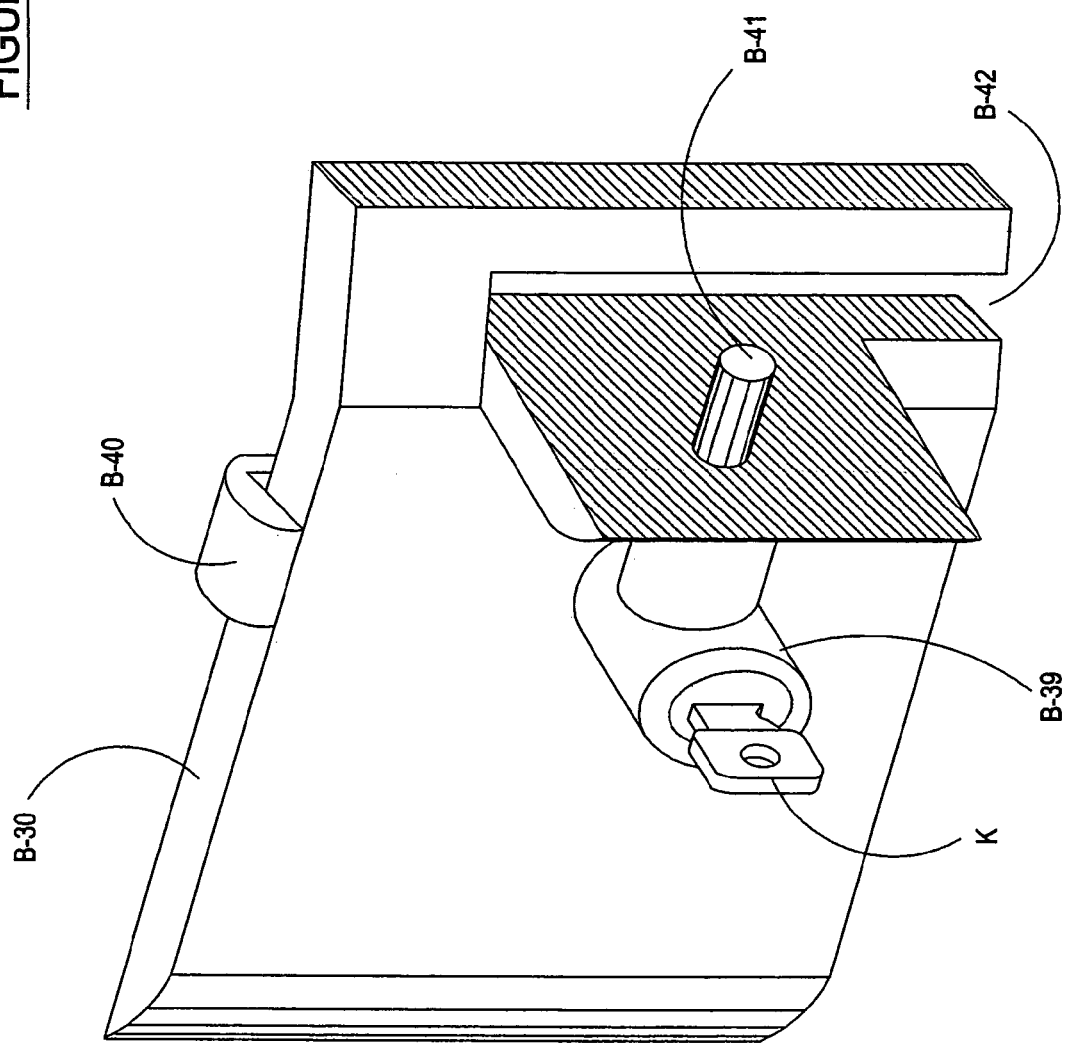
FIG. 63 is a side view of cover plate B30.
Figure 64:
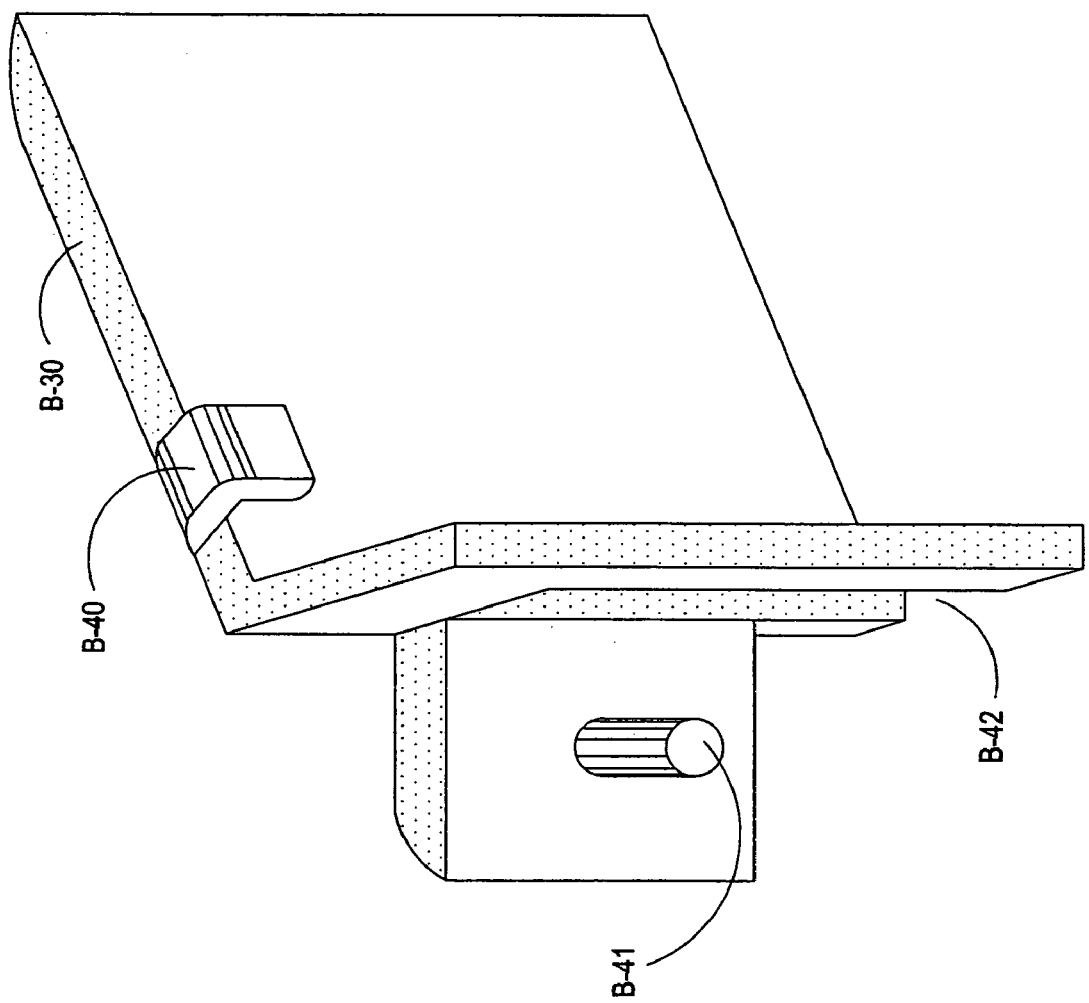
FIG. 64 is a rear view of cover plate B30.
Figure 65:
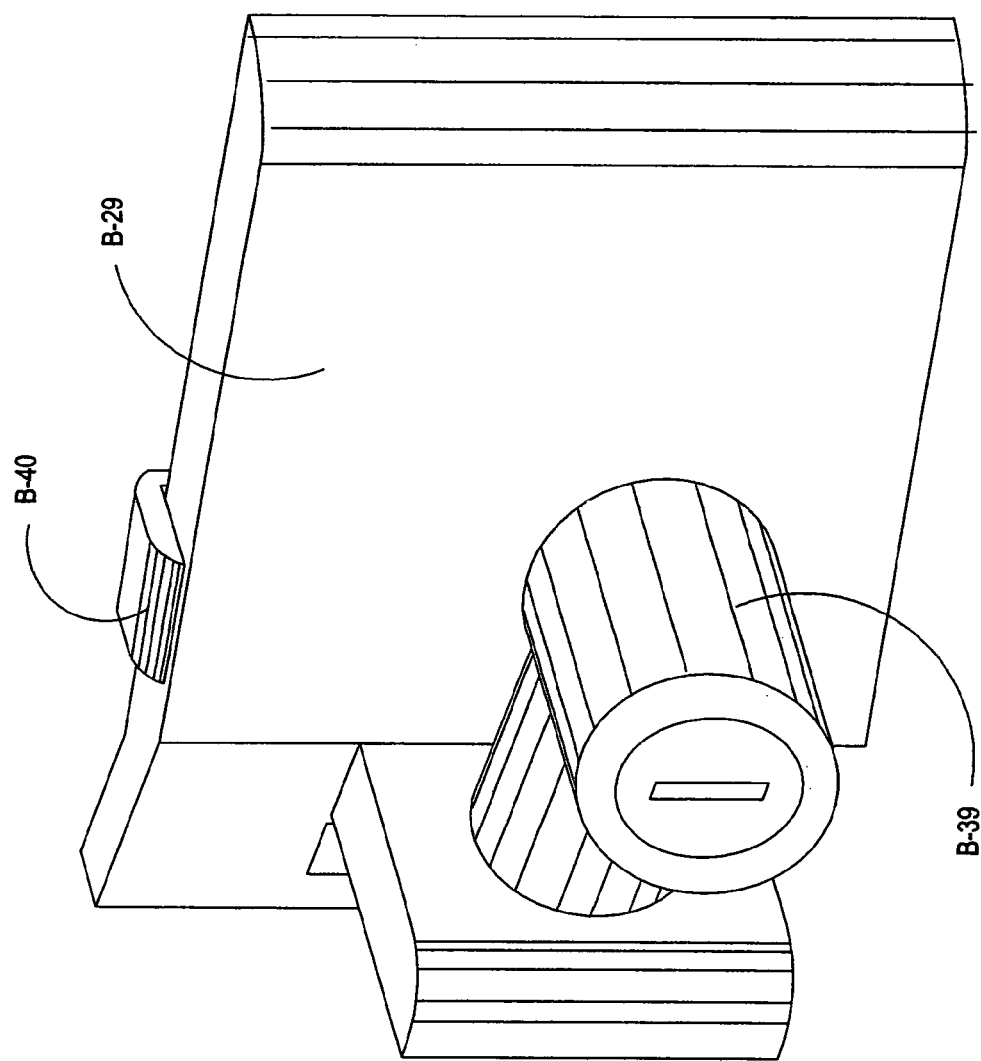
FIG. 65 is a front view of cover plate B29 with lock unit B39 and clasp B40.
Figure 66:
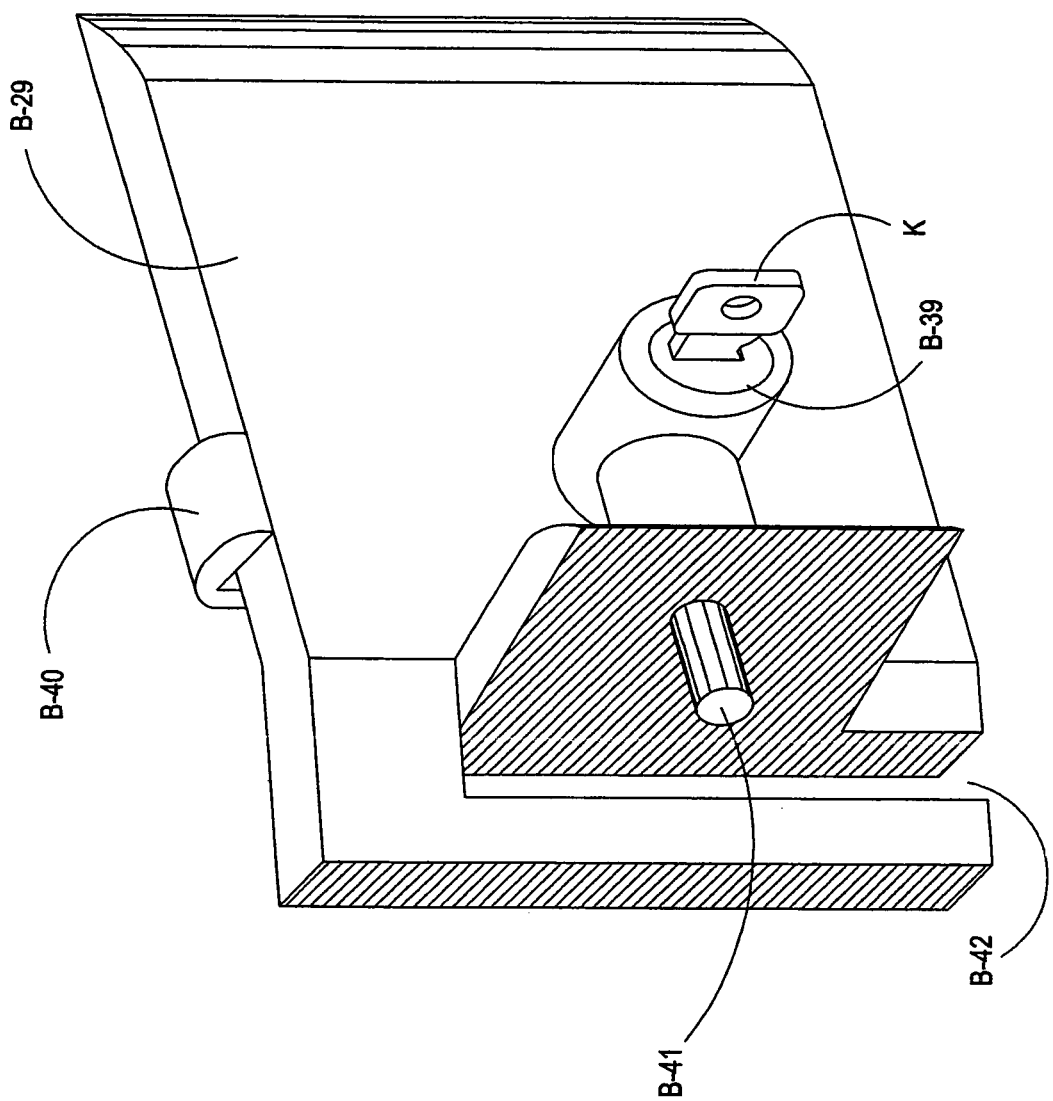
FIG. 66 is a side view of cover plate B29.
Figure 67:
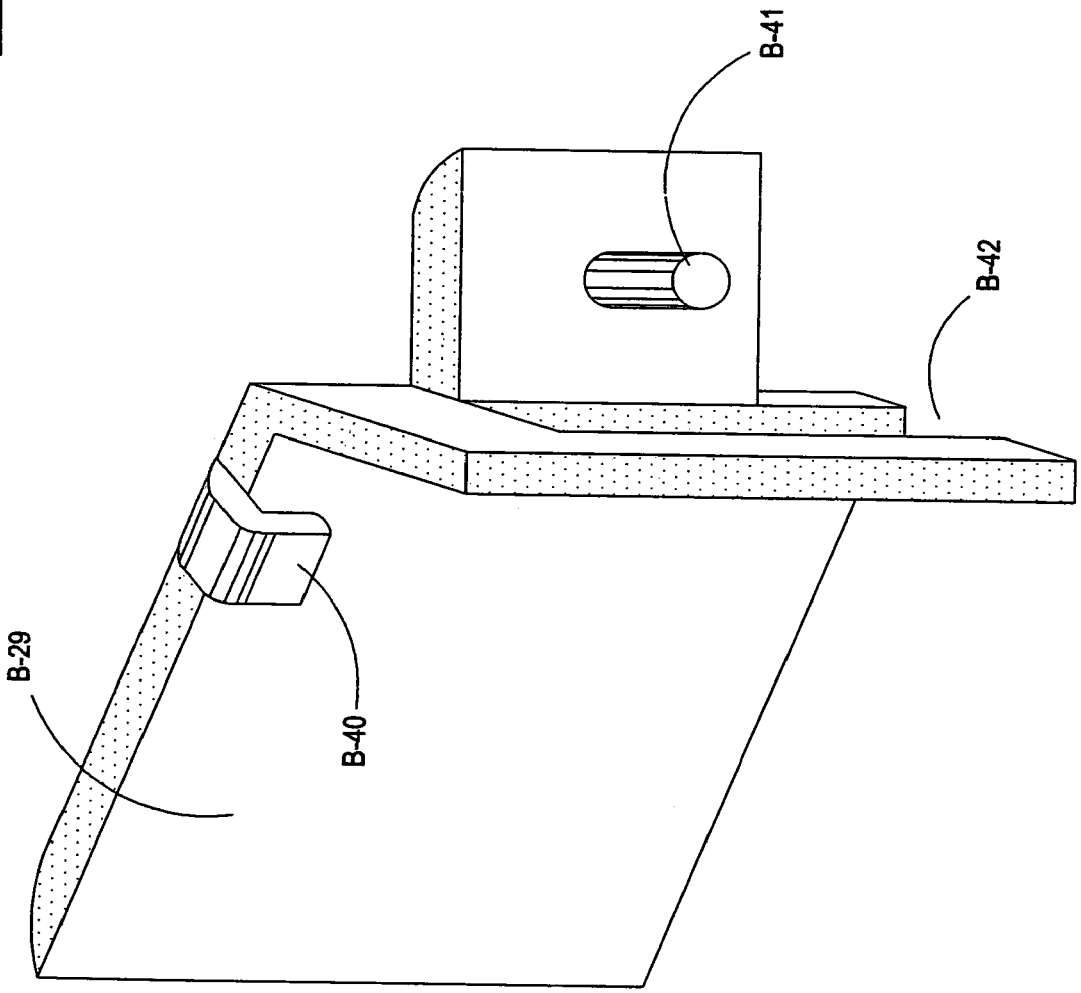
FIG. 67 is a rear view of cover plate B29.

FIGS. 50 and 51 show end-joints B16 and B17 about to receive end-blocks on both double-ended telescopic arms. As the double-ended telescopic arms are extended outwardly, their end-blocks go inside end-joints B-16 and B-17 on end-joint assemblies B15 secured to rolling brackets mounted on both side panels SW1 and SW2; and are held thereto with horizontal security bolts B28 secured from the side walls of said end-joints. (See FIGS. 52, 53, 54, 55, 56,57, 58 and 59).

Since the triple hole sets in the lower section of the rolling brackets B1 have a separation (of one centimeter), the level at which the end-joint assemblies and their end-joints B16 and B17 are set to receive the end-blocks may be off by as much as said measurement. Therefore, to ensure that the end-blocks will fit into the end-joints, the end-joints are made (two centimeters) larger than the end-blocks from top to bottom. The end-blocks will fill the entire space from side to side of the end-joints, but not from top to bottom because there will be an adjustment space to allow the end-blocks to fit in either more towards the top or more towards the bottom. (See the adjustment space above and below the segmented lines representing end-blocks within end-joints in FIGS. 52, 53, 54 and 55).

To secure the end-blocks to end-joints B16 and B17 with horizontal security bolts B28, a hole has to be bored on all such end-blocks once the end-blocks are within the end-joints. The drill that bores these holes passes through factory-made guide holes B22 and B23 on the side walls of end-joints B16 and B17. These factory-made guide holes are equidistant from the top to the bottom of said side walls. But since the end-blocks may go inside the end-joints more towards the top or more towards the bottom, the holes in the end-blocks may likewise be bored more towards the top or more towards the bottom.

As further shown in FIGS. 60, 61, 62, 63, 64, 65, 66, and 67, horizontal security bolts B28 and the whole apparatus of the present invention can be secured from theft with cover plates B29 and B30. These cover plates are locked with the turn of a key K to the side wall of the end-joints from which the bolts can be removed.

Figure 68:
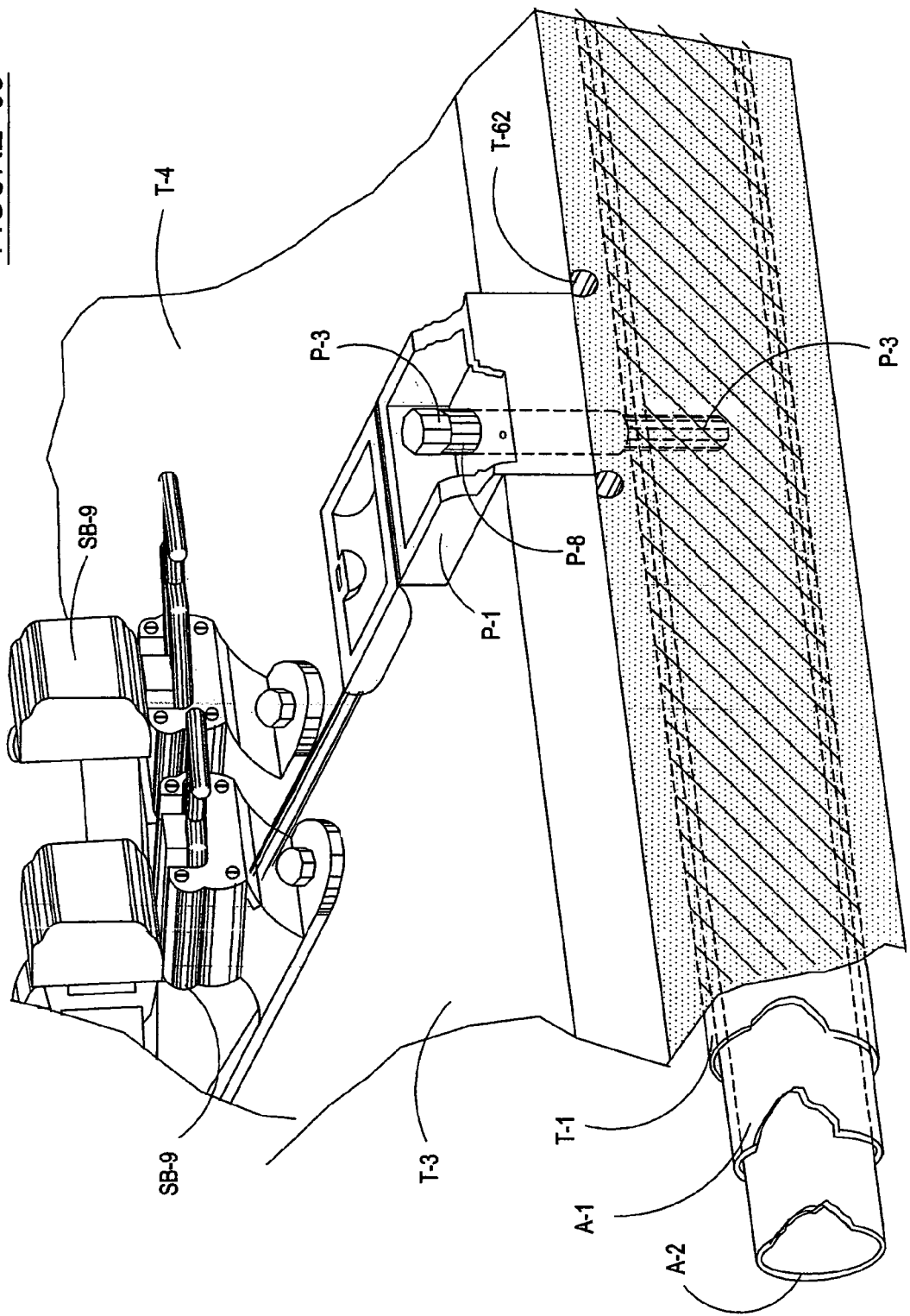
FIG. 68 shows vertical security bolt P3 inside an opened front bolt box P1. The bolt secures front inner tube A2 and front main tube A1 to front trunk tube T1.
Figure 69:
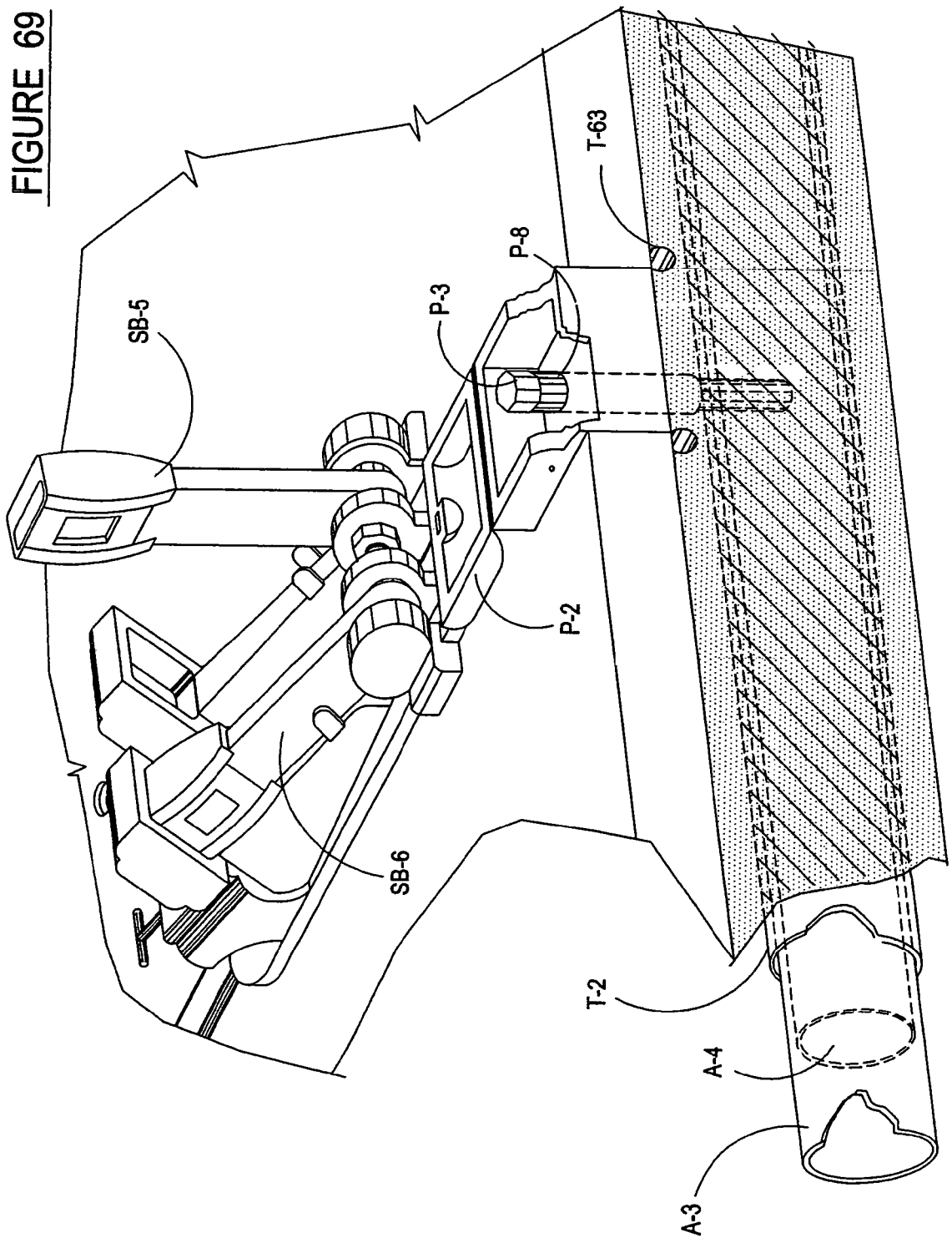
FIG. 69 shows vertical security bolt P3 inside an opened rear bolt box P2. The bolt secures rear inner tube A4 and rear main tube A3 to rear trunk tube T2.
Figure 70:
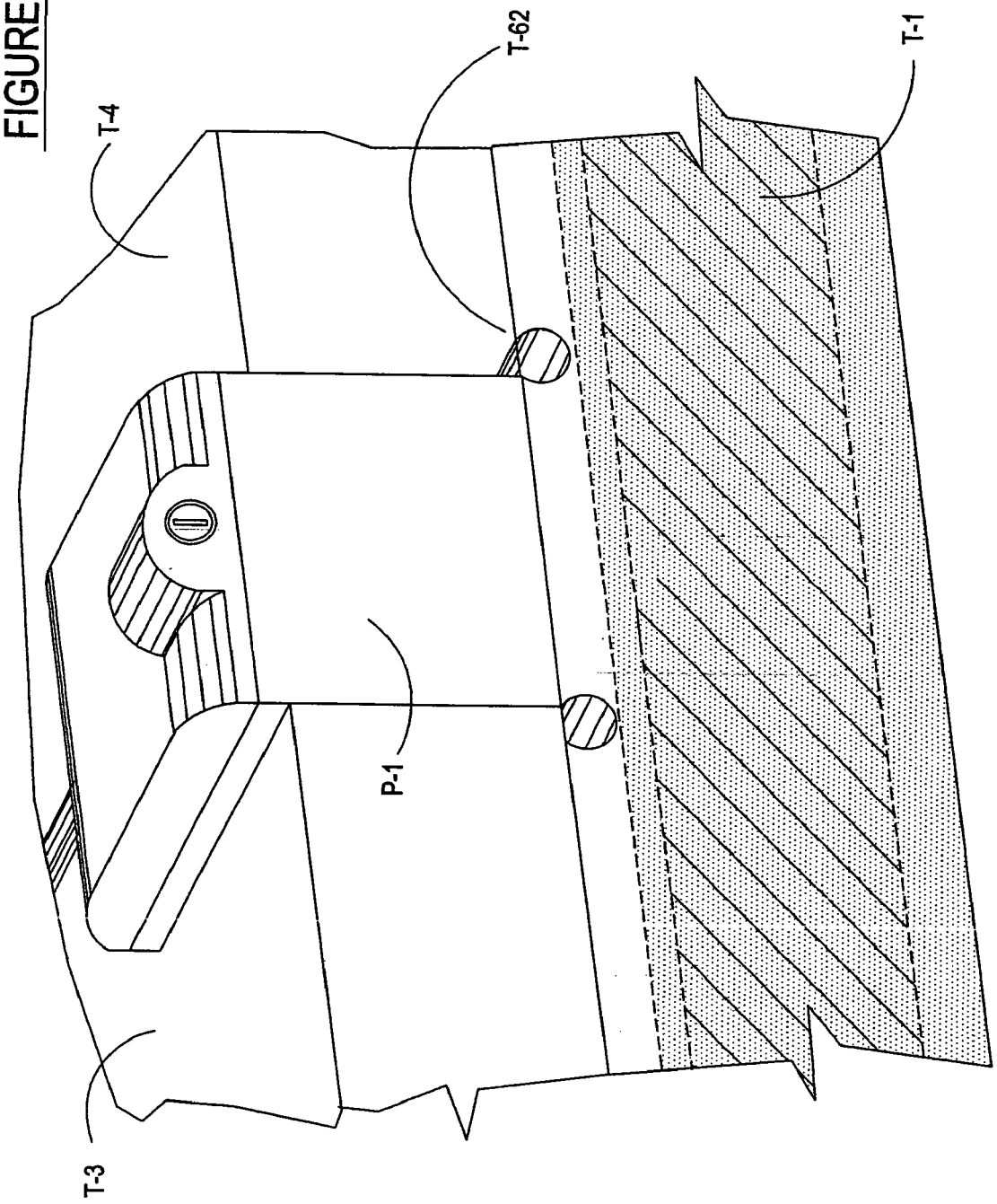
FIG. 70 shows the lid of front bolt box P1 closed. The lid is locked and unlocked with a key to secure from theft the vertical security bolt inside the box.
Figure 71:
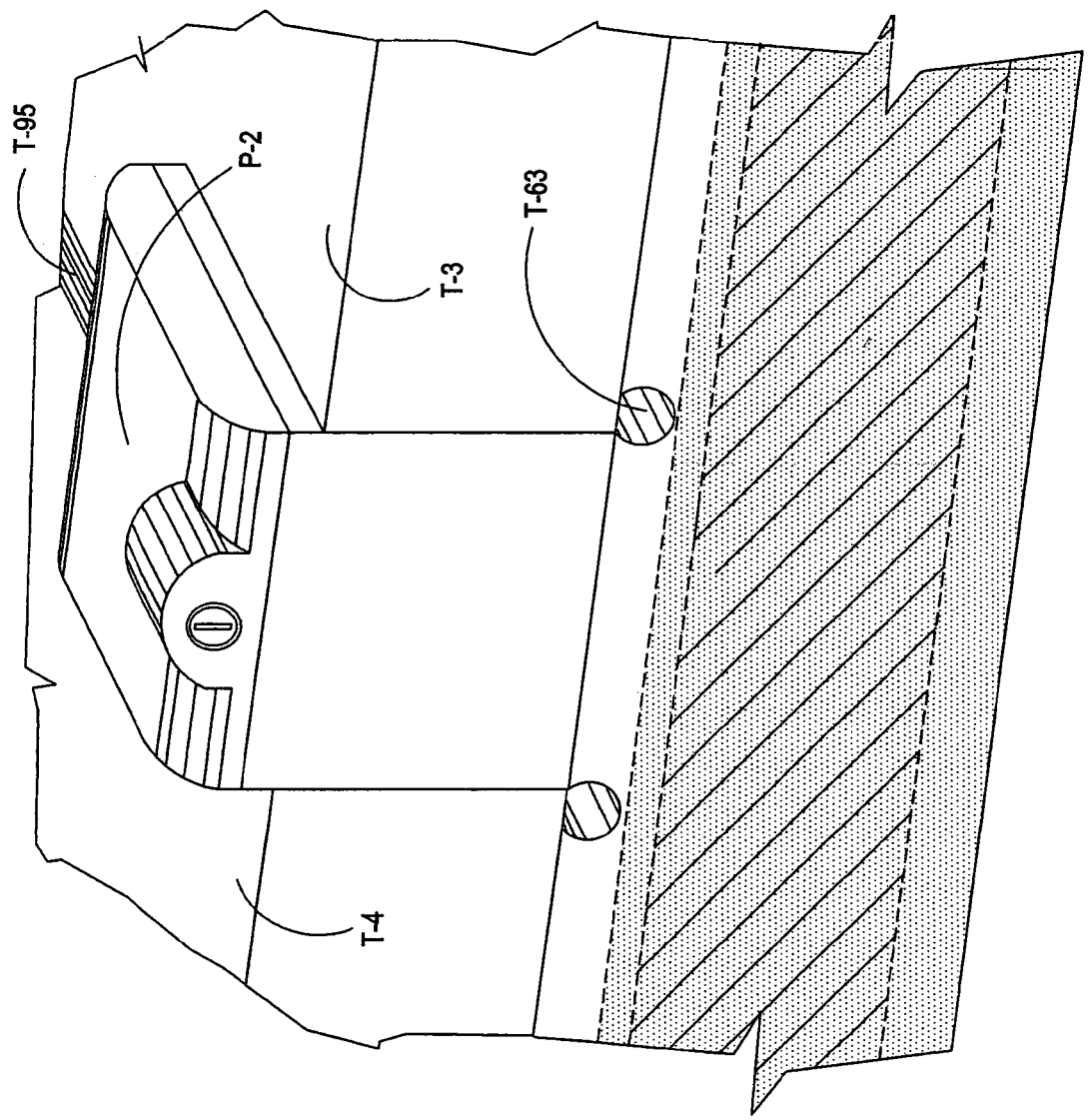
FIG. 71 likewise shows the lid of rear bolt box P2 closed. The lid is locked and unlocked with a key to secure from theft the vertical security bolt inside the box.

In addition to four horizontal security bolts B28 (two on each end-joint assembly B15), there are two vertical security bolts P3, one such bolt securing front main tube A1 and front inner tube A2 to front trunk tube T1, and the other such bolt securing rear main tube A3 and rear inner tube A4 to rear trunk tube T2. FIGS. 68 and 69 show these vertical security bolts P3 between the two trunk lids in the middle of the trunk. Like horizontal security bolts B28, these bolts also require the boring of holes in both front and rear main tubes and in both front and rear inner tubes. And as shown in FIGS. 70 and 71, these bolts also are secured from theft with front and rear bolt boxes P1 and P2.

I claim:

1. In combination with a truck with a cargo compartment having a bottom wall, front and back sides and opposite side walls extending up from said bottom wall at least one seat having a reclinable backrest structure pivoted to swing back and down, relative to a bottom of the seat, which can be reclined back and down when said seat is secured within said compartment, and means for securing said seat to said opposite side walls; and means to set said securing means on said side walls at different distances from the top of said side walls.

2. In combination with a truck with a cargo compartment having a bottom wall, front and back sides and opposite side walls extending up from said bottom wall, one or more trunks underneath at least one seat having a reclinable backrest structure pivoted to swing back and down, relative to a bottom of the seat, which can be reclined back and down when said seat is secured within said compartment, and means for securing said trunk and said seat to said opposite side walls.

3. In combination with a truck with a cargo compartment having a bottom wall, front and back sides and opposite side walls extending up from said bottom wall, at least one seat having a reclinable backrest structure pivoted to swing back and down, relative to a bottom of the seat, which can be reclined back and down when said seat is secured within said compartment, and means for securing said seat to said opposite side walls; and means for locking in place said backrest structure to secure from theft possessions kept underneath said backrest structure.

4. In combination with a truck with a cargo area having a bottom wall, front and back sides and opposing side walls extending up from said bottom wall, an apparatus comprising: at least one compartment underneath at least one seat bottom having at least one reclinable backrest structure pivoted to swing back and down, relative to said at least one seat bottom, which can be reclined back and down when said at least one seat bottom is secured to said compartment and said compartment is secured within said cargo area; and means on said cargo area for guiding said compartment and said at least one seat bottom from one position to another within said cargo area.

5. In combination with a truck with a cargo area having a bottom wall, front and back sides and opposing side walls extending up from said bottom wall, an apparatus comprising: at least one compartment with at least one compartment lid underneath at least one seat bottom having at least one reclinable backrest structure pivoted to swing back and down relative to said at least one seat bottom, which can be reclined back and down when said at least one seat bottom is secured to said at least one compartment lid and said compartment is secured within said cargo area.

6. In combination with a truck with a cargo area having a bottom wall, front and back sides and opposing side walls extending up from said bottom wall, an apparatus comprising: at least one platform underneath at least one seat bottom having at least one reclinable backrest structure pivoted to swing back and down relative to said at least one seat bottom, which can be reclined back and down when said at least one seat bottom is secured to said platform and said platform is secured within said cargo area; and means on said cargo area for guiding said platform and said at least one seat bottom from one position to another within said cargo area.

7. In combination with a truck with a cargo area having a bottom wall, front and back sides and opposing side walls extending up from said bottom wall, an apparatus comprising: at least one compartment underneath at least one seat bottom having at least one reclinable backrest structure pivoted to swing back and down, relative to said at least one seat bottom, which can be reclined back and down when said at least one seat bottom is secured to said compartment and said compartment is secured within said cargo area; wherein said backrest structure can be locked in place in a reclined position to protect possessions kept underneath said backrest structure from theft.

\* \* \* \* \*